United States Patent
Barnishan

(10) Patent No.: US 6,654,950 B1
(45) Date of Patent: Nov. 25, 2003

(54) SOFTWARE REHOSTING SYSTEM AND METHOD

(75) Inventor: Wesley V. Barnishan, Columbus, OH (US)

(73) Assignee: BAE Systems Mission Solutions Inc., San Diego, CA (US)

( * ) Notice: Subject to any disclaimer, the term of this patent is extended or adjusted under 35 U.S.C. 154(b) by 0 days.

(21) Appl. No.: 09/379,619

(22) Filed: Aug. 24, 1999

(51) Int. Cl.[7] .............................................. G06F 9/45
(52) U.S. Cl. ....................................................... 717/136
(58) Field of Search ................................. 717/136, 143, 717/144; 704/1–10; 707/100–104.1

(56) References Cited

U.S. PATENT DOCUMENTS

| | | | |
|---|---|---|---|
| 5,291,583 A | 3/1994 | Bapat | 717/137 |
| 5,315,709 A | 5/1994 | Alston, Jr. et al. | 707/6 |
| 5,546,577 A | 8/1996 | Marlin et al. | 707/103 |
| 5,678,039 A | 10/1997 | Hinks et al. | 707/4 |
| 5,678,044 A | 10/1997 | Pastilha et al. | 707/104 |
| 5,708,828 A | 1/1998 | Coleman | 707/523 |
| 5,710,727 A | 1/1998 | Mitchell et al. | 707/128 |
| 5,724,272 A | 3/1998 | Mitchell et al. | 707/123 |
| 5,752,008 A * | 5/1998 | Bowling | 703/13 |
| 5,754,830 A | 5/1998 | Butts et al. | 709/311 |
| 5,768,564 A | 6/1998 | Andrews et al. | 717/137 |
| 5,815,149 A | 9/1998 | Mutschler, III et al. | 345/335 |
| 5,828,897 A | 10/1998 | Kirsch et al. | 712/43 |
| 5,842,204 A | 11/1998 | Andrews et al. | 707/31 |
| 5,857,103 A | 1/1999 | Grove | 717/158 |
| 5,870,749 A | 2/1999 | Adusumilli | 707/101 |
| 5,923,879 A | 7/1999 | Sasmazel et al. | 717/143 |
| 5,970,490 A * | 10/1999 | Morgenstern | 707/10 |
| 6,031,992 A | 2/2000 | Cmelik et al. | 717/138 |
| 6,031,993 A | 2/2000 | Andrews et al. | 717/143 |
| 6,067,579 A * | 5/2000 | Hardman et al. | 709/328 |
| 6,199,068 B1 * | 3/2001 | Carpenter | 707/100 |
| 6,345,243 B1 * | 2/2002 | Clark | 704/2 |
| 6,345,244 B1 * | 2/2002 | Clark | 704/2 |

* cited by examiner

*Primary Examiner*—Kakali Chaki
*Assistant Examiner*—John Q. Chavis
(74) *Attorney, Agent, or Firm*—Nath & Associates PLLC; Harold L. Novick; Marvin C. Berkowitz

(57) ABSTRACT

A system, method and computer program for rehosting a legacy application computer program written in one computer program dialect to a target dialect, for porting a control computer program, such as a Test Program, from one hardware platform to another, and for analyzing a computer program and creating a report. The rehost computer program is used to create a translation module in a first dialect which is comprised of a plurality of processed statements that are parsed, formatted and generalized and to store the statements in a searchable tree format. An existing translation module is enhanced by processing a number of programs and adding only unique statements. Each statement in the existing translation module has as a nested array an equivalence in the target language. A legacy program to be rehosted is first parsed and formatted into the same processed statement types as in the translation module and then a look-up is performed on a statement by statement basis to find and store the equivalent statements in the translation module, replacing the generalized elements therein with the actual values in the processed legacy statements. When it is desired to have a report of the statistics of a computer program, that computer program is parsed and formatted into statements, and then the desired information about the statements is processed into a table or even flow chart.

50 Claims, 47 Drawing Sheets

FIG. 14B

Recycler Explorer
File Edit View Help Controls

TreeView:

```
+---SET VERIFY NUMBER TO <VALUE> $
+---IF ENG = 5 THEN CALL SELFTEST $
+---IF TST1 = <integer> THEN DISPLAY <string> $
+---GO TO <string_1>
+---LABEL <string> $
+---CALL <string> $
----SETUP POWER SUPPLY <integer> ON $  ~ 1411
   ---[XLTR]
      +---RntStatus = IviPower_ConfigureDCV(IviPower_
      +---RntStatus = IviPower_ConnectOutPut(IviPower
+---SETUP POWER SUPPLY <integer> OFF $
+---SETUP POWER SUPPLY <integer> HOLD $
+---SETUP POWER SUPPLY <integer> TO-15000 MV AT 1000 M
+---SETUP POWER SUPPLY <integer> TO 15000 MV AT 1000 MA
+---SETUP POWER SUPPLY <integer> TO OFF $
+---CONNECT POWER SUPPLY <integer> TO <string> $
+---DISCONNECT POWER SUPPLY <integer> TO <string> $
+---SETUP DIGITAL MULTIMETER <integer> OHMS X1000 $
+---SETUP DIGITAL MULTIMETER 1 OHMS X1000 $
```

1402
1400

ListView:
Properties | Reports | Translation
ListView | XLate File | Model Match — 1408

870 872 874
1404 1406

ListView

<Active Model> — 1440
XLAT_ATLAS-To-ANSI_C
ATLAS_To_ANSI-C
XLAT_ATLASF16_To_ATLAS89
XLAT_Variable_Quotes
XLAT_Variable_Brackets
XLAT_Delimiter_$
Excel_to_ttDB
XLAT_ttDB-to_ATE
Indent_Tracker
Sort_Order
TRD_Get-VerbNounCNX
C5_Format_PCDF
C5_Delete_AllClr_Comment
C5_Format_For_AllClr_Boxes
C5_Convert_Test_Comment_to_Stmt
Stats 1414
1416
1412

Recycler Explorer

File Edit View Help Controls

TreeView:
```
+ --- Translation
- --- Translation Library
    - --- ATLAS_To_ANSI_C ~ 1410
      + --- # <string>#$
      + --- BEGIN ATLAS PROGRAM <string>
      + --- DEFINE ARRAY <string>[<integer>]$
      + --- LET <string>$
      + --- PRINT <string>$
      + --- DISPLAY $
      + --- DISPLAY <string>$
      + --- ERASE DISPLAY $
      + --- SETUP CURSOR $
      + --- WAIT FOR MANUAL START $
      + --- WAIT FOR $
      + --- LABEL OPMENU $
      + --- IF MENU = 1 $
      + --- IF PROGFAIL = 0 THEN PRINT $
      + --- ENTER $
      + --- DISCONNECT ALL $
      + --- SET POWER UP DELAY FOR 200 MSEC $
      + --- SET POWER UP $
```

ListView: — 1404
Properties | Reports | Translation
ListView | XLate | File | Model Match XLate
SETUP POWER SUPPLY 1 ON ← 1520

FIG. 15B

Recycler Explorer

File  Edit  View  Help  Controls

TreeView:
```
+ --- Translation
- --- Translation Library
    --- ATLAS_To_ANSI_C
    + --- # <string>#$
    + --- BEGIN ATLAS PROGRAM <string>
    + --- DEFINE ARRAY <string>[<integer>]$
    + --- LET <string>$
    + --- PRINT <string>$
    + --- DISPLAY $
    + --- DISPLAY <string>$
    + --- ERASE DISPLAY $
    + --- SETUP CURSOR $
    + --- WAIT FOR MANUAL START $
    + --- WAIT FOR $
    + --- LABEL OPMENU $
    + --- IF MENU = 1 $
    + --- IF PROGFAIL = 0 THEN PRINT $
    + --- ENTER $
    + --- DISCONNECT ALL $
    + --- SET POWER UP DELAY FOR 200 MSEC $
    + --- SET POWER UP $
```

ListView:
Properties | Reports | Translation
ListView | XLate File | Model Match
File
Source ~1620

1652 — OPEN FILE
1654 — RECYCLE
1656 — RECYCLE ALL
1658 — HIGH SPEED RECYCLE
1660 — INSERT COMMENTS INTO DESTINATION
1662 — STOP ON MISS
1664 — COPY

Recycler Explorer
File  Edit  View  Help  Controls

TreeView:
+---SET VERIFY NUMBER TO <VALUE> $
+---IF ENG = 5 THEN CALL SELFTEST $
+---IF TST1 = <integer> THEN DISPLAY <string> $
+---GO TO <string_1> $
+---LABEL <string> $
+---CALL <string> $
- ---SETUP POWER SUPPLY <integer> ON $
   - ---[XLTR]
      +---RntStatus = IviPower_ConfigureDCV[iviPower_
      +---RntStatus = IviPower_ConnectOutPut[iviPower
+---SETUP POWER SUPPLY <integer> OFF $
+---SETUP POWER SUPPLY <integer> HOLD $
+---SETUP POWER SUPPLY <integer> TO-15000 MV AT 1000 M
+---SETUP POWER SUPPLY <integer> TO 15000 MV AT 1000 MA
+---SETUP POWER SUPPLY <integer> TO OFF $
+---CONNECT POWER SUPPLY <integer> TO <string> $
+---DISCONNECT POWER SUPPLY <integer> TO <string> $
+---SETUP DIGITAL MULTIMETER <integer> OHMS X1000 $
+---SETUP DIGITAL MULTIMETER 1 OHMS X1000 $ ListView:
Properties | Reports | Translation
ListView | XLate | File | Model Match
File
Destination ~1622

○ DESTINATION  ○ LOG

FIG. 17A

Recycler Explorer

File  Edit  View  Help  Controls

TreeView:
```
+---Translation
|  +---Translation Library
|     ---ATLAS_To_ANSI_C
|        +---# <string>#$
|        +---BEGIN ATLAS PROGRAM <string>
|        +---DEFINE ARRAY <string>[<integer>]$
|        +---LET <string>$
|        +---PRINT <string>$
|        +---DISPLAY $
|        +---DISPLAY <string>$
|        +---ERASE DISPLAY $
|        +---SETUP CURSOR $
|        +---WAIT FOR MANUAL START $
|        +---WAIT FOR $
|        +---LABEL OPMENU $
|        +---IF MENU = 1 $
|        +---IF PROGFAIL = 0 THEN PRINT $
|        +---ENTER $
|        +---DISCONNECT ALL $
|        +---SET POWER UP DELAY FOR 200 MSEC $
|        +---SET POWER UP $
```
— 822

ListView: — 1406

Properties | Reports | Translation
ListView | XLate | File | Model Match

File
```
195  CALL PSISO, IF FAIL $
196  LET NEG= 4 $
197  LET POS= 57 $
198  CONNECT DIGITAL MULTIMETER + TO J1-57$
199  CONNECT DIGITAL MULTIMETER - TO J1-4$
200  READ DIGITAL MULTIMETER 1 $
201  VERIFY DIGITAL MULTIMETER 1 LL 100 OHMS $
202  CALL PSISO, IF FAIL $
203  LET POS= 58 $
204  CONNECT DIGITAL MULTIMETER + TO j1-58$
205  READ DIGITAL MULTIMETER 1 $
206  VERIFY DIGITAL MULTIMETER 1 LL 100 OHMS $
207  CALL PSISO, IF FAIL $
208  LET NEG= 57 $
209  CONNECT DIGITAL MULTIMETER - TO J1-57$
210  READ DIGITAL MULTIMETER 1 $
211  VERIFY DIGITAL MULTIMETER 1 LL 100 OHMS $
```

*Recycler Explorer*

File  Edit  View  Help  Controls

TreeView:
```
+---SET VERIFY NUMBER TO <VALUE> $
+---IF ENG = 5 THEN CALL SELFTEST $
+---IF TST1 = <integer> THEN DISPLAY <string> $
+---GO TO <string_1>$
+---LABEL <string> $
+---CALL <string> $
----SETUP POWER SUPPLY <integer> ON $
      ----[XLTR]
      +---RntStatus = IviPower_ConfiguredCV[iviPower_
      +---RntStatus = IviPower_ConnectOutPut[iviPower
+---SETUP POWER SUPPLY <integer> OFF $
+---SETUP POWER SUPPLY <integer> HOLD $
+---SETUP POWER SUPPLY <integer> TO-15000 MV AT 1000 M
+---SETUP POWER SUPPLY <integer> TO 15000 MV AT 1000 MA
+---SETUP POWER SUPPLY <integer> TO OFF $
+---CONNECT POWER SUPPLY <integer> TO <string> $
+---DISCONNECT POWER SUPPLY <integer> TO <string> $
+---SETUP DIGITAL MULTIMETER <integer> OHMS X1000 $
+---SETUP DIGITAL MULTIMETER 1 OHMS X1000 $
```

1600, 1614, 822, 800

ListView:

Properties | Reports | Translation
ListView | XLate | File | Model Match

1406

File
Destination ~1622

○ DESTINATION   ○ LOG
1630            1632

Recycler Explorer
File  Edit  View  Help  Controls

TreeView:
+ ---Translation
- ---Translation Library
  ---ATLAS_To_ANSI_C ~ 1410
  + ---# <string>#$
  + ---BEGIN ATLAS PROGRAM <string>
  + ---DEFINE ARRAY <string>[<integer>]$
  + ---LET <string>$
  + ---PRINT <string>$
  + ---DISPLAY $
  + ---DISPLAY <string>$
  + ---ERASE DISPLAY $
  + ---SETUP CURSOR $
  + ---WAIT FOR MANUAL START $
  + ---WAIT FOR $
  + ---LABEL OPMENU $
  + ---IF MENU = 1 $
  + ---IF PROGFAIL = 0 THEN PRINT $
  + ---ENTER $
  + ---DISCONNECT ALL $
  + ---SET POWER UP DELAY FOR 200 MSEC $
  + ---SET POWER UP $ ListView:
Properties | Reports | Translation
ListView  XLate  File  Model Match
File 6 DEFINE COMMON PROGID $
7 DEFINE COMMON PROGFAIL $
8 DEFINE COMMON ENG $
9 DEFINE COMMON PNO $
10 DEFINE COMMON DGDLY $
11 EQUATE PA1-19=1 , PA1-20=2 , PA1-21=3 , PA1-22=4 , PA1-23=5 , PA1-24=6 $
12 EQUATE PA1-25=7 , PA1-26=8 , PA2-10=9 , PA2-6=10 , PA2-7=11 , PA1-69=12 $
13 EQUATE P1-75=13 , P1-96=14 , P1-84=15 , P1-49=15 , P1-26=16 , P1-52=17 $
14 EQUATE P1-5=18 , P1-50=19 , P1-36=24 , P1-63=28 , P5VDC=41 , N5VDC=42 $
15 EQUATE P15VDC=43 , N15VDC=44 , P1-41=45 , GND=46 , PA2-5=47 , IDR=48 $
16 EQUATE P1-37=30 , P1-65=51 , P1-13=23 , P1-51=23 , P1-26=26 $
17 EQUATE P1-33=21 , P1-34=20 $
22 SET VERIFY NUMBER TO 401 $
23 LET FAIL = 0 $
24 LET TST = 0 $
25 CONNECT COUNTER A TO PA2-7 $
26 SETUP COUNTER 1 PERIOD TO .1 USEC $

Recycler Explorer

File  Edit  View  Help  Controls

TreeView:

```
+---SET VERIFY NUMBER TO <VALUE> $
+---IF ENG = 5 THEN CALL SEFTEST $
+---IF TST1 = <integer> THEN DISPLAY <string> $
+---GO TO <string_1> $
+---LABEL <string> $
+---CALL <string> $
.---SETUP POWER SUPPLY <integer> ON $
  ---[XLTR]
    +---RntStatus = IviPower_ConfiguredCV[IviPower_
    +---RntStatus = IviPower_ConnectOutPut[IviPower
+---SETUP POWER SUPPLY <integer> OFF $
+---SETUP POWER SUPPLY <integer> HOLD $
+---SETUP POWER SUPPLY <integer> OFF $
+---SETUP POWER SUPPLY <integer> TO -15000 MV AT 1000 M
+---SETUP POWER SUPPLY <integer> TO 15000 MV AT 1000 MA
+---SETUP POWER SUPPLY <integer> TO OFF $
+---CONNECT POWER SUPPLY <integer> TO <string> $
+---DISCONNECT POWER SUPPLY <integer> TO <string> $
+---SETUP DIGITAL MULTIMETER <integer> OHMS X1000 $
+---SETUP DIGITAL MULTIMETER 1 OHMS X1000 $
```

— 1614 (TreeView annotation)
— 822

ListView:

Properties | Reports | Translation
ListView | XLate | File | Model Match

File

```
Recycler Log ()
25 CONNECT COUNTER A TO PA2-7 $
26 SETUP COUNTER 1 PERIOD TO .1 USEC $
27 CONNECT LTU IN TO 1,11111 $
28 LOAD PATTERN 1,00000 $
30 READ COUNTER 1 $
32 VERIFY COUNTER 1  LL 345.1 USEC  HL 347.2 USEC $
34 CONNECT LTU IN TO 1,0 $
36 READ COUNTER 1 $
```

○ DESTINATION  ⊙ LOG — 1632

| | A | B | C | D | E | F | G | H |
|---|---|---|---|---|---|---|---|---|
| 381 | 88000 | CONNECT | (SHORT) | CNX FROM J40-K TO J40-L $ | | | | |
| 382 | 10 | CONNECT | (RES) | IMPEDANCE | RES MAX 150 OHM | VOLT-LMT 5 V | CURRENT CNX HI J40-b LO J4 |
| 383 | 10 | CONNECT | (RES) | IMPEDANCE | RES MAX 150 OHM | VOLT-LMT 5 V | CURRENT CNX HI J40-i LO J4 |
| 384 | 30 | READ | (RES) | IMPEDANCE | RES MAX 150 OHM | VOLT-LMT 5 V | CURRENT CNX HI J40-b LO J4 |
| 385 | 30 | READ | (RES) | IMPEDANCE | RES MAX 150 OHM | VOLT-LMT 5 V | CURRENT CNX HI J40-i LO J4 |
| 386 | 30 | WAIT FOR | 150 SEC BEFC | 264 SEC BEF OF 342 SEC BEFORE STEP 095001 $ | | | | |
| 387 | 10, 60, 60, 60 | DISCONNECT SHORT | | CNX FROM J40-K TO J40-L $ | | | | |
| 388 | | $ | | | | | | |
| 389 | 60, 20, 50, 20 | GO TO | STEP 099000$ | | | | | |
| 390 | 40, 099201, 30 | GO TO | STEP 100000$ | | | | | |
| 391 | 40, 100101, 200 | GO TO | STEP 999500$ | | | | | |

Test Strategy Report

UUT: 5p04110
11-Aug-99
Page 1 of 26

Test Number: 1

SETUP.

Modifiers: SIGNAL CONDITIONER GAIN 12.64 D8

CNX: FROM / TO — JPS IN JSY IN / J4D-S J4D-T

SETUP.

Modifiers:
LOGIC DATA
FORMAT SNR 15 BIT
TYPE SERIAL-MS8-FIRST
FREQ-ZERO 0HZ
FREQ-ONE 1 HZ
FREQ-Q UIES 1 HZ
BIT-RATE 1 E3 BITS/SEC
VOLTAGE 'VLT-HI' MAX 0.03 V
VALUE 'VALUE'

CNX: H1  RFJ9

SETUP.

Modifiers:
LOGIC DATA
FORMAT SNR 15 BIT
TYPE SERIAL-MS8-FIRST
FREQ-ZERO 0HZ
FREQ-ONE 1 HZ
FREQ-Q UIES 1 HZ
BIT-RATE 1 E3 BITS/SEC
VOLTAGE 'VLT-LO' MAX 0.03 V
VALUE 'VALUE'

CNX: H1  RFJ9

SYNC WHEN.  GE  'TRIGGER'  V

Modifiers:
(VOLTAGE)
AC SIGNAL
VOLTAGE MAX 9 V
FREQ 1 HZ
MAX-TIME 3 SEC
POS-SLOPE

CNX: H1  J10-90

FIG. 30  3000

000
SOFTWARE REHOSTING SYSTEM AND METHOD

FIELD OF THE INVENTION

In one aspect, this invention relates to a software analysis and rehosting system and method that automatically converts a computer program in a particular computer program dialect to another computer program dialect that can be a different version of the same dialect, or an entirely different dialect, or the same dialect, but for use on a different hardware platform. In another aspect, the invention relates to a software system and method that can be used to generate a translation model that would be used to convert a computer program in a particular dialect to another computer program in the same, related or different dialect. In still a further aspect, the invention relates to a software analysis system and method that analyzes an input computer program and generates a report. Thus, In general, the present invention relates to a computer software system, equipment, method and computer program which can be used by, among others, those in the automated test and measurement industry for rehosting, for analyzing and generating reports, and for creating a translation model.

BACKGROUND OF THE INVENTION

With the world approaching the millennium, very valuable computer software written decades ago has become antiquated as new hardware has been developed and as software theories and management theories have changed. One area of software that has been greatly affected by these changes is the area of test programs (TP's). These are a class of extremely valuable software programs grouped with interfacing hardware and associated documentation to form a Test Program Set (TPS). TPS's are used with very expensive Automatic Test Equipment (ATE) hardware and software systems that have been built to test electronic components. A TPS is used to operate and control testing and monitoring equipment for the electronics test industry in support of the aerospace, defense, automotive, and telecommunications industries. These programs often contain tens of thousands of lines of code and have been written in computer languages which have been in existence for almost half a century. This class of so-called legacy program code is written in such languages as ATLAS, BASIC, JOVIAL, FORTRAN, etc.

In the field of aviation electronic test systems, there is a maintenance hierarchy which supports avionics testing. The first level of test is incorporated into the electronic module or Line Replaceable Unit (LRU) and is called a Built In Test (BIT). If an electronic module's BIT detects an error, the module is checked at a flight line with organizational-level test equipment to check out the problem, and then removed and replaced from the aircraft if confirmed to be faulty. The defective module is then taken to an intermediate-level ATE station for testing by a test station. The intermediate-level test system performs extensive testing to identify and isolate any failed circuit cards in the module. Faulty circuit cards are removed and replaced and the module is returned to operational condition for use in the aircraft. Faulty circuit cards, which were identified and removed as part of module testing are shipped to a regional repair center which has depot-level test equipment. The repair center tests the failed circuit card to identify and isolate any failed components. Faulty components are then removed and replaced, and the circuit card is repaired to an operational condition and returned for use again. A typical, conventional test station, depicted in FIG. 1 at 130, is shown in a schematic block diagram. A Unit Under Test (UUT) 132 is connected to test station 130 by a connector 134. Unit Under Test 132 can be, for example, electronic equipment from an aircraft or missile. Test station 130 runs an appropriate TPS, which is depicted at block 136.

Connector 134 is schematically shown in FIG. 1 as a cable, but more likely it would simply be a hardware connector unit having a highly configured arrangement. One of the problems with older systems is that the standardized hardware connector has changed. In an overly simplistic example, it would be similar to trying to plug a newer three-pin electric wire connector having a grounded pin into an older electric wall socket only having two pins. In the hardware connectors, there is also the problem that the newer connectors use different "pin outs," or arrangement of connector pins. Testing of the equipment involves among other thing the application of test current and voltage signals. If the pin arrangement is not properly considered when these signals are being applied, it could be fatal to the equipment. TP's control among other things the application of these test signals and thus a legacy TP can be pin specific.

Test station 130 is typically comprised of conventional, but usually specialized, computer hardware, depicted as block 140 and run by conventional system software shown as block 142. In a conventional test station, computer hardware could be a Pentium based computer running a modern Commercial Off The Shelf or COTS system software (e.g. Microsoft Windows NT operating system). A software interface 144 is connected to computer hardware 140, and can be as simplistic as specific drivers for other hardware equipment, such as drafting equipment or printers. Test station 130 also includes a hardware specific interface 146 that must correspond to connector 134 so that they can be plug and pin compatible. Finally, test station 130 includes a plurality of instruments 148, such as a Volt-Ohm Meter (VOM), that can be controlled by software and can be selectively connected to the UUT and selectively read and used by the TPS.

A TPS typically includes very expensive software. For example, in the military aircraft industry, where these systems must emulate an entire aircraft in order to test the electronic units, often the cost to develop a single test program may be several hundred thousand dollars.

Now with a dwindling defense budget and an increased availability of lower cost commercially based test instruments utilizing components based on VXI/PXI technology, re-hosting of legacy Test Programs (TPs) onto new test platforms is an attractive alternative to writing new software. An example of a management theory that has changed is the desire to switch from specially created software languages to COTS software environments. These changes have created an overwhelming task of migrating existing software written in one language or dialect to new test platforms which support different languages and dialects. As used herein, in order to avoid the difficult task of deciding whether two computer programs are of different versions of the same language or are of two different languages, the term "dialect" means a computer language or a version of a computer language.

Current practice is to migrate legacy test programs to modern industry leading commercially available programming environments. In this way major industries such as the military and avionics industries can take advantage of COTS tools for building their new test systems. These tools include PC plug-in boards, VXI/IVI plug-play instrument drivers, and LabVIEW and LabWindows/CVI test software tools, etc. This migration affords the industries the benefits from the high volumes, lower prices and better worldwide compatibility and support that are common with COTS tools. Unfortunately, any migration to modern programming environments has to consider either rewriting very valuable legacy computer software or manually converting it, both prospects being extremely time consuming and expensive because of the magnitude of the task. Thus, there is a need for a conversion tool that can accept legacy software (e.g., ATLAS, BASIC, JOVIAL, and FORTRAN), and produce software in a language or dialect that is compatible with the modern software environments (e.g., LabWindows/CVI, LabVIEW,Visual Basic, Visual C++, and new version of ATLAS).

Another current need is the ability to substitute or swap out one test instrument for either a similar one or an different version of the current one without expensive reprogramming of the affected TPS. As used herein, the term "test instrument" means any item that is used in the testing of an electronic unit and is controllable by software. Test instruments include: a Volt-Ohm Meter (VOM); a digital multimeter (DMM); an oscilloscope; a spectrum analyzer; an arbitrary wave form generator; an optical bench used to test a head-up display (HUD, a display that is in the field of view of a viewer who is looking straight ahead); a power supply; a relay; and a switch. As such, analysis and reporting of the legacy code is desired to derive the requirements for measurement or stimulus required by the replacement instrument.

It is now also desirable to use more modern computer languages in which to write TP's (e.g. LabWindows/CVI, LabVIEW, Visual Basic, Visual C++ and new versions of ATLAS). Thus, there is also a need both to retain the capabilities of the legacy test programs and to migrate the legacy code to the modern languages.

There are some prior art United States patents which also discuss the aforementioned situation and problems, and which propose solutions. One type of solution is to convert the legacy test program from one dialect to another. Such conversion is usually called translation, recycling or rehosting. Examples of such patents which disclose prior art software rehosting systems include the following: U.S. Pat. No. 5,678,044 (1997) to Pastilha et al.; and U.S. Pat. No. 5,768,564 (1998) to Andrews et al., all incorporated in their entirety herein by reference.

SUMMARY OF THE INVENTION

The present invention overcomes the foregoing deficiencies and inadequacies of the prior art while providing a user friendly, interactive environment and tool that can be used to import, model, provide metrics data and convert code in one dialect to a new dialect in accordance with predefined criteria, and can be used to produce reports about a computer program in the source code version.

Accordingly it is an object of the present invention to provide an improved software rehosting system and method that overcomes the deficits and inadequacies of the prior art. In general and without limitation, it is an object of the present invention to provide a system that supports modeling of legacy and target dialects, such a system being able, for example, to extract test information from Test Program (TP) source code written in a legacy language/dialect (e.g., old versions of ATLAS, Ada, ANSI C, BASIC, and L200) and target it to a new Automatic Test Equipment (ATE) employing a modern programming language (e.g., LabWindows/CVI, LabVIEW, Visual Basic, Visual C++ and new versions of ATLAS). It is also an object of the present invention using the same software rehosting system to provide reports of statistical information about the input computer programs and to provide formatted outputs of the input computer programs to other conventional application programs such as spread sheet computer programs and flow charting computer programs.

The present invention provides multi-lingual support capability, and can be customized by the user. It provides an intuitive user-friendly graphical interface so that the user can model both legacy and target ATE languages and dialects, and can create translation models upon which the TPS code conversion is based. The present invention is also capable of identifying any code not resolved during the rehosting process. The present invention, in a specific embodiment thereof, automatically generates TPS metrics reports directly from the Test Program source code. These reports help the test engineer get detailed insight and understanding of the Test Program to facilitate TPS re-host activities. These reports can also be generated for newly generated Test Programs to assist in the technical/Quality Assurance review process for new TPS's as well.

Accordingly, the present invention facilitates the re-hosting of a test program from one dialect to another based on user definable and extensible models. The present invention implements ActiveX technology which permits easy implementation into new application designs and allow such designs to be Internet web enabled while providing multi-platform support for ANSI-C, Visual Basic (VB), and Internet Explorer, to name just a few well known commercial programs. The present invention is much more than a translation tool, it is also a development tool that can be defined by the user. Models are defined by using a tree structure, place holders (i.e. variables) that are keyed to the specific program location of the source and target code that is to be preserved, and the user is given the ability to run specified routines at any model element level for automatic extensibility.

A specific embodiment of the present invention is object oriented with the capability to update, change and develop objects. This embodiment is user definable at the model level and utilizes user-developed routines in VB script format which can be stored on the user's computer or network and selectively used for translation and reporting purposes. As such this embodiment can be used on more than one program. Building of a translation model can be done either manually or automatically utilizing a unique auto-model capability. A translation window is exposed to the user to permit easy model building and verification. Once the model is built using user selected exemplary code, the model can be used in an automatic mode to quickly convert all similar code, whether in the same program or in other programs written in the same dialect.

According to one specific embodiment of the present invention, there is provided an improved method for rehosting a legacy source code computer program having a plurality of statements of code separated by corresponding delimiters and a plurality of elements in each statement separated by a separator. The rehosting method includes entering said legacy computer program into a database stored in a computer memory; parsing said legacy computer program by removing said delimiters and storing each statement of code in a computer identifiable section of said data base; parsing each statement of said legacy computer program by removing said separators and storing each element in a computer identifiable portion of the statement section in said database; utilizing an object oriented computer program to display on a computer monitor a split screen presentation, said split screen having a plurality of parts, in which one part of the split screen has a tree view and another part of the split screen has a list view; displaying in said tree view each element of parsed code as a branch and displaying each statement in each line as a collapsible sub-branch if additional elements exist; selecting a desired target language dialect; utilizing identifiers in said legacy computer program and said selected target language dialect, selecting a corresponding translation program from a translation library; utilizing said translation program, selecting a predefined statement in said translation program that corresponds with each statement and both storing said corresponding predefined statement in a target section of said database and displaying it in said list view part of said split screen in a corresponding line presentation; and repeating said statement selecting and said storing and displaying steps for each parsed statement of legacy computer program until completed for said legacy computer program; whereby said predefined statements comprise a target language version of said legacy computer program that has been stored so that it can be independently run and displayed so that it can be visually checked line by line with said legacy computer program.

The above and other objects and advantages are accomplished in accordance with the present invention by providing an improved software rehosting system and method as described in the following description and drawings, which also set forth, or would be obvious from, additional objects, advantages and features.

BRIEF DESCRIPTION OF THE DRAWINGS

FIGS. 8 through 31 are screen displays captured from a video monitor of a computer hardware system running a computer program written in Visual Basic according to the present invention and as depicted in FIG. 2, in particular:

FIG. 8 is a captured screen display depicting the basic Visual Basic form for the present computer program in which the Properties tab has been selected before a legacy program or a translation program has been loaded;

FIG. 9 is the captured screen display of FIG. 8 with an overlay of a pop-up menu window that resulted from a right click of a mouse button;

FIG. 10 is the captured screen display of FIG. 9 after the Open menu item in the pop-up menu window has been clicked;

FIG. 11 is the captured screen display that results when a file or a project highlighted in FIG. 10 is selected, the display depicting a pop-up Import Options window, wherein selectable import options are shown in a left hand list box and previously selected options are shown in a right hand list box;

FIGS. 14A and 14B (collectively referred to as FIG. 14) are a captured screen display which is similar to FIG. 13, but with the Translation tab, and the ListView sub-tabs selected;

FIGS. 15A and 15B (collectively referred to as FIG. 15) are a captured screen display similar to FIG. 13, but with the Translation tab and the Xlate sub-tab selected;

FIGS. 16A and 16B (collectively referred to as FIG. 16) are a captured screen display similar to FIG. 15 with the Translation tab selected, but with the File sub-tab selected, and after a pop-up window having been called by clicking the right mouse button with the cursor in the Source text box;

FIGS. 17A and 17B (collectively referred to as FIG. 17) are the captured screen display of FIG. 16 after a legacy file to be rehosted has been loaded;

FIGS. 18A and 18B (collectively referred to as FIG. 18) are the captured screen display of FIG. 17 after a pop-up window has been called by clicking the right mouse button with the cursor in the Source text box with the menu item Recycle All highlighted;

FIGS. 19A and 19B (collectively referred to as FIG. 19) are the captured screen display of FIG. 18 after the rehosting process has been completed on a file selected in FIG. 16;

FIGS. 20A and 20B (collectively referred to as FIG. 20) are the same captured screen display as FIG. 19, except that the Log option box has been selected;

FIG. 21 is a captured screen display similar to FIG. 9, except with the Reports tab, and the Quantity sub-tab selected;

FIG. 22 is a captured screen display similar to FIG. 21 with the Reports tab selected, but with the User Defined sub-tab selected;

FIG. 23 is a captured screen display similar to FIG. 21 with the Reports tab selected, but with the Signal Concurrency sub-tab and the Properties sub-sub-tab selected;

FIG. 24 is a captured screen display similar to FIG. 21 with the Reports tab selected, but with the Signal Concurrency sub-tab and Concurrency sub-sub-tab selected and depicting the drop-down menu resulting from a right click with the mouse cursor in the Concurrency window;

FIG. 25 is a captured screen display similar to FIG. 24 with the Reports tab and the Signal Concurrency sub-tab and Concurrency sub-sub-tab selected, but after the Concurrency program has been run;

FIG. 26 is a captured screen display similar to FIG. 8 showing the pop-up menus obtained by placing the cursor in the Tree View window and right clicking on the mouse;

FIG. 27 is a captured screen display of part of a tree view of a Signal Range Report of a text file of a typical Test Program made by using the present invention;

FIGS. 27A and 27B (collectively referred to as FIG. 27) are a captured screen display of part of a grid view of a Signal Range Report of the text file of the Test Program used in FIG. 27;

FIG. 28 is a captured screen display of a Signal Quantity Report developed by using the screen depicted in FIG. 21;

FIG. 29 is a captured screen display of a flow chart report developed by using the TPS Flow Chart menu item in the screen depicted in FIG. 26;

FIG. 30 is a captured screen display of a test strategy report developed by selecting the Test Strategy sub-tab under the Reports tab, which are shown for example using the screen depicted in FIG. 22;

FIG. 31 is a captured screen display of a Signal Concurrency Report developed by using the screen depicted in FIG. 25;

DETAILED DESCRIPTION OF THE PREFERRED EMBODIMENT

Figure 1:
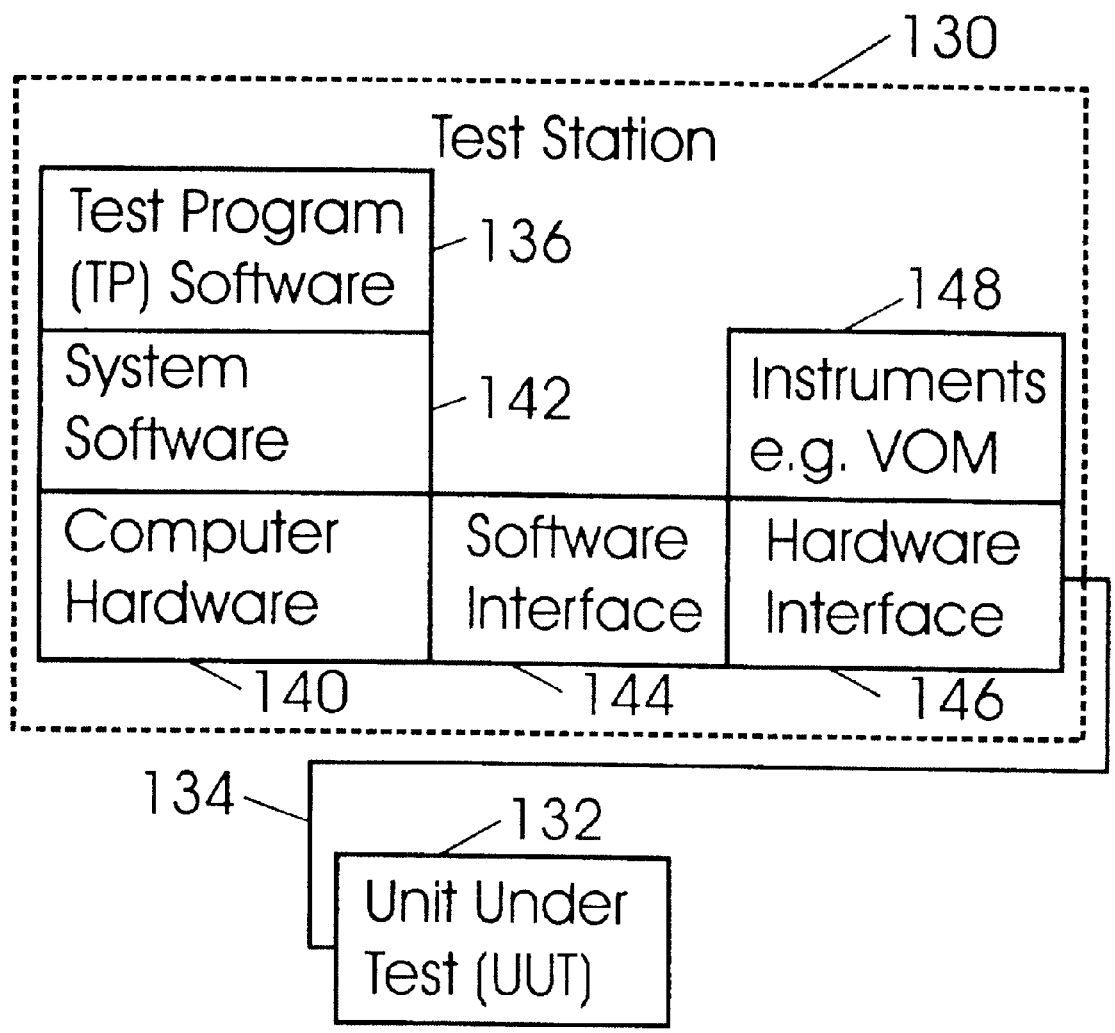
FIG. 1 is a schematic block diagram depicting a typical test station that utilizes a Test Program Set for testing a piece of electronic equipment from an aircraft or missile.
Figure 2:
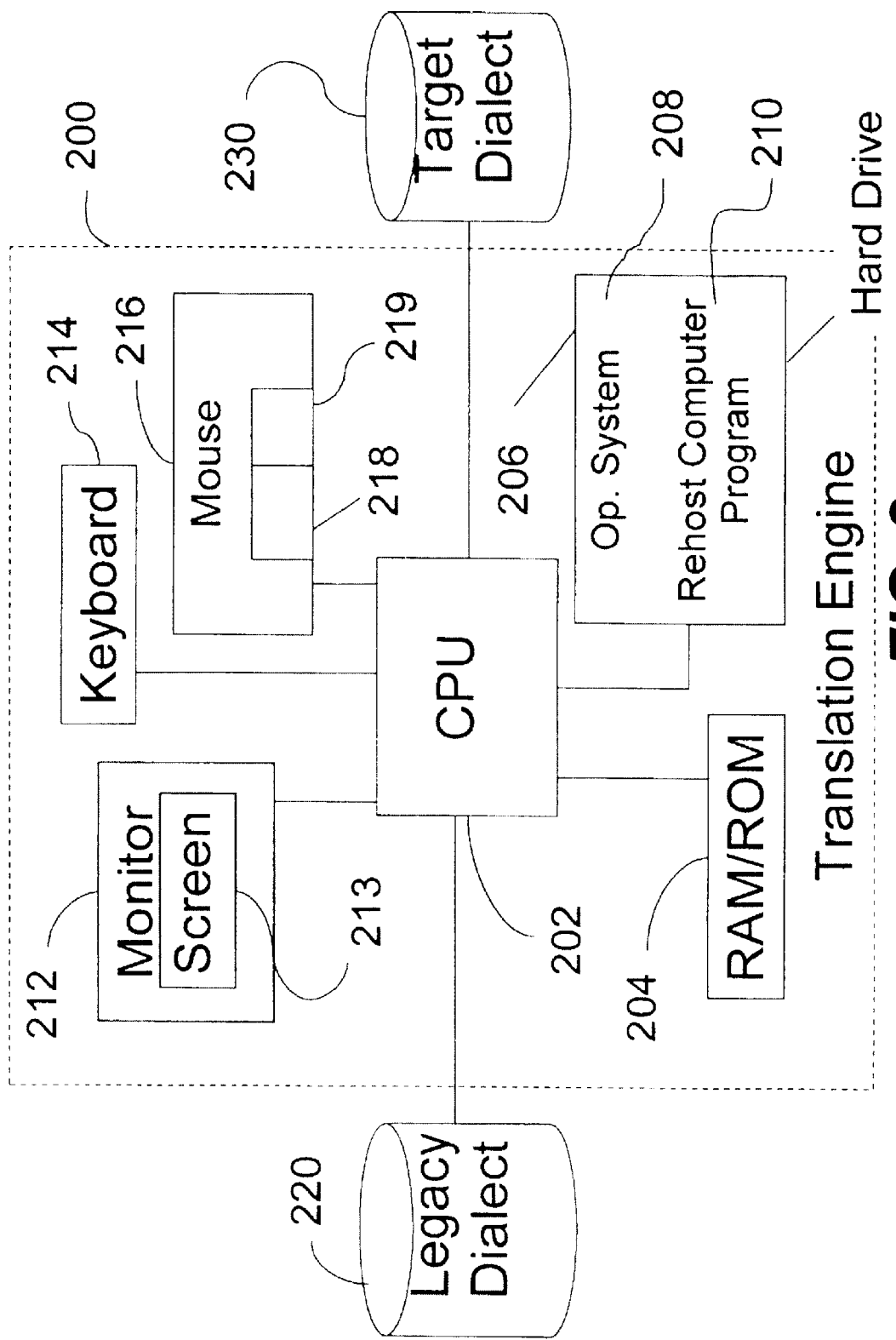
FIG. 2 is a schematic block diagram of a computer hardware system that translates a source program to a target program using a translator computer program according to the present invention.

With reference now to the drawings wherein like numerals represent like elements throughout the several views and wherein the numbers of the elements in any figure that are first encountered at that figure are numbered using that figure's number as the leading digits of those numbers, and in particular with reference to FIG. 2, the present invention is depicted as a hardware system. In particular, a rehosting system is depicted as including a translation engine 200 having a CPU 202 as the central component. In a presently preferred embodiment, translation engine is a microcomputer. Tied to CPU 202 are a conventional static or chip memory 204 and a conventional hard drive 206. Loaded onto hard drive 206 are a conventional operating system 208 and a rehost computer program 210, sometimes referred to as just "rehost program 210," according to the present invention. Also tied to CPU 202 are conventional output devices such as a monitor 212 having a screen 213, and conventional input devices such as a keyboard 214 and a mouse 216 having a control left button 218 and a pop-up menu initiating right button 219, all being schematically shown in FIG. 2. The program to be translated is denoted a Source or Legacy Dialect and is schematically depicted in FIG. 2 as being loaded on a memory device 220. The converted program is called a target dialect and it is schematically depicted in FIG. 2 as being loaded on a memory device 230. Memory devices 220 and 230 are shown as being outside translation engine 200, but in reality, this configuration may be more virtual and physically memory devices 220 and 230 can a floppy disk, a removable hard drive or even can be part of hard drive 206.

As is well known today, when mouse 216 is moved on a hard horizontal surface, a cursor (not shown) is positioned or moved on screen 213. When mouse left button 218 is depressed with the cursor positioned at a certain location on screen 213, sometimes referred to hereinbelow as "left clicked," a control signal is given to the particular program that is being run and is interpreted by that program based upon the location of the cursor.

In a presently preferred embodiment of the invention, a hardware system includes CPU 202 as a minimum being a Pentium 90 CPU or equivalent with a Pentium 200 or higher being recommended. Chip memory 204 should be at least 32 Megabytes with 64 Megabytes being preferred. Hard drive 206 can be any one of the commercially available sizes so long as it can accommodate at least 130 Megabytes for operating system 208 and rehost program 210. Monitor 212 should have a definition of at least 800×600 pixels with 256 colors and be driven by an SVGA or better video monitor card (not shown).

The software of the presently preferred embodiment, as described above, includes operating system 208 and rehost program 210. In the presently preferred embodiment, operating system 208 is Microsoft Windows 98, but it could just as well be Microsoft Windows 95 or Microsoft Windows NT version 4.0 and above. Rehost program 210 was written in Microsoft Visual Basic.

As is well known to those skilled in the art, Visual Basic is a development computer program that permits a developer to produce object oriented computer programs that can be compiled by Visual Basic into a stand alone, executable applications program. An object oriented computer program is software that produces a number of individual and linked screens that are seen on screen 213 of monitor 212. Examples of such screens are shown in FIGS. 8–26. It is noted that in Visual Basic, a special meaning is given to several commonly used words. For example, the words "routine" or "subroutine" used in procedural-type languages such as FORTRAN, is generally replaced by the word "method." In visual Basics, a method is a special statement that performs an action or a service for a particular object in a program. It also refers to the command used to change an object. The word "object" means a programmable user interface element and includes a "control" that is added to a form or screen presentation. ***Examples of an object is a box on a form which produces a certain result when the mouse cursor is placed on top of it and the left mouse button clicked. A "control" is a standard set of computer codes that are used to create objects and produce a particular action when the object is invoked, for example, by clicking on it with left mouse button 218. The special meaning of terms used in Visual Basic are explained and defined by any one of numerous publications, such as Halvorson, "Learn Visual Basic 6.0 Now" (Microsoft Press, 1999), incorporated herein by reference.

Unfortunately, some of the terms used in Visual Basic can cause confusion when used in a patent application. Thus, the word "method" can be ambiguous. In this application, when needed to avoid ambiguity, the patent term "process" is used instead of "method" and the Visual Basic term "statements" is used instead of "method."

As is now well known, Visual Basic produces an interactive form on the computer monitor screen 213. The movement of mouse 216, or other pointing device such as a touch pad or pointing stick, common on laptop computers, positions a cursor (not shown) on monitor screen 213. Operating system 208 tracks the position of the cursor and when mouse left button 218 is clicked, an event initiating signal is provided to CPU 202 and to operating system 208. The position of the mouse cursor is then correlated with the particular method or statements of rehost program 210 that is initiated at that cursor position, and that method is then run. Thus, rehost program 210 is an event generated computer program, that is a computer program that waits until an event occurs which will trigger the running of one or more methods of that program.

Figure 3:
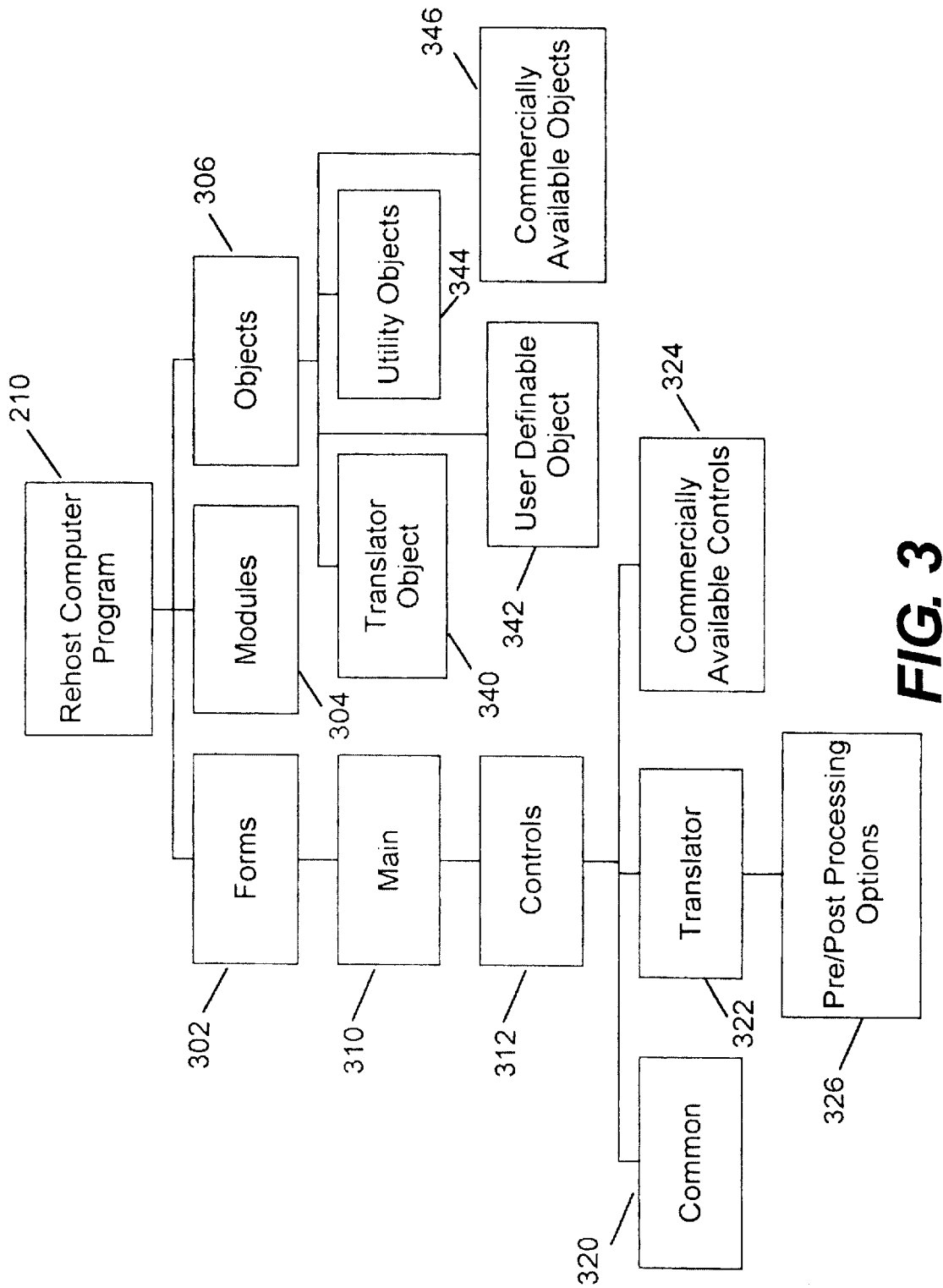
FIG. 3 is an overall schematic block diagram of the translator computer program according to the present invention.

With reference now to FIG. 3, there is depicted a system block diagram of rehost program 210 in accordance with the present invention that includes as a top level rehost program 210. Rehost program 210 is an object oriented program that includes initialization and setup statements and calls for implementing the methods in the remaining elements depicted in FIG. 3. The second level of the rehost program is comprised of three main sections indicated by a forms section 302, a modules section 304 and an objects section 306. Forms section 302 contains top level GUI's (Graphical User Interfaces) that are used for the visual presentation on monitor 212. Modules section 304 contains a plurality of methods required to support the operation of top level rehost computer program 210. In object orient programming there is a concept of self containment of each of the modules, but the top level rehost program 210 is not completely self contained and therefore utilizes subroutines contained in module section 304. Objects section 306 contains a plurality of objects, which essentially is a library of methods that are used by rehost program 210.

Forms section 302 includes a main form 310 that is comprised of controls which are selectively used to fill in a portion of the user interface. Main form 310, in turn, is comprised of a module of individual controls 312, that is comprised of common controls 320, translator controls 322 and commercially available controls 324. Common controls 320 are a collection of general purpose controls for use by other controls or applications. An example of general controls is a control that is used to create a window that would appear, for example, to give an alternate view of a tree so as to create relationships between items from multiple lists. Another example is a page control that provides up to a design number of separate pages to organize and group controls together or to provide a clean arrangement for a complex interface. Translator controls 322 are specialty controls that provide specific views that can be called by a user or the translator control. Example of the views from the translator controls are seen in FIGS. 14 through 20 and are discussed later. Included within translator controls 322 are Pre/Post Processing Options controls 326. Controls 326 provide a view that is used during a preprocessing or post-processing operation to select which one of the options and sequence of available methods that is to be included under a selected window. The preprocessing and post-processing operations are discussed hereinbelow. Commercially available controls 324 are those obtained from a commercial vendor, an example of which would be the Microsoft common dialog control.

Objects 306 includes a translator object 340 that contains all methods required to support translator control 322. Examples of such methods are formatting a string of source code written in higher level languages such as C. It contains the algorithms used for matching the legacy dialect to the translation model. Also included within objects 306 are user defined objects 342 that allow the end user to enhance the translator object, utility objects 344 which is a library that contains a set of general-purpose utility objects for use by class objects, and commercially available objects 346 that are obtained from commercial vendors, an example of which would be Visual Basic for applications.

Figure 4:
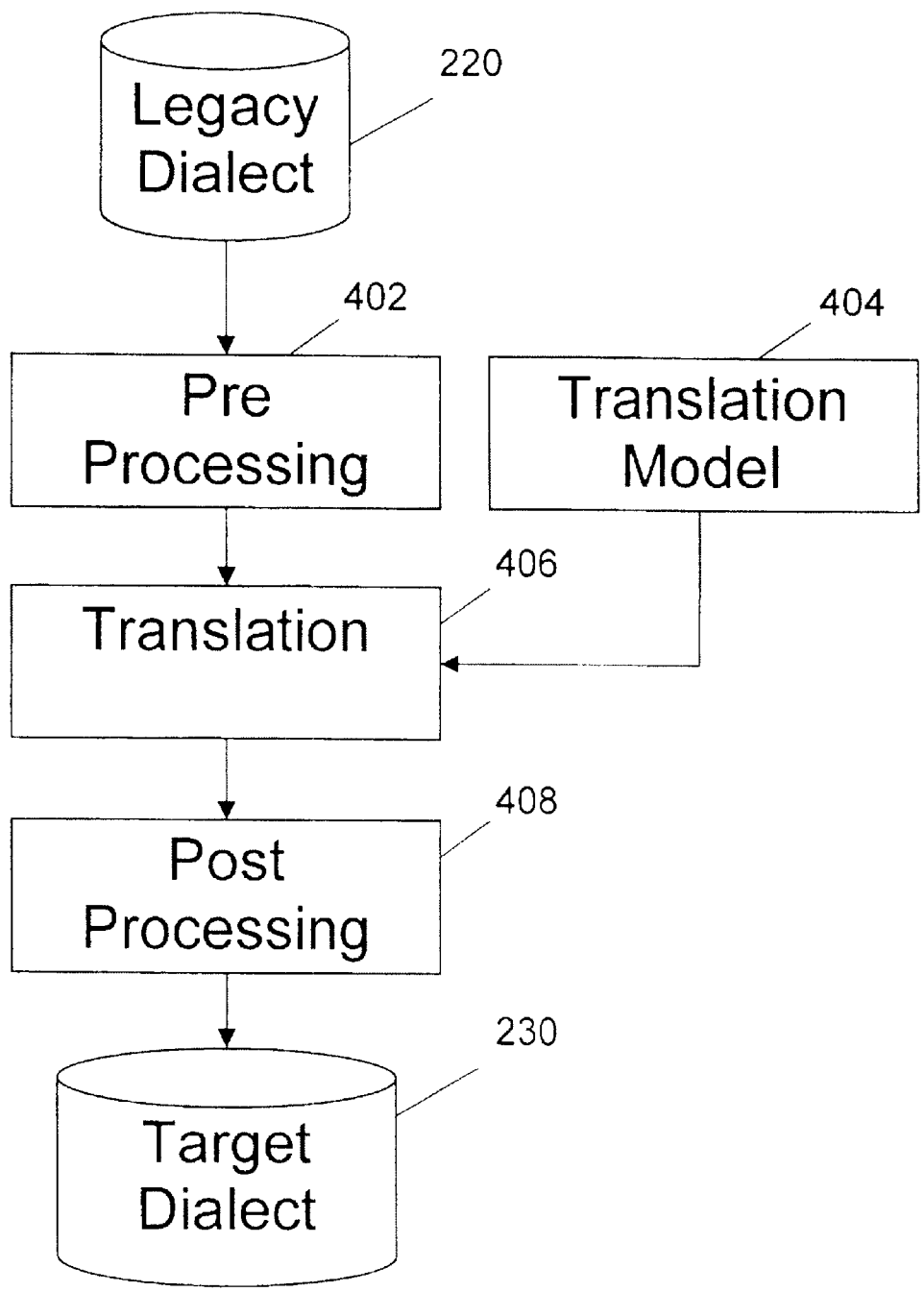
FIG. 4 is an overall system flow chart of a computer program according to the present invention that translates a legacy code of a known dialect into a known target dialect using a translation model that had been previously populated according to the present invention.
Figure 18A:
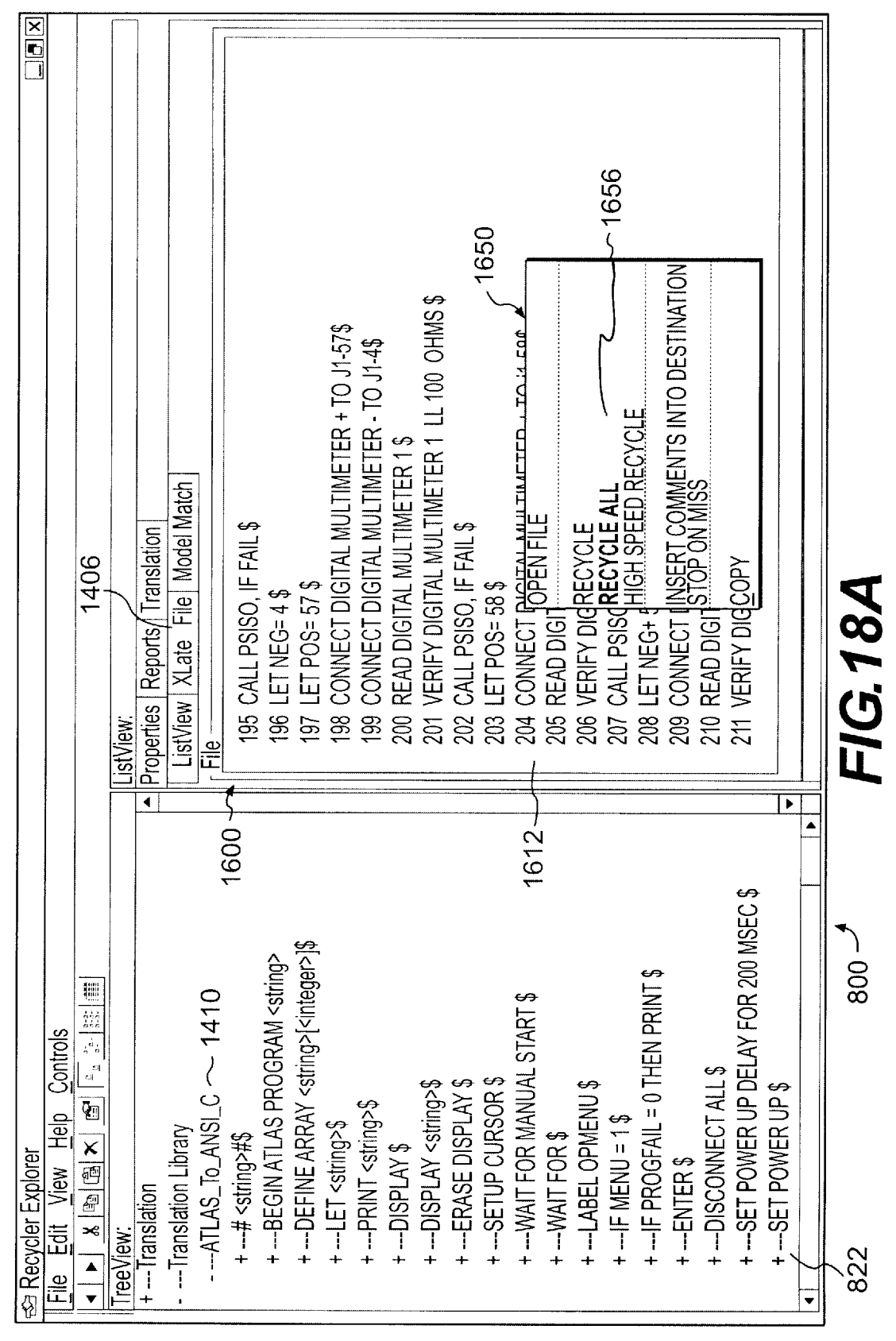

Depicted in FIG. 4 is the basic flow chart for translating a legacy test program, such as legacy dialect 220, into a target dialect, such as target dialect 230. An example of legacy dialect 220 is a test program written in ATLAS and depicted in FIG. 18, as described hereinbelow. As shown in FIG. 18, the Test Program has a plurality of statements which are ended or terminated by a delimiter which for this ATLAS dialect is a dollar sign ($), and within a statement has a plurality of separators that separate an element of a line of code, which for this ATLAS dialect is a comma (,), such as shown at line 195. Other languages and dialects use other delimiters and separators. For example, the language C uses a semicolon as its delimiter and uses a comma as its separator. Other separators in other dialects are a space, a semicolon and a tilde.

Figure 12A:
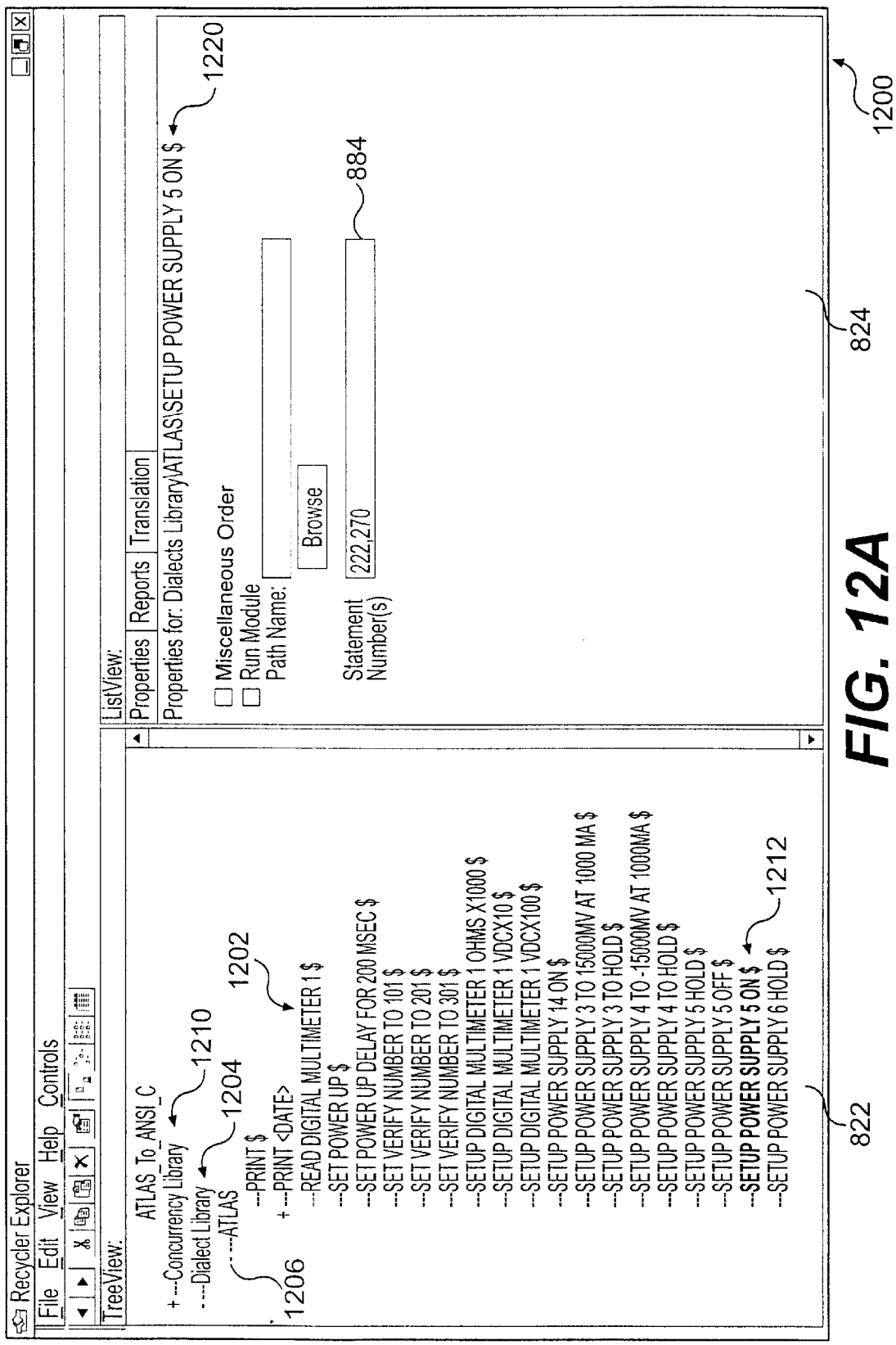
FIGS. 12A and 12B (collectively referred to as FIG. 12) are a captured screen display of FIG. 8 after the selected program(s) has/have been loaded and parsed and displayed in a tree view in the left hand tree view control.
Figure 12B:
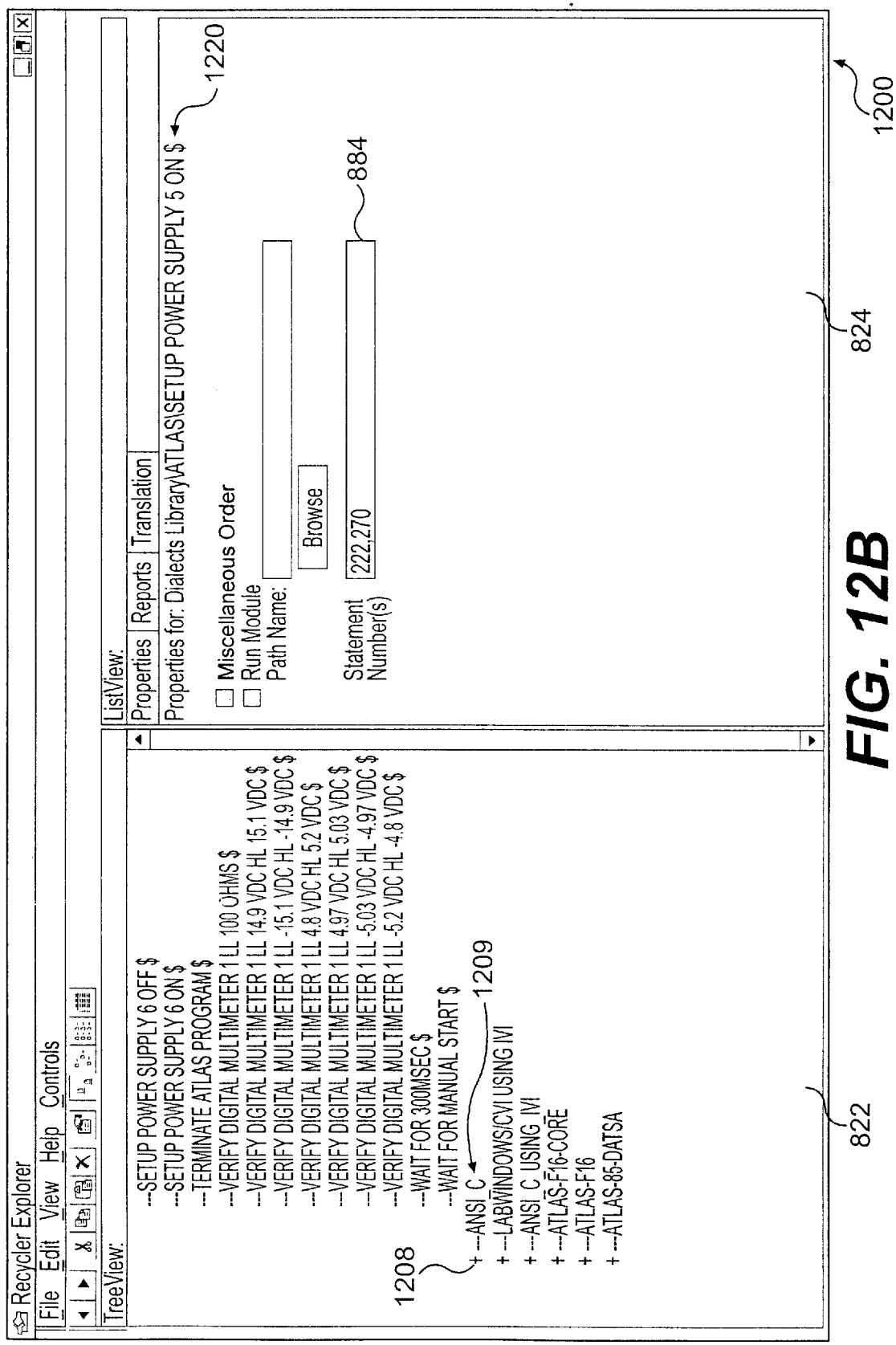
Figure 14A:
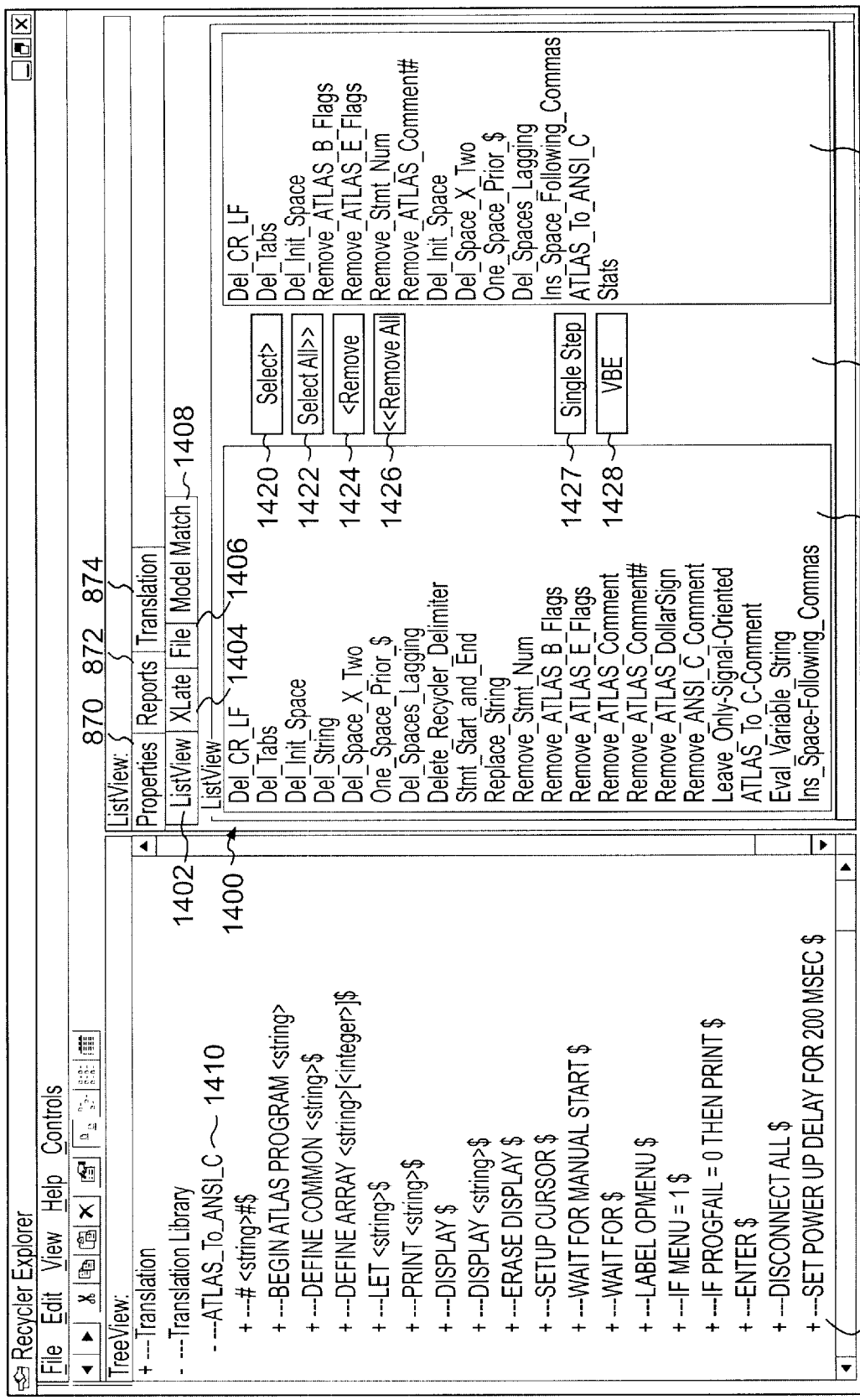

Rehost program 210 first loads the code of legacy dialect 220 into a database located in a computer memory that is accessible by translation engine 200. Then, as shown in a process box 402, rehost program 210 performs preprocessing steps. The preprocessing of the code of legacy dialect 220 includes both preformating of the code and then parsing and storing it in a database in a tree structure. The final result can be seen in the left hand text box of FIG. 12, described hereinbelow. The code is parsed into a plurality of branches and sub-branches as determined by the delimiters and separators. A branch is formed for each a line of code (LOC), which is determined by the delimiter used in the particular dialect. A sub-branch is formed and indented for each code portion in a line of code as determined by the particular separator used in the dialect. In the example of FIG. 12, the delimiter is a dollar sign ($) and the separator is a comma (,). The formatting methods or steps, also called using format options, remove other elements such as comments, statement line numbers and other selected strings, as shown in FIG. 14. Format options are also sometimes called import options. The goal of preformatting or formatting is to provide a view of each statement in legacy dialect 220 that is identical to a corresponding, previously created statement in a translation model 404. A more detailed discussion of the type of the reformatting is discussed hereinbelow.

Figure 15B:
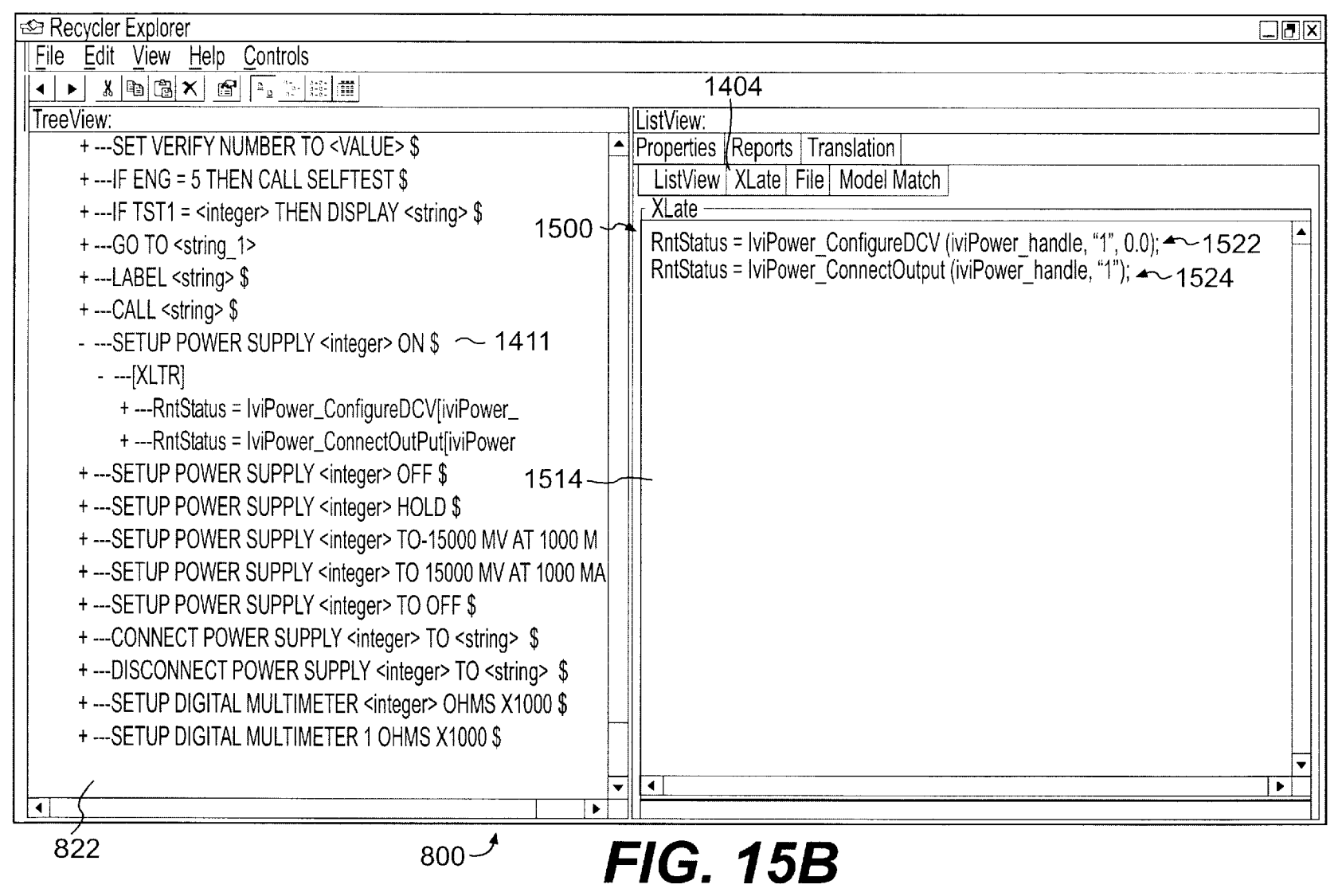

From the preprocessing step in process box 402, the program outputs the result together with a previously created translation model from a process box 404 to a process box 406 where the translation of the legacy dialect 220 is performed using the translation model. The translation is described in greater detail hereinbelow. In most cases the pre-processed code is essentially matched line for line with an equivalent line of the dialect model. Associated with each line of translation model from box 404 is a translated line in the target dialect and the associated lines are placed in a text box as depicted in FIG. 15. This processing is discussed in more detail hereinbelow with respect to FIGS. 6A and 6B.

After the dialect code has been translated, it is provided to a process box 408 where post processing activity occurs. Post processing includes, for example, inserting comments in the code, adding line numbers, adding delimiters and separators, as appropriate, and adding any of the other features used with the target dialect. Following post processing, the program stores the result in the target dialect library on memory device 230.

Figure 5:
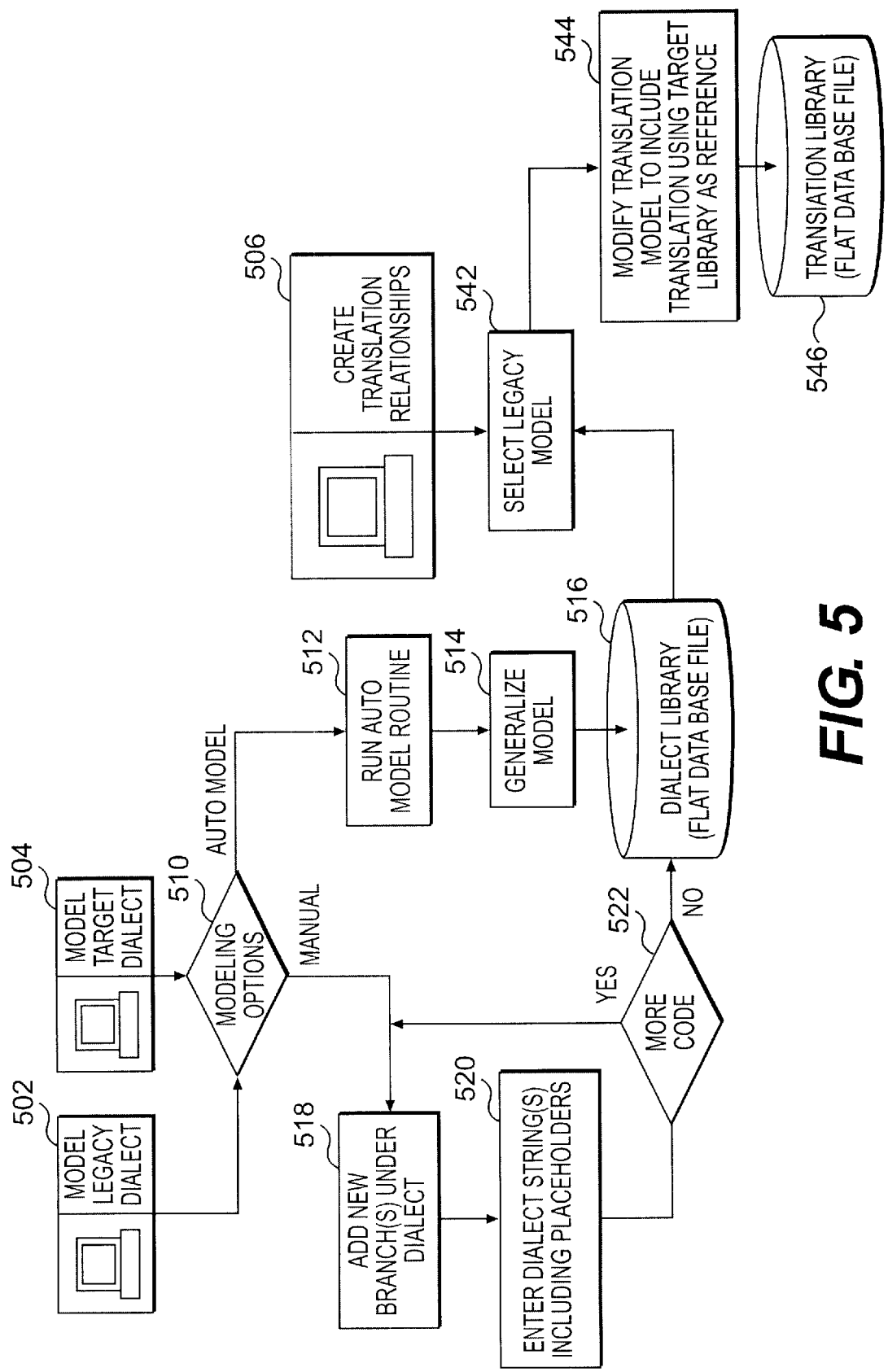
FIG. 5 is a flow chart of a process using a computer program according to the present invention for building a translation model to rehost or translate a particular legacy dialect to a particular target dialect.

In FIG. 5, a flow chart is depicted for creating the translation model that was provided to the process from box 404. Essentially, the process involves the use of a selected test program in each of the legacy dialect and the target dialect and creating the model using the tools provided by the present invention. In this regard, it is noted that the legacy dialect and the target dialect can be the same, and the present invention is being used to update the legacy dialect, the reason for such update including new test equipment, a new connector, or even a whole new test station. The operator uses sample instructions or statements in the selected dialect of the legacy test program and corresponding statements in the sample dialect of the target test program in order to determine the equivalencies between the equivalent statement types and then creates translation statements that express those equivalencies. To facilitate this process, an important feature of the present invention is the ability to display the legacy and target dialect test programs in a tree view, as depicted for example in FIGS. 12 through 20.

A Visual Basic tree view control displays a hierarchical list of Node objects in a nested "tree," each node comprised of a label and an optional bitmap. A tree view is typically used to display the headings in a document, the entries in an index, the names of files and directories on a disk, or any other kind of information that might usefully be displayed as a hierarchy. A unique feature of the present invention is to use the tree view to display the code of the test program.

Referring specifically to FIG. 5, the flow chart has two, somewhat similar, entry points: a model legacy dialect entry 502 and a model target dialect entry 504. In addition, there is a third entry, a model translation relationships entry 506, which is used when it is desired to create the particular translation relationships between the modeled legacy dialect and the modeled target dialect.

The rest of the steps in FIG. 5 puts the selected program into a tree view so that the selection of translated equivalents can be made easier.

The criteria for selecting a model for use to build a translation model to be used in other test programs for a translation between a legacy dialect and a target dialect will vary depending upon the particular objective. All language functions that are used by a test program are included. Also, the nesting of routines and subroutines must be examined by the operator to determine if there is any unique flow that must be accommodated.

After selecting a model dialect library in which to store the modeled code, whether done in entry 502 for the source or in entry 504 for the destination, the program proceeds to a decision diamond 510 where the operator is asked to select the modeling options by choosing between a manual or an automatic modeling process. If the automatic option is chosen, the program proceeds to process box 512 where rehost computer program 210 runs the auto model routine, depicted in FIG. 6A and described hereinbelow. The auto model routine automatically applies a plurality of selected import options and parses the code of the selected program into a tree structure one statement of code at a time.

Figure 6A:
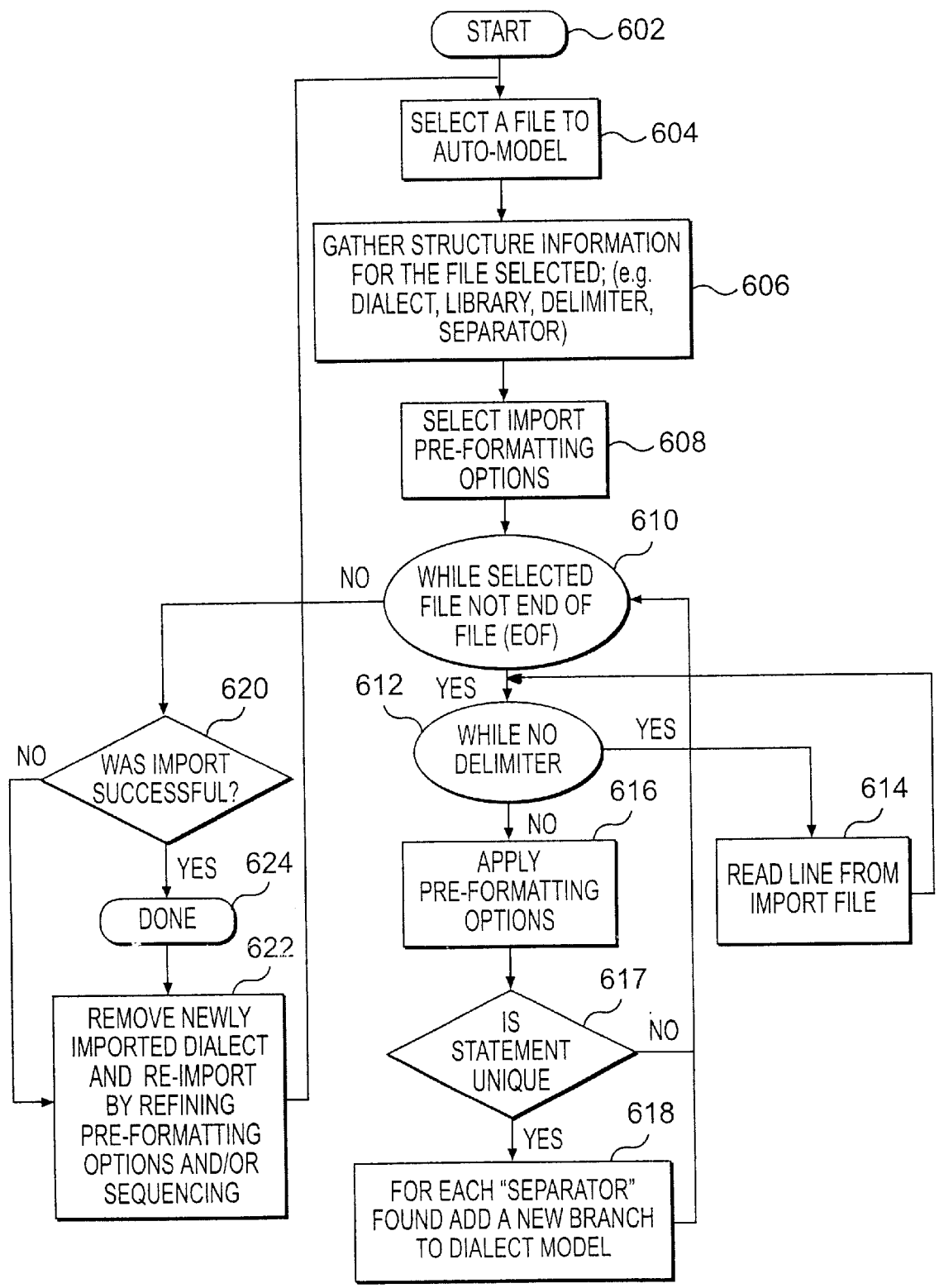
FIG. 6A is a detailed flow chart of the auto model routine of FIG. 5.
Figure 6B:
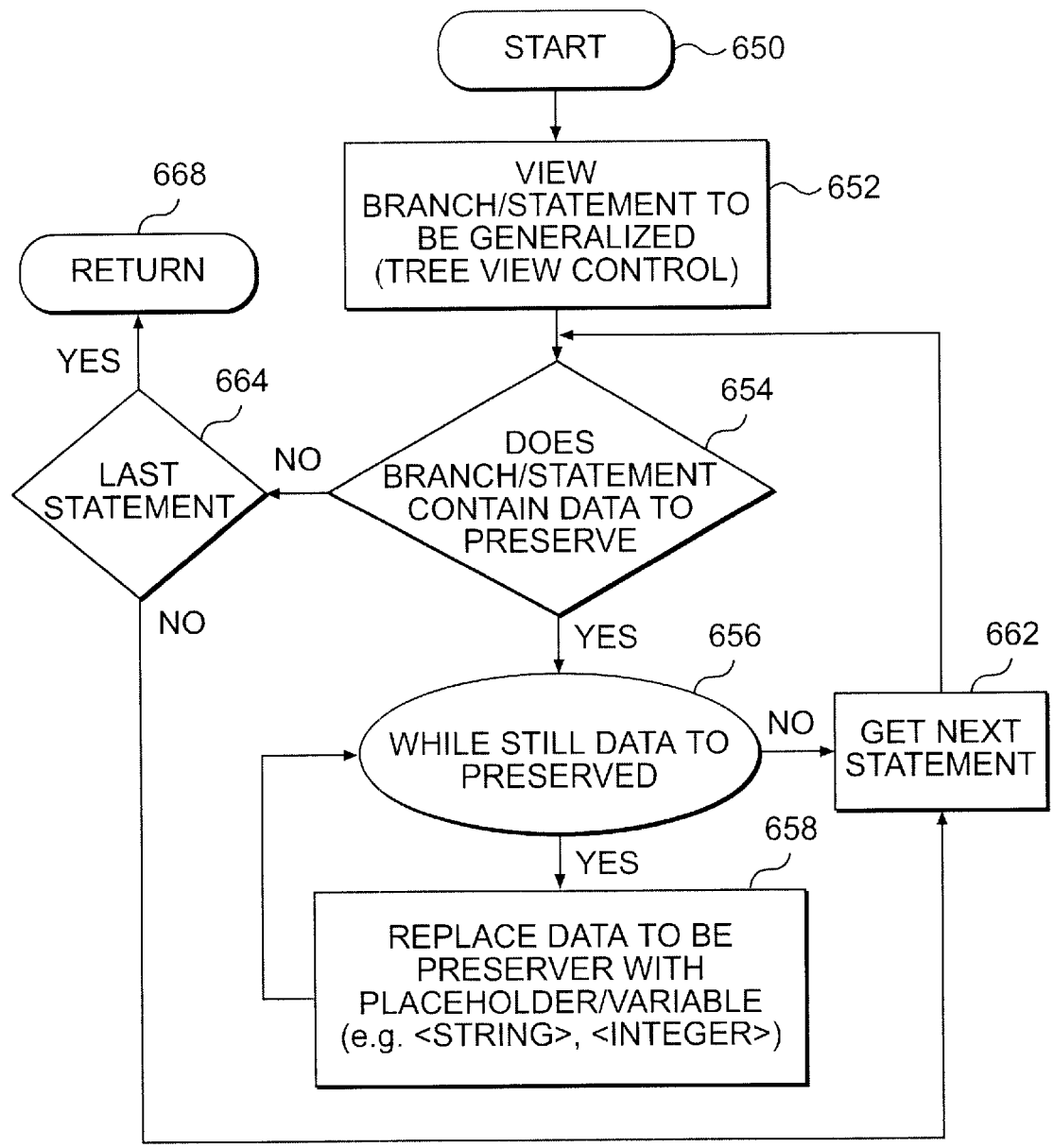
FIG. 6B is a detailed flow chart of the actions a user takes when performing the generalizing routine in FIG. 5.

Once the selected code has been parsed and displayed in a tree structure, as depicted in FIG. 12, the process proceeds to process box 514 where the operator generalizes the selected model as depicted in FIG. 6B, discussed hereinbelow. Generalizing a statement of code involves recognizing a specific component and replacing that specific component with a variable. Examples of specific components include a specific power supply, such as "power supply 5" and a delay time (i.e. WAIT) in FIG. 12, or a descriptive term or string such as a program name. After the code has been generalized it is stored in a dialect library 516 as a flat data base file.

Figure 9:
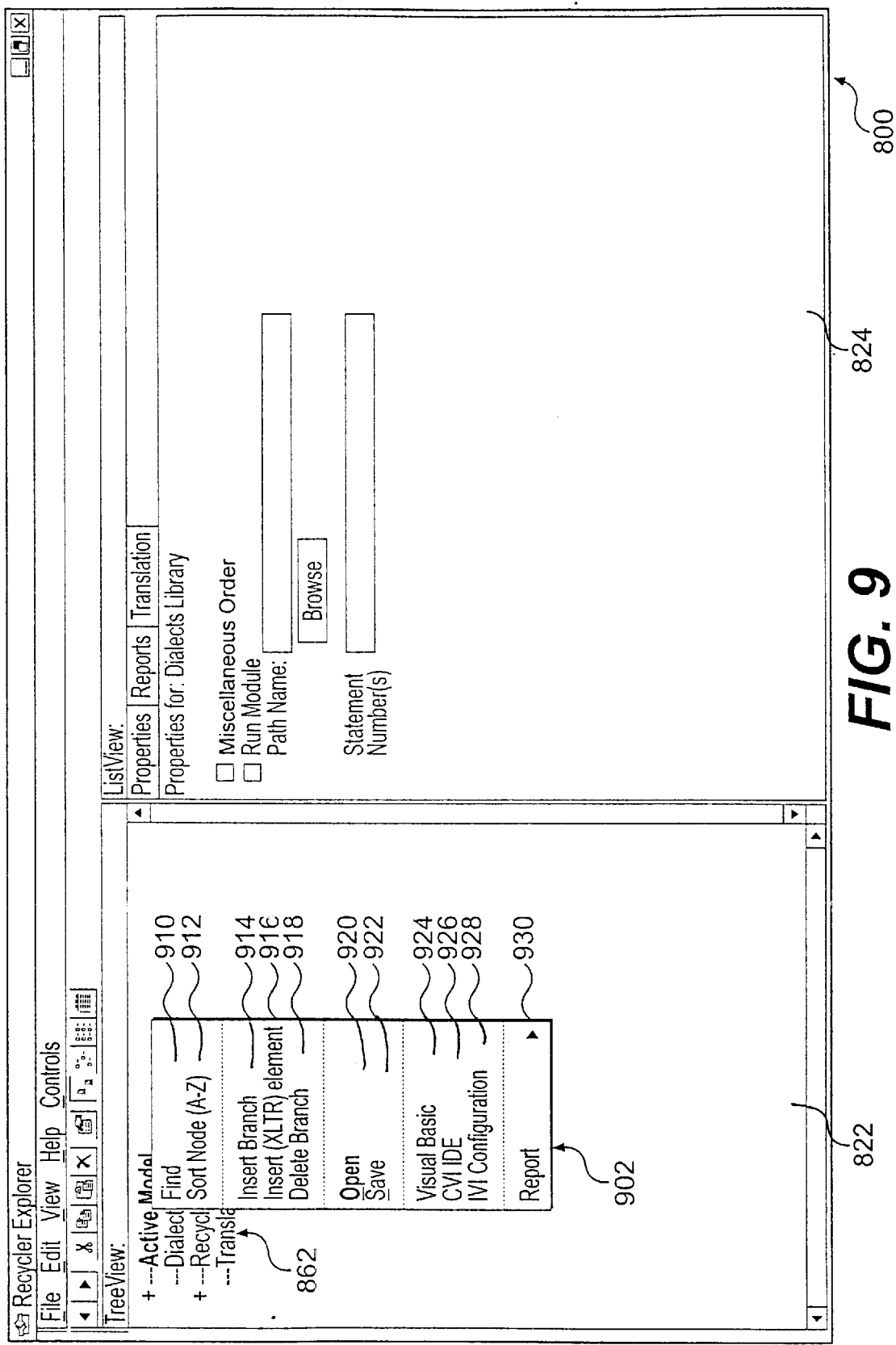

If the operator decides to model using the manual route, the program branches from decision diamond 510 to a process box 518 where the operator using a pop-up menu such as depicted in FIG. 9, adds a new branch under the dialect, and the process proceeds to process box 520. In process box 520, the operator manually enters the dialect stings one at a time and generalizes each statement by replacing a specific value with a placeholder. A placeholder is another word for a defined variable, and thus is a general term that replaces the particular data to be preserved. In the present invention, a placeholder therefore is used both to generalize the statement and to preserve the data so that it can be inserted into the translated statement. The process then continues to decision diamond 522. If more code needs to be generated, the process branches back to process box 518. If all of the code has been processed, it is stored in dialect library 516.

In order to create a translation relationship so that a look-up argument consisting of an element of the legacy dialect will return the equivalent element or elements of the target dialect, the operator enters the process through entry 506. The process of creating a translation relationship involves annotating the elements of the modeled legacy dialect with appropriate code written in the language of the target dialect. The operator initially elects to begin with either the previously modeled source dialect or target dialect, which is then used as a base. Normally it is easier to use the modeled source dialect, which has been stored in dialect library 516.

Figure 13A:
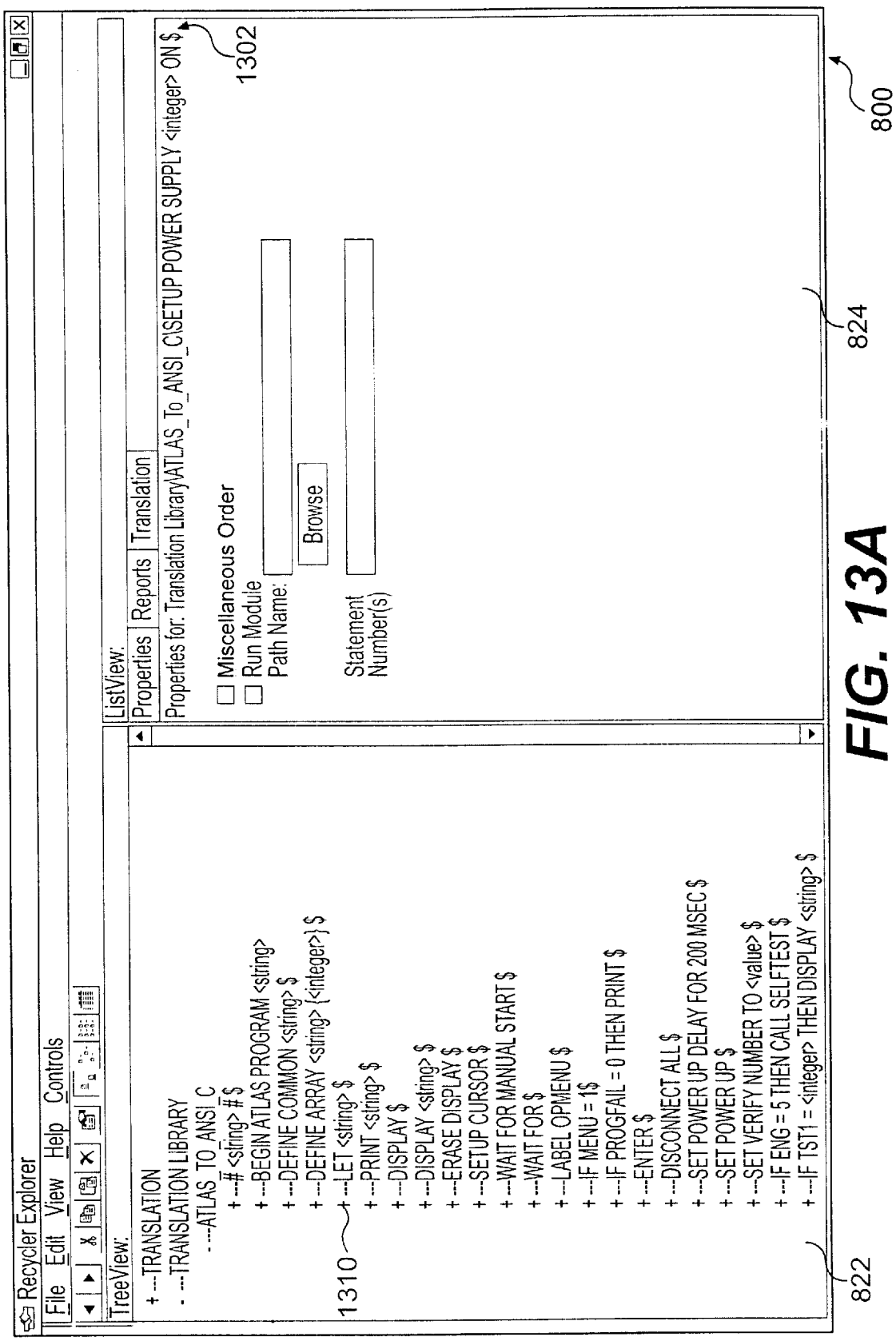
FIGS. 13A and 13B (collectively referred to as FIG. 13) are the captured screen display of FIG. 12 after the parsed program has been made generic or generalized.
Figure 13B:
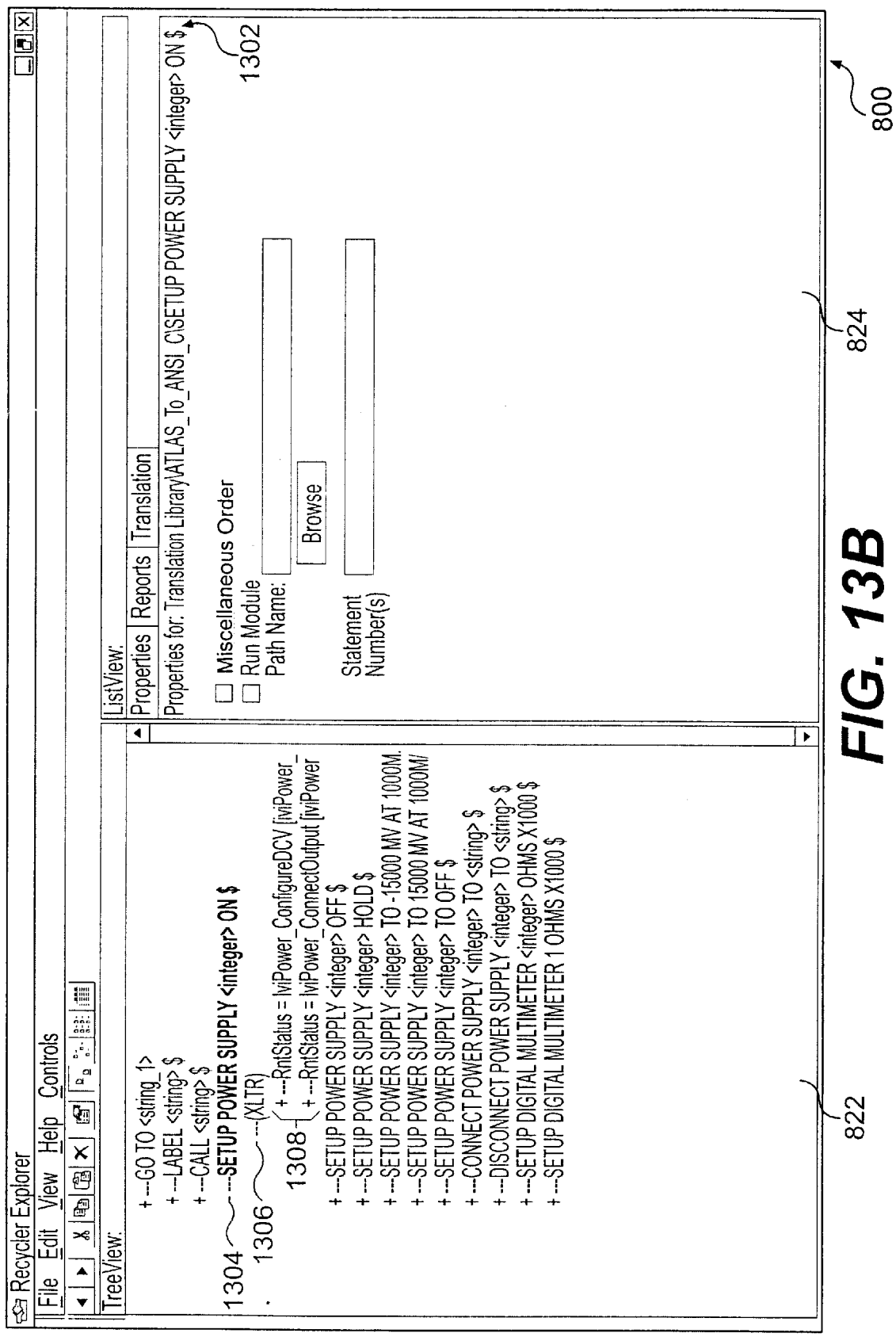

Thus, the process of creating a translation relationship begins in process box 542 where the operator selects a dialect model from library 516 and loads it into computer memory 204. From process box 542 the program proceeds to process box 544 where the operator examines each statement and includes a translation counterpart, as shown in FIG. 13. The process of creating the translation model is discussed in greater detail with respect to FIG. 13, hereinbelow. In this way, the operator modifies or annotates the selected model to include any new translation code so as to build translational relationships. The modified model is then stored in Translation library 546.

As discussed hereinbelow with respect to FIG. 20, the translation elements are loaded as nested branches under the corresponding elements of the modeled code. The translation elements can be typed in by the operator with reference to the modeled target code. Alternatively, the modeled legacy code and the modeled target code can be displayed in corresponding, side-by-side positioned window list boxes, and the target code appropriate to translate a corresponding piece of legacy code can be dragged to the appropriate location on the tree of the legacy model.

Figure 10:
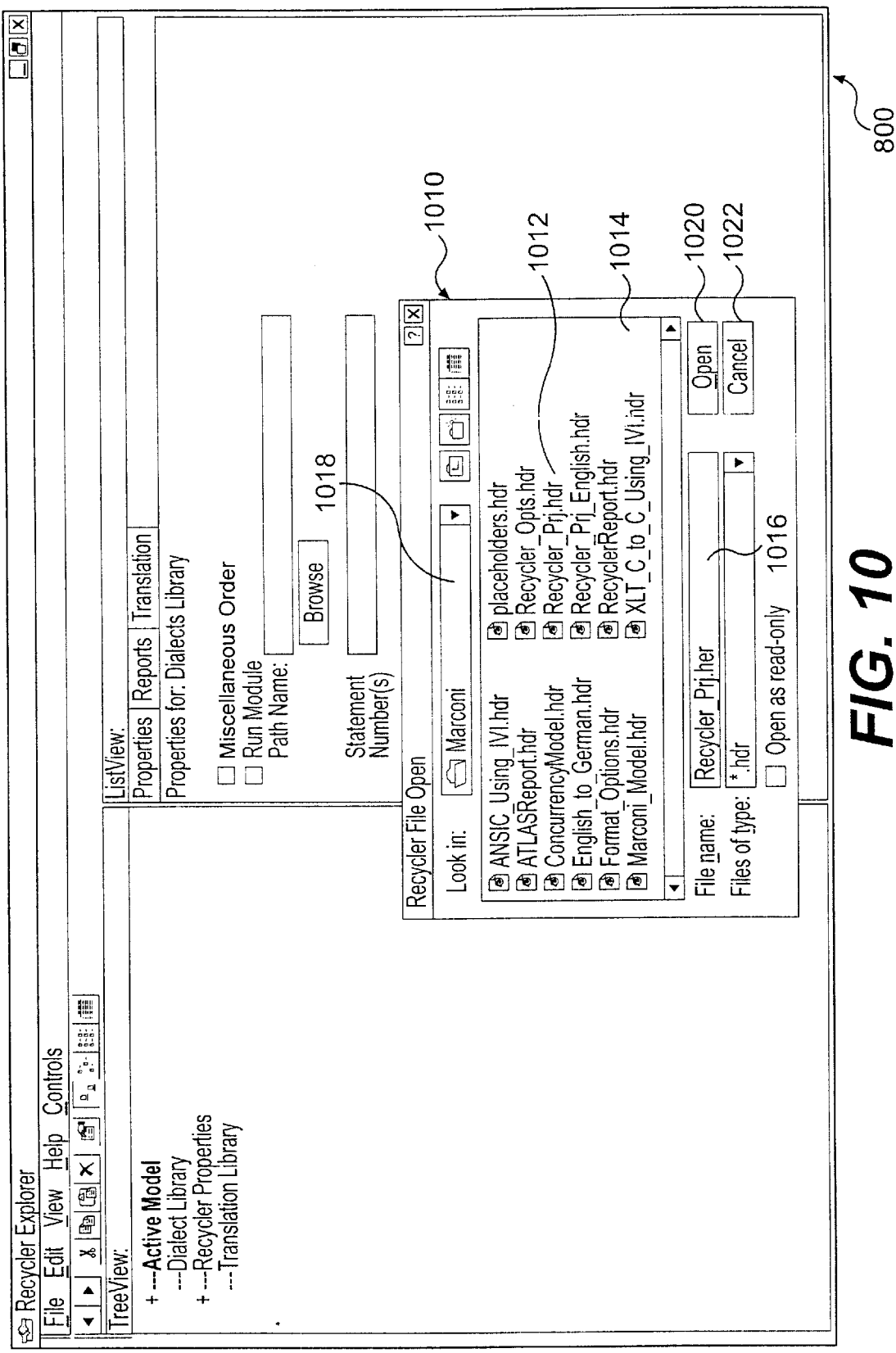

With reference now to FIG. 6A in which the auto model routine is depicted in greater detail, the process begins with start box 602. At this point in the program, the program is essentially sitting at a point depicted in FIG. 8. The modeling process begins when the operator selects a test program to be modeled in process box 604. This is shown in FIGS. 9 and 10, described hereinbelow. Once chosen, the process proceeds to process box 606 where structure information about the file is obtained. This essentially involves either the operator examining selected test program to obtain the information and create a header file, or if a header file already exists, the rehost program automatically reading the header file. More specifically, the program checks to see if a file having an extension of the format ".hdr" is present in the same directory. If not, then the program provides an opportunity to define a header file. A typical header for an ATLAS program is as follows:

<!-- PREAMBLE -->

<!-- LIBRARY -->

Dialect Library

<!-- DIALECT -->

ATLAS

<!-- DELIMITER -->

$

<!-- SEPARATOR -->

<!-- END PREAMBLE -->

As can be seen from the sample header file, it is comprised of the word "preamble" in a comment so that the reader can identify it. In the present invention, a comment is indicated by left and right carets, a leading exclamation point and a pair of double dashes. The operator selects the library in which the dialect is to be stored, identifies the particular dialect, and identifies the particular delimiter and separator. Then the header concludes with an END statement, also within a comments indicator.

Returning to FIG. 6A, after obtaining the particular header information in process box 606 and storing it as an associated file to the dialect code, the program proceeds to process box 608 where the operator selects the desired pre-formatting options and the order in which they should appear and be run. This is discussed in greater detail with respect to FIG. 11.

After the preformatting options have been selected, the program enters into a "While" loop as indicated by oval 610. The program continues in the While loop until it detects an end-of-file (EOF) indicator, which for the presently preferred embodiment is simply that state when there is no more code. In an alternate embodiment, if the program being modeled has an EOF, then the program could make a specific test on whether that indicator is present. If no EOF is detected, the program branches to a second, internally nested While loop in oval 612. The program then reads one line of the selected program and if no delimiter is found, branches to process box 614 where the next line is read and the program returns to While oval 612 to ask again if there is a delimiter present. This subsidiary loop continues until a delimiter is found, at which time the program continues to process box 616 where the operator selected preformatting options are applied. Thus, the selected program is checked one line at a time for the presence of the delimiter identified in process box 606. In this way, the program can read multiple lines should a program statement be on more than one line. Also, an entire statement will be read even if it extends to more than one line and subsequent lines are indented (which is usually done so that the program is more readable). Indented lines can be read because the program ignores leading spaces or tabs, looking only for the specified delimiter.

In process box 616 the program applies the preformatting options depicted in FIG. 14 to the entire selected statement and then proceeds to a decision diamond 617 where the program checks the entries in the dialect model to determine if the current statement is unique. If it is unique, it will be stored in the applicable model, and then the program proceeds to process box 618. If it is not, the program returns to the top of the outer While loop, namely, oval 610. In this way, numerous legacy programs can be "run through" the software. This repeated introduction of new legacy programs into the dialect model provides a tremendous advantage because it will refine the model and permits additional model steps over time.

Connected with the application of preformatting options is the operation of looking for predefined separators which occurs in process box 618. For each separator that is found in the statement, a new branch is added to the model being generated if the statement is unique from that already in the tree at the same branch level. From process box 618 the program returns to While oval 610 where the program checks to see if there are any more statements to be preprocessed. Thus the preformatting options are performed statement by statement, from top to bottom. The preformatting options are discussed in greater detail with respect to FIG. 14.

When there are no more statements to be processed or there is an End Of File (EOF) indicator detected, the program branches to a decision diamond 620 where the process inquires whether the import operation was successful. An unsuccessful operation could result from either some statements not being parsed or parsed incorrectly, or the pre-formatting options being incorrectly stated or in the wrong order.

An example of the effects of an improper order of pre-formatting options is as follows. Assume that an ATLAS program is being parsed and that the programmer had used tabs and spaces to space the statements so that it would have a more readable appearance. The import options selected are those that appear in FIG. 11, except that the entry in the right hand list view of "Del_Space_X_Two" (which means delete all leading spaces before any text when there are more than two contiguous spaces, and return a space, thus essentially left justifying the statement) appears before the entry "Del_Tabs" (which means delete all leading tabs before any text and return a space). The latter option accomplishes a similar task as the former one, but is used for those programs written by programmers who use tabs instead of leading spaces. In this hypothetical situation, where the former is run and leaves a space and then there are also tabs and the latter option leaves a space, the statement would end up with two leading spaces, not one as is desired. This could lead to problems during the parsing and interpreting of the statement. Thus the correct sequence for this example is to first delete the tabs and then to delete the initial spaces where there are more than one.

If the evaluation of the operator is that the import was not successful, then the program branches to a process box 622 where the newly imported dialect is removed, and it is re-imported after the operator has modified the preformatting options and/or sequencing. The process then returns back to process box 604 where the operator can repeat the steps to select a file for auto model. If the import is successful, then the program routine branches to an end terminal 624 and the routine is finished. As stated above, the program then proceeds to process box 514 where the operator can generalize the model. This is depicted in detail in FIG. 6B.

The process in FIG. 6B is performed by the user who uses rehost computer program 210 to display a parsed target model, and then determines the equivalence in the target code to a statement in the source or legacy code. The user then uses rehost computer program 210 to enter the equivalence code in the appropriate branch of the translation model. The process of FIG. 6B begins after the code has been successfully pre-formatted in process box 512 and parsed so that it can be displayed in a tree view, as depicted in FIG. 12. The process of generalizing, as the process of applying the pre-formatting options, is done on an element or branch basis. The process begins in an entry terminal 650 and the program proceeds to a process box 652 where the operator views and selects the branch or statement to be generalized. As shown in FIG. 12, this is done by selecting the statement using the mouse pointer. The operator then makes a decision, as indicated by a decision diamond 654, whether the selected statement needs to be preserved, that is generalized. If the branch contains data to be preserved, then the process enters a While loop as indicated by oval 656. So long as the statement contains data to be generalized, the loop cycles through a process box 658 during which the operator manually replaces the data to be preserved with a placeholder.

Simply stated, generalizing the selected source model makes it more general so that when used as a translation model all similar statements can be translated by a single translation statement irrespective of the different unique elements in the legacy statements. Generalization is initially done by the operator replacing all specific numbers, strings and instruments with placeholders. This can be seen by a comparison of FIGS. 12 and 13. For example, the highlighted statement, "SETUP POWER SUPPLY 5 ON $" in FIG. 12 has been replaced by "SETUP POWER SUPPLY <INTEGER> ON $" in FIG. 13. In addition, placeholders are used to generalize a program name and other strings, a particular connection (e.g. pin P1-38), and indexes (e.g. one used to end a loop traversal). Thus, as stated above, "INTEGER" can be used to replace a number. Others include "STRING" to replace a program name, "CONN" to replace a connection, and "INDEX" to replace an index number. This is discussed in greater detail with respect to FIGS. 12 and 13.

When the selected statement has been generalized and no data needs to be replaced by a placeholder, the process returns to the top of decision diamond 654 via a process box 662 where the next statement is selected. When the next statement does not contain any data to be preserved, the process branches to a decision diamond 664 and a check is made in decision diamond 664 to determine if the current statement is the last one. If it is not, the program branches to the top of decision diamond 654 via process box 662 where the next statement is selected. If the current statement is the last one, then the sub-process is finished and the process returns via a return terminal 668 to FIG. 5 and to dialect library 516 where the data is stored.

Once a translation model for a particular dialect-to-dialect translation has been created, it can be constantly updated and refined by the user as the translation model is used to perform actual translations for operational test programs. In this regard, the particular translation model to be edited is loaded in box 542 and then modified in process box 544.

Figure 7:
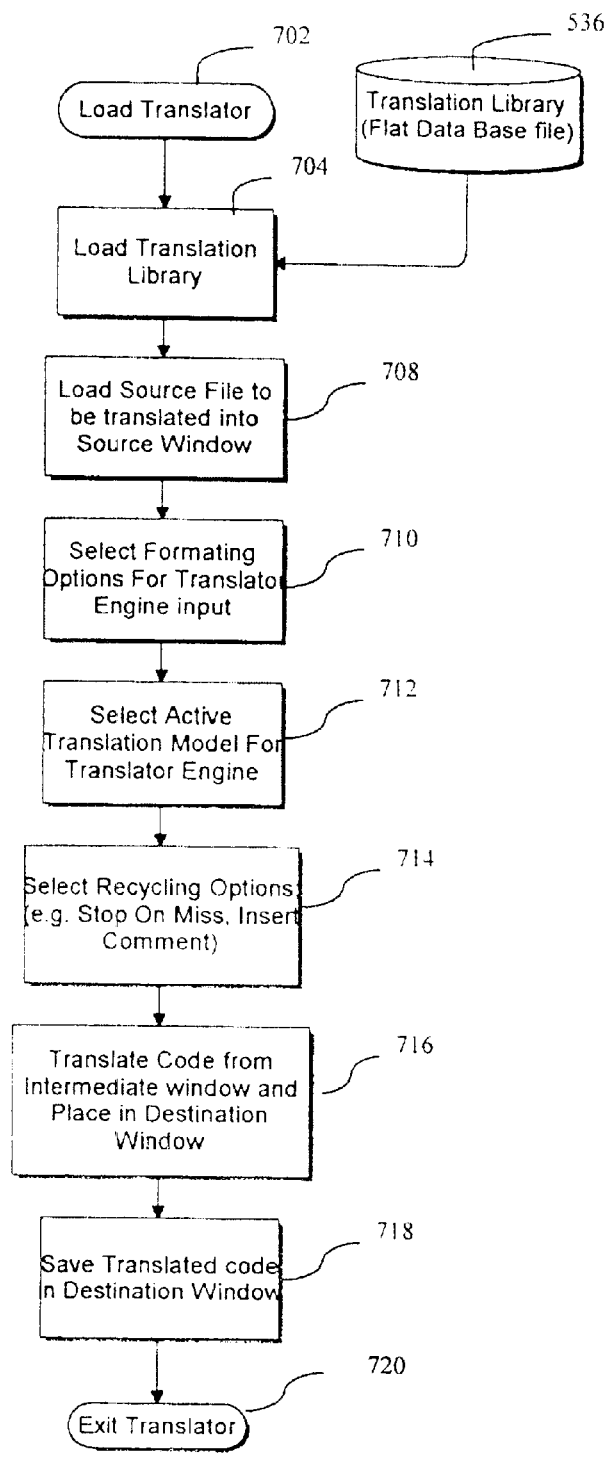
FIG. 7 is a detailed flow chart of the process for using the computer program according to the present invention to use a translation model for translating a particular legacy dialect to a particular target dialect.
Figures 7A, 7B:
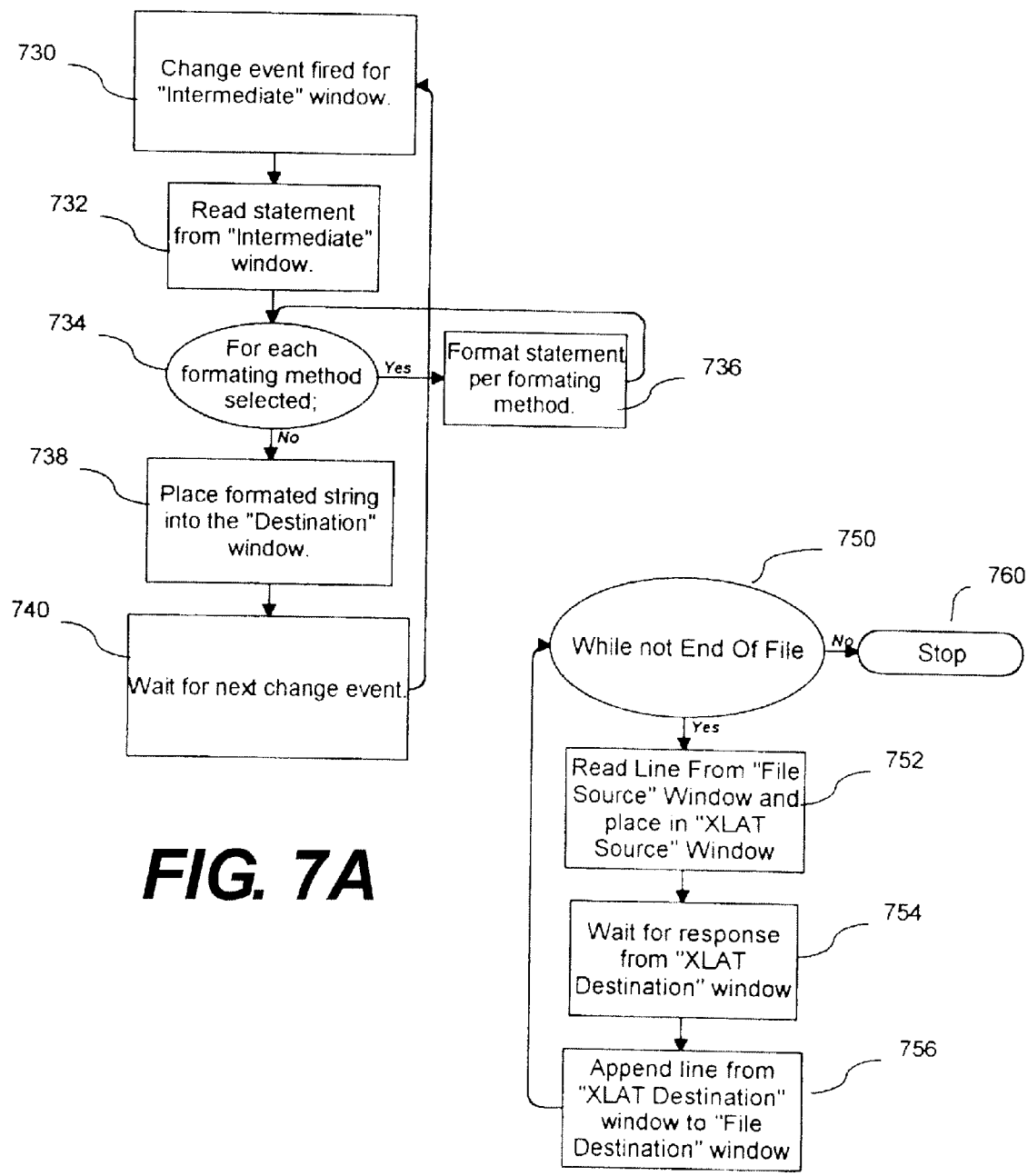
FIGS. 7A and 7B are detailed flow charts of the process of Visual Basic computer program methods that respectively generate a file of translated statements of code of a source TP, and a file of single or individual statements of individually translated code.

The use of a previously prepared translation model in the translation of a test program is depicted in FIGS. 7, 7A and 7B. Many of the steps are similar to those discussed above with respect to modeling the translation model, and accordingly, the description of the steps in the translation process has been abbreviated.

The automatic translation process begins in a start box 702 where the user or operator conventionally loads a rehost computer program according to the present invention in a computer system, such as that depicted in FIG. 2. From here the program proceeds to process box 704 where a selected translation model stored in data base 546 is retrieved. From process box 704, the process proceeds to process box 708 where the Test Program to be rehosted or translated is loaded into computer memory 204. The process proceeds to process box 710 where the pre-formatting or formatting options are selected. Examples of formatting options are depicted in FIG. 14 in the left list view of the right hand window section. For example, the first two options, deleting a carriage return and a line feed combination and deleting all tabs, have already been selected as indicated by their presence in the right hand list view. The formatting options are discussed in greater detail with respect to a discussion of FIG. 14.

From process box 710 the process proceeds to process box 712 where a translation model for translation engine 200 is selected. The process then proceeds to box 714 where the rehosting options for rehost program 210 are selected. This is shown in FIG. 16 where a pop-up menu is generated by moving mouse 216 so as to locate the cursor in the list view side of the form (i.e. the screen) and clicking the right mouse button 219. Only two rehosting options are presently available in the embodiment depicted in FIG. 16, a "Stop on Miss" option and an "Insert Comment" option. Once the rehosting options are selected, the process proceeds to process box 716 where the rehosting process actually takes place. This is described in greater detail with respect to FIGS. 7A and 7B, and FIGS. 15 and 17–20. The translated code is then saved as indicated in process box 718 on a statement by statement basis in a destination window, shown by a comparison of FIGS. 18 and 19. The program then exists at Exit terminal 720.

With reference now to FIG. 7A, a flow chart is given for a single rehosting step. Since, as mentioned above, Visual Basic programs are event activated instead of process oriented programs, when the present process is in the condition of FIG. 7A, rehost computer program 210 is in a holding state awaiting the occurrence of a change event, and this state is depicted in FIG. 15. The change event in this case is the entry of a single character in the upper text box in the right hand window, as more fully described hereinbelow. As soon as a character is entered, such as the letter "s," as indicated in FIG. 7A in process box 730, the program proceeds to process box 732 where the program reads the entire content of the text box and looks for an exact match in the loaded translation model, seen in the tree view in FIG. 15. Since there are no matches for the letter "s," the program does not return any translation. However, as soon as the dollar sign of the full text of the ATLAS statement "SET UP POWER SUPPLY 1 ON $" is typed in, which as just mentioned is an event that triggers the program to search the loaded translation model, a match is found and the translation of this statement into the C language is displayed in the lower destination list view of FIG. 15. In FIG. 7A, this is the process depicted in While loop represented by While oval 734 and process box 736. As just stated, when a match is found, the process of FIG. 7A proceeds automatically to process box 738 where the formatted string is displayed in the destination window, as shown in FIG. 15. The process then proceeds to process box 740 where it again enters the "wait" state.

In FIG. 7B, the process flow is depicted for the rehosting of an entire file. The process starts in While oval 750 by selecting the "Recycle All" option in the pop-up window as depicted in FIG. 16. Upon the selection of this option, an "event" is created and the program reacts to it by proceeding to process box 752 where a line is read from the "file source" window, which is the upper rich text box in FIG. 17, and placed in the "Xlat Source" window. From here the program waits for a response from the "XLAT Destination" window as indicated by process box 754. When the event occurs and the information is received, the program proceeds to process box 756 where the program appends the line from the "XLAT Destination" window. The program then returns to the While oval 750 where an inquiry is made if the End Of File has been reached. If the EOF has been reached, then the While loop has been completed and the program branches to the stop terminal 760.

In order to better understand the operation of rehost computer program 210 a series of screen printouts that appear in FIGS. 8 through 26 and which were produced roughly in order by running an embodiment of rehost computer program 210 will now be discussed. In Visual Basic terminology, the presentations on the screens in FIGS. 8–26 are called "forms." Thus, with reference now to FIG. 8 as an example, it can be seen that the depicted form is in the familiar Microsoft Windows format for an applications program. Accordingly, many of the items need not be discussed beyond merely mentioning them.

Figure 8:
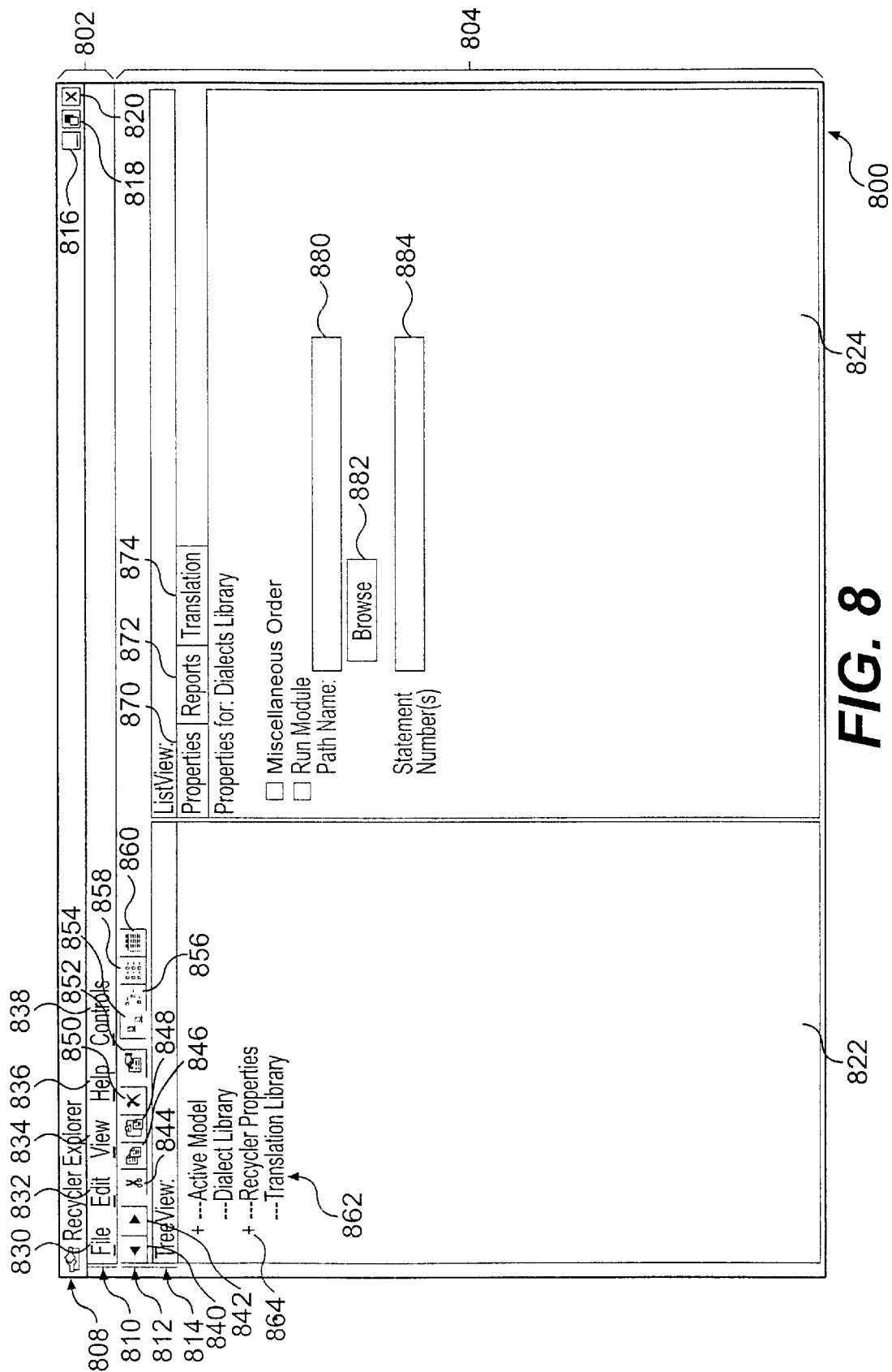

FIGS. 8 through 13 depict the process of generating a translation model. FIG. 8 depicts a properties screen form 800 that will display the properties of highlighted items. Actually, in FIG. 8 there are no highlighted items, so no properties are being displayed. However, if reference is made to FIG. 12, a highlighted item will be seen as being depicted. Thus, the information presented in properties form 800 is specific to the particular item selected.

The screen depicting form 800 was captured during a presentation of a computer program according to the present invention that was running on a Pentium II based microcomputer that was using a Windows 98 operating system. Thus, form 800 is in a conventional Microsoft Windows 98 format, but it would be substantially similar under either the Microsoft Windows 95 or Windows NT operating systems. Form 800 is the first substantive presentation seen by an operator or user when the present computer program is started.

The screen depicting properties form 800 is divided into two major horizontal portions or sections, a top bar section 802 and a central window section 804. Top bar section 802 includes a title bar 808, a menu bar 810, a tool bar 812, and a window identifier bar 814. Title bar 808 provides the name of the applications program that is using form 800, which in this case is a computer program according to the present invention entitled "Recycler Explorer." Title bar 808 also provides three conventional Microsoft Windows program control buttons, a minimize button 816, a maximize button 818, and a close button 820, the functions of which are not only conventional, but are well known. Central window section 804 of form 800 is divided into two vertical portions, a tree view 822 and a list view 824.

Menu bar 810 is a conventional software tool utilizing a standardized Microsoft Windows format, and the generation or development and use of a menu bar are well known to those skilled in the art. Menu bar 810 provides the following drop down menus in a Windows format: a File menu 830, an Edit menu 832, a View menu 834, a Help menu 836 and a Control menu 838. Each of these menus and their associated lower order menus, in accordance with Microsoft Corporation's standards for Windows operating systems, drop down when the cursor of the mouse, such as mouse 216, is placed over them, and the left button 218 is clicked. Alternatively, the menus can be opened from the keyboard by pressing the "Alt" key and then the underlined letter of the particular menu. The following menus and sub-menus are identical to and operate identically in accordance with the standards of the Windows operating system:

| Files: | Edit | View | Help |
|---|---|---|---|
| Open | Undo | Tool bar | Contents |
| Save | Cut | Status Bar | Search For |
| Close | Copy | Large Icons | Help On |
| | Paste | List | About |
| | Select All | Details | Project |
| | Invert Selection | Arrange Icons | |
| | | By Date | |
| | | Name | |
| | | Type | |
| | | Size | |
| | | Line up Icons | |
| | | Refresh | |
| | | Options | | on the other hand, although some of the menu items in Controls drop down menu 838 are in accordance with the Windows operating system, most of the sub-menu items are unique to the present invention, and the particular sub-menu items will be discussed below. These sub-menu items and sub-sub-menu items are as follows:

Controls
   Find
   Sort Node (A–Z)
   Insert Branch
   Insert (XLTR) Element
   Delete Branch
   Visual Basic
   CVI IDE
   IVI Configuration
   Reports
     TAS Flow Chart
     Signal Range>
       Export Dialect Explorer
       Export Dialect to Grid
       View Dialect Export
     Test Strategy
     Signal Concurrency
     User Defined Tool bar 812 is another conventional Windows element whose development and use are well known to those skilled in the art. A particular tool can be used simply by clicking on it. In the display of FIG. 8, the following conventional tools listed in their order from left to right and depicted by well-know icons are displayed: Page Back icon 840; Page Forward 842; Cut 844; Copy 846; Paste 848; Delete 850; Properties 852; Large Icon View 854; Small Icon View 856; List View 858; and Detail View 860.

Tree view 822 of central window section 804 is a conventional Visual Basic control that has well known properties. Similarly, list view 824 is a conventional Visual Basic control. Although tree view 822 is a conventional control, its contents are not. Whereas in normal tree views there is a hierarchical display of files and other text information, in the present invention, a test program has been parsed and displayed therein. This form of software display has not been seen before, but it does provide tremendous advantages in using the present invention, particularly when creating the models and in modeling the translational relationships.

Tree view 822 contains libraries 862 in a tree structure. The contents of libraries 862 are programs that have been previously established, and in FIG. 8, the libraries include an Active Model library, a Dialect library, a Properties library and a Translation library. Additional libraries can be created by the user for containing specific, related items and include a Format library, a Placeholder library and a Reports library. See for example FIG. 21. Each library of libraries 862 is preceded by an expansion box 864 having a plus sign therein or expansion box having a minus sign therein (see 1206 in FIG. 12). An expansion box according to Microsoft Windows convention is present if there are branches below the branch that is presently being displayed. The plus sign in boxes 864 indicates that the branches below that particular branch are hidden or folded, and can be revealed if the mouse courser is placed over the box and is left clicked. The minus sign in an expansion box, such as box 1206, indicates that the branches below that particular branch have been revealed or opened. The displayed can be folded back by placing the mouse cursor over the box and left clicking.

Figure 21:
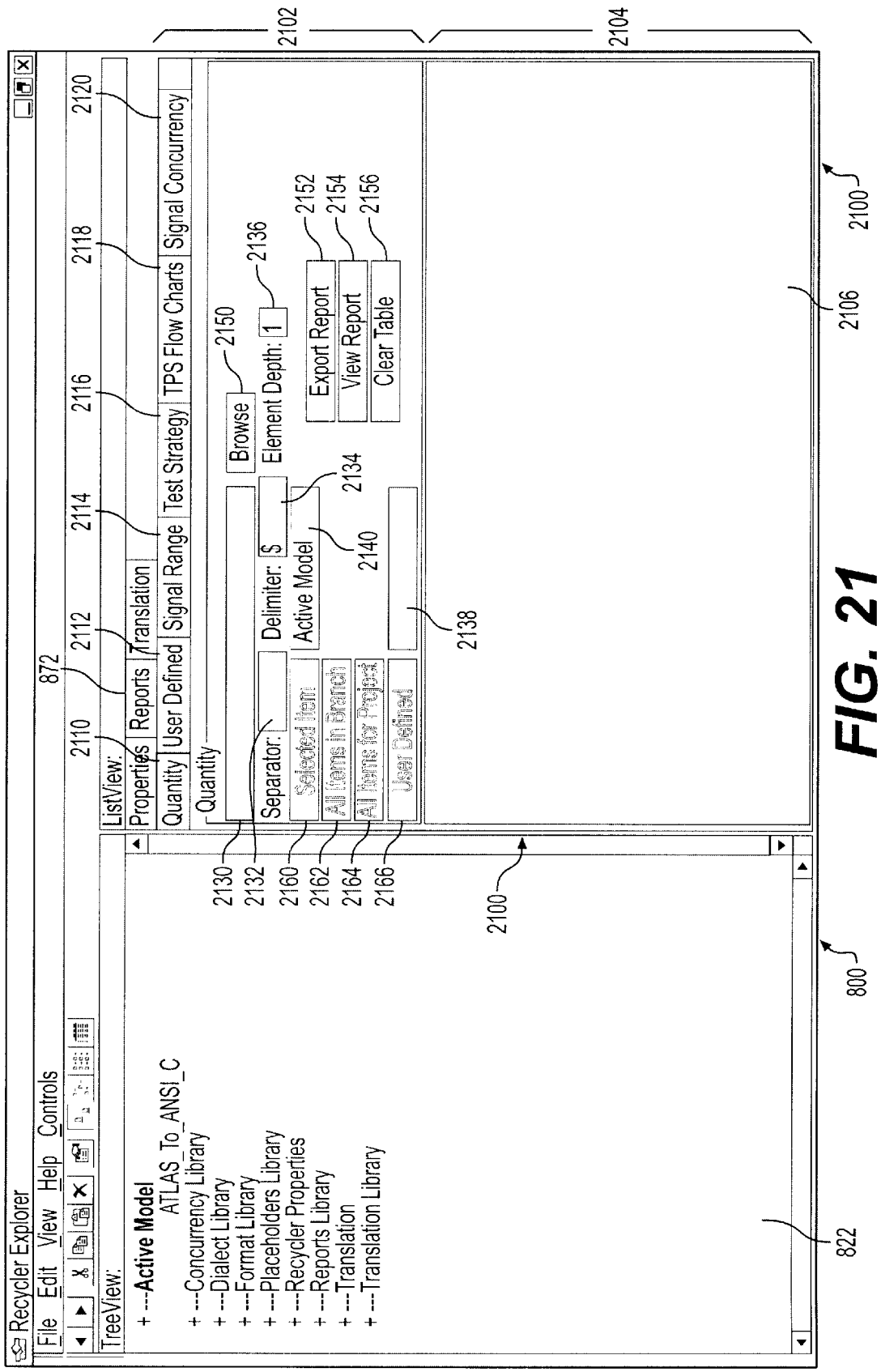

In the present invention, the Active Model, the Dialect Library, and the Translation Library are standard libraries that are a part of the present invention. Any other libraries, such as those mentioned above, are user developed and are usually used to contain the indicated subject matter. The Active Model Library contains the identifying information about the currently or most recently used translation model. An example is shown in FIG. 21. The Dialect Library contains a tree view of the legacy programs which have been or are to be translated, and the Translation Library contains the tree view of translation models.

List view 824 has three tabs, a properties tab 870, which is the one selected in FIG. 8, a reports tab 872 and a translation tab 874, discussed hereinbelow. List view 824 includes two properties check boxes, a properties check box 876 that has the legend "Miscellaneous Order," and a properties check box 878 that has the legend "Run Module." These items are properties of a particular line highlighted in tree view 822 (see for example FIG. 12). By default, rehost computer program 210 will run the active model indicated in the Active Model branch listed in library 862. According to standard Visual Basic programming, a check boxes is "activated" to influence the operation of the program when the cursor is placed over it and the left mouse button is checked.

Check box 876 is used with a particular highlighted item in tree view 822. When check box 876 is checked, it advises rehost computer program 210 that special treatment must be accorded to the highlighted item in tree view 822 (see for example FIG. 12). In particular, rehost computer program 210 checks for a match with the highlighted statement in the designated model for variations in order when the imported statement is being checked. The program can then consider a match as having been found even when there is a changed order in the imported statement. For example, a formatted statement in the imported program may not be in the same order as listed in a previously generated translation model statement. As a hypothetical example, with reference to FIG. 12, the ATLAS statement "SETUP POWER SUPPLY 5 ON $" in the dialect model program (i.e. a program that has already been formatted and parsed) perhaps could be written in other dialects as "SETUP POWER SUPPLY 5 ON $".

When Run Module check box 878 is checked for a particular highlighted element, a text box 880 and a browse command button 882 are activated. Check box 878 is used with a particular highlighted item in tree view 822 when an additional software module is needed or would be helpful to understand the item. Most statements can be translated on a linear basis (i.e. one statement to be translated has an equivalent exact number of statements, including one, in the translated dialect. Occasionally, however, there is the need for a non-linear translation or correlation between the generalized dialect modal instruction and the translated equivalent in the target code. Accordingly, the path name of a special routine or module is entered into a Path Name text box 880. Browse command button 882 is used when drafting the properties for each element to find the particular module's file name and location, and then the path and file name can be automatically be entered into Path Name text box 880.

For example, some ATLAS programs have a binary input to simulate certain test data. An additional module would be helpful to rehost program 210 to understand the information. This is particularly true if the data is entered in a parallel form, but is used in a serial form. Another example is if a particular imported program uses a variable the value of which changes throughout the program. A routine could be pointed to in text box 880 that would search the previous lines of the imported code to determine the value of the variable at this point in the program and to replace the variable with that value.

A Statement Number(s) text box 884 is located just below Browse command button 882 and displays all of statement numbers where the highlighted statement in Tree View 822 appear in the test program. (See e.g. FIG. 12.) It is noted that the programs in the Dialect Library, although they have been parsed and formatted, still have not been generalized and thus have associated statement numbers in the source from which they originated. However, a statement in the translation library (FIG. 8) would not have any associated statement numbers.

Rehost program 210 will wait at the state depicted in FIG. 8 until the user takes some action. If the user desires to rehost a particular test program, the user places the cursor in tree view 822 and right clicks on the view. As shown in FIG. 9, this event conventionally brings up a pop-up menu 902. Menu 902 has the following menu items with the below-indicated result when selected in a conventional way of highlighting the menu item by putting the cursor on it, and then left clicking the mouse:

| No. | Menu Item | Action |
| --- | --- | --- |
| 910 | Find | This is a search method that locates a string in any element stored in library 862 by entering the string into a conventional pop-up text box, the search always beginning at the top of library 862; |
| 912 | Sort Node (A–Z) | This is a conventional Visual Basic sort method that alphabetically sorts the entries in a previously highlighted program stored in library 822. See FIG. 12 for a sorted statement list and FIG. 16 for an unsorted statement list; |
| 914 | Insert Branch | This is a conventional Visual Basic insert method that permits the user to manually insert a branch below a previously highlighted location in a program listing in tree view 822; |
| 916 | Insert XLTR element | This is a conventional Visual Basic insert method similar to Insert Branch menu item 914, except that it also provides the string "(XLTR)" which is recognized by rehost program 210 as indicating that the branches nested below it are a translation in the new code of the legacy code above the branch. See e.g. FIG. 13; |
| 918 | Delete Branch | This is a conventional Visual Basic delete method used to delete a previously highlighted branch in tree view 822 (see e.g. FIG. 12). |
| 920 | Open | This is the highlighted menu item and is a conventional Visual Basic open method and is described with respect to FIG. 9; |

| No. | Menu Item | Action |
|---|---|---|
| 922 | Save | This is a conventional Visual Basic save method that is used to save a previously selected program or model; |
| 924 | Visual Basic | This is a conventional Visual Basic run method for launching the Visual Basic computer program from within rehost computer program 210; |
| 926 | CVI IDE | This is a conventional Visual Basic run method for launching the CVI IDE application program from within rehost computer program 210; |
| 928 | IVI Configuration | This is a conventional Visual Basic run method for launching the IVI configuration application program from within rehost computer program 210; |
| 930 | Reports | This is a menu item that has a number of lower hierarchical menu items that are used for generating different reports depicted in FIGS. 27 to 31 and discussed hereinbelow. |

Many of the foregoing menu items are duplicated on the tabs, described hereinbelow.

When the user left clicks on open menu item 920, rehost program 210 generates a completely conventional pop-up browse menu 1010, depicted in FIG. 10. In FIG. 10, a menu item 1012 located in a list view 1014 has been highlighted. Menu item 1012 is a project entitled "Recycler_Prj.hdr", where a project is the singular file name given to a group of individually identifiable programs. Usually a project will include a translation module, a properties file, a placeholders library and a format library. See, for example FIG. 21. This file name also appears in a conventional File name text box 1016 that is located in a folder identified in a conventional Look in text box 1018. Menu 1010 is conventionally provided with an Open command button 1020 and a Cancel command button 1022. The remaining components or elements in pop-up menu 1010 are conventional and need not be discussed. When the user either simultaneously presses the "Alt" and "O" keys on keyboard 214 or places the cursor on command button 1020 and left clicks on it, the selected menu item will be opened through the use are conventional Visual Basic method. Rehost program 210 will also automatically run a conventional Visual Basic method to display a modal pop-up form 1102 depicted in FIG. 11 so that the user can select the pre-programming options.

Form 1102 is a modal form because it appears in the foreground of the screen display, but its properties are such that only it can be used and the screen in the background, which is form 800 in FIG. 8, is inactive. Thus, a modal form is the only one of a plurality of displayed forms that can be used and it must be dispatched, by left clicking on an OK command button 1104 or a cancel command button 1106, before any of the forms in the background can be used.

Form 1102 is comprised of two horizontal portions, a main portion 1110 and a bottom portion 1112. Main portion 1110 has three vertical sections, a left hand list box 1114, a right hand list box 1116, and a central section 1118 with four command buttons, a Select command button 1120, a Select All command button 1122, a Remove command button 1124, and a Remove All command button 1126. Bottom portion 1112 has three vertically aligned check boxes 1130, 1132 and 1134, a central View command button 1136, which is current not-enabled, and the aforementioned command buttons 1104 and 1106, which are currently enabled. Form 1102 also contains other well known Visual Basic objects, such as a close command button 1150 and a vertical scroll bar 1152.

The previously developed pre-programming options that are presently available to be applied to the loaded program are set forth in the left hand list box 1114. The previously developed pre-programming options are stored in a Project file that was loaded with the Rehost program "Recycler.ini," was opened.

Right hand list box 1116 is used to display the pre-formatting options that have been selected. Pre-programming options can be selected in left hand list box 1114 by highlighting them (e.g. by clicking on them with the left mouse button 218), and then left clicking on Select command button 1120. All options are independently toggle enabled so that more than one option can be selected at the same time by left clicking on them, and thus highlighting them. The options will be loaded into right hand list box 1116 in the order that they appear in left hand list box 1114. They are moved as a group by left clicking on Select command button 1120. All of the items in list box 1114 can be selected by simply left clicking on Select All control button 1122. Rehost computer program 210 reads the Project file along with the legacy dialect being loaded if previously associated with that file. Additional options can be added by using an editor program and storing them in the Project file (not shown) or by checking the "Update Project File" check box 1130. In another embodiment, FIG. 11 could also have a VBE button, similar to button 1428 discussed hereinbelow, so that a user can go directly from this form 1400 to a Visual Basic Environment to create other import options.

Figure 11:
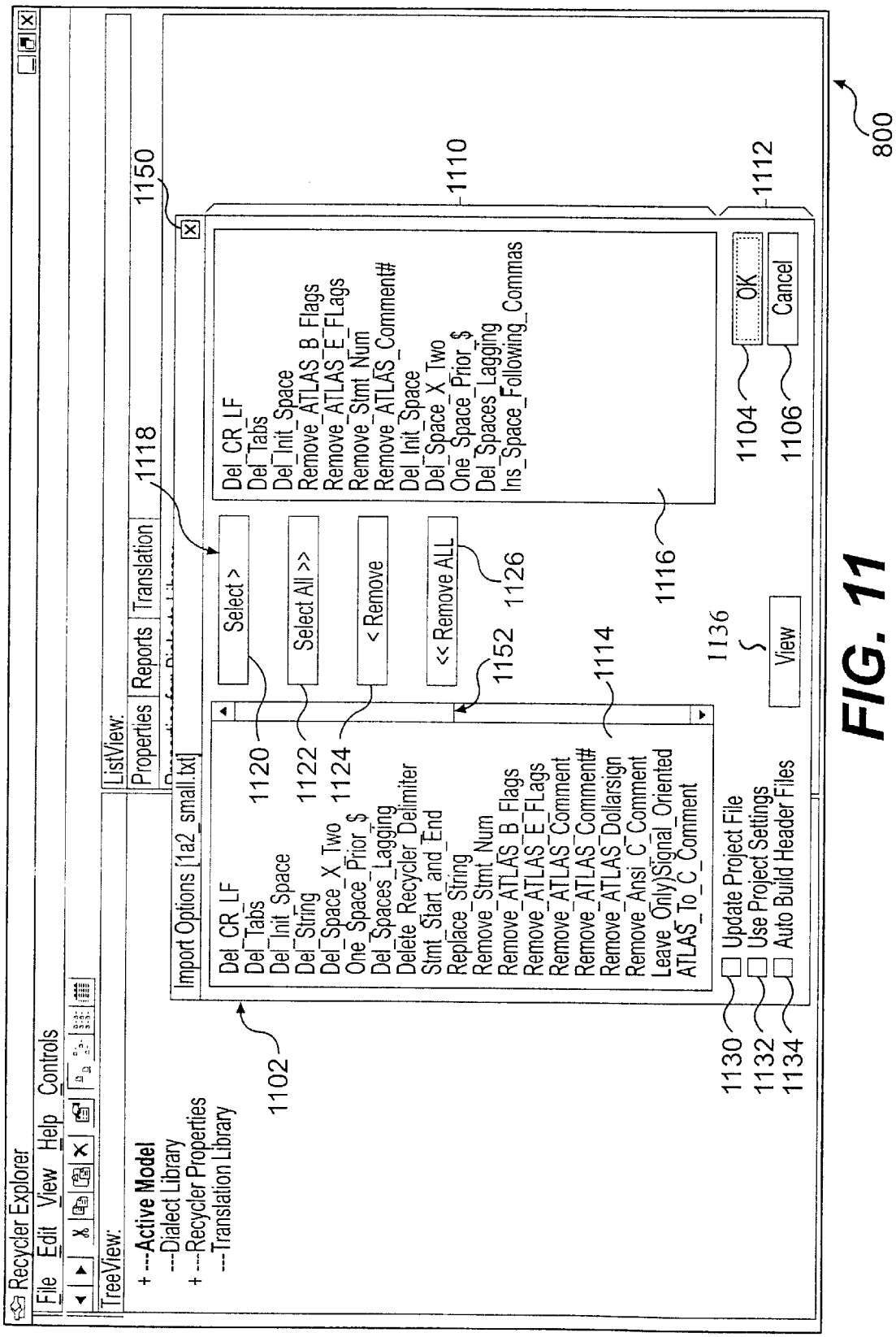

It can be seen in FIG. 11 that there are several pre-programming options that have been already stored in right-hand list box 1116. These option items were previously selected in a prior session and stored in a file that is much like a conventional Microsoft Windows INI file. Obviously, a file imported for the first time will not have any options in the Project File and right and list box would be blank.

The preselected pre-programming options are as follows:

| Option | Function |
|---|---|
| Del_CR_LF | Delete Carriage Return and Line Feed |
| Del_Tabs | Delete Tabs |
| Del_Init_Space | Delete only the initial space |
| Remove_Stmt_Num | Remove statement numbers |
| Remove_ATLAS_Comment | Remove any ATLAS comments |
| Remove_ATLAS_B_Flags | Remove any ATLAS B Flags, i.e. any branch flags |
| Remove_ATLAS_E_Flags | Remove any ATLAS E Flags, i.e. any entry point flags |
| Del_Init_Space | Delete only the initial space, which is necessary because removing any of the flags returns a space |
| Del_Space_X_Two | Delete all leading spaces if there are at least two spaces |
| One_Space_Prior_$ | Insert a space before the delimiter, "$" |
| Del_Spaces Lagging | Delete spaces following a delimiter |
| Ins_Space_Following_Commas | Insert space following commas. |

Obviously, the particular options selected are highly dependent on the dialect of the legacy or input test program. The goal is to provide a plurality of individual statements separated by a delimiter that are standardized so that all subsequent statements having the same verb will end up after pre-formatting having the same syntax and grammar irrespective of the particular idiosyncrasies of the programmers who wrote the code. Note that as depicted in FIG. 5 or 6A, all of the options are applied to each statement of code of the loaded file.

Individual previously selected pre-formatting options that have been selected and moved into list box 1116 can be removed singularly by highlighting them and then clicking on Remove command button 1124. Alternatively, all of the listed options in list box 1116 can be removed therefrom by left clicking on Remove All command button 1126.

The previously developed pre-programming options in list box 1114 that were not previously checked and loaded into list box 1116 and which are visible in left hand list box 1114 are additional options which were not deemed necessary for formatting the loaded file. Their functions are obvious to an Atlas programmer and need not be listed.

Check box 1130, which is shown as being not-enabled, is checked and used to update the Project file with the latest selection in right-hand list box 1116 when the OK command button 1104 is clicked on. Check box 1130 becomes enabled when a change is made to the list in list box 1116. Check box 1132 is checked if the user does not want to make any changes in the project settings and thus when the OK control button 1104 is left clicked on, the unique project settings for each file is applied and form 1102 will not appear before each file. Check box 1134, when checked will automatically generate and store header files for each file in the project file. When check box 1134 is checked, View command button 1136 is enabled and if then clicked on, will depict the current information in the Header files.

When the OK command button 1104 is clicked on, an event occurs which triggers rehost computer program 210. Rehost program 210, as set forth in the While loop 610 of FIG. 6A, then applies all of the options which have been set in right hand list view 1116 on a statement by statement basis to the files being loaded, and parses and displays the files in tree view 822, as depicted in FIG. 12.

With reference now to FIG. 12, the selected sample test program for FIG. 12, in the ATLAS dialect, is shown in a tree 1202 beginning at a line or branch numbered 1204. Note an expanded or opened expansion box 1206 at line 1204 and a collapsed or closed expansion box 1208 in a line 1209 for a folded program called ANSI__C. Note also that all of the loaded programs have been loaded in the dialect library, which was empty in FIG. 8 as shown by not having an expansion box, and that there is now a Concurrency Library at a line 1210, and which is explained hereinbelow. All of these files and libraries were part of the project of menu item 1012. One item in tree 1202 has been highlighted at branch 1212, namely the statement "SETUP POWER SUPPLY 5 ON $". Because of the pre-programming options that were applied as shown in FIG. 11, there is now a space between the word "ON" and the dollar sign, thereby making the line more readable. The properties of the statement in branch 1212 appear in Statement Number(s) text box 884 of list view 824. The only properties attached to line 1212 are that this statement appears twice in the test program, namely at statement numbers 222 and 270. However, this statement only appears once in tree 1202 because of the inquiry about the statement being unique that was made at decision diamond 617. Note also that at this point in the process, this statement has not been generalized because the power supply has a specific identification, namely number 5. The exact identity of the highlighted statement including its location are detailed in a line 1220 in list view 824.

At this point in the process, a user may desire to work on a different active model. This can be accomplished by right clicking in tree view 822 and selecting a new active model or by highlighting the active model branch, opening up the expansion box, and typing in a new project name or model name. In other embodiments of the invention, there is only one active model and rules are set up to prevent more than one. In this embodiment, a right click of the mouse button with the cursor in tree view 822 would bring up a browse selection and a particular desired file that had been previously loaded into memory or available on a network could be loaded and dragged to the location of the Active Model branch. The rules then delete the previous entry and substitute for it the dragged file. Another way is to have loaded the file in tree view 822, highlight it, and then drag it up to Active Model.

After auto model routine of process box 512 has been run, the user must generalize the statements. The result of this process is shown in FIG. 6B, which is performed by the user, and the screen is shown in FIG. 13. However, prior to performing this process, the operator has saved the parsed version of the ATLAS program in a Translation Libraryby dragging and dropping it to the translate library.

Thus, it can be seen in FIG. 13 that form 800 is showing a translation model in tree view 822 that has a highlighted branch 1304. The selected translation model is a file entitled "XLAT__ATLAS__To__ANSI__C" located in the Translation Library. The SETUP POWER SUPPLY statement in branch 1304 has been generalized. The user has simply selected the number "5" and has replaced it with the string "<integer>". As described hereinabove, when a test program that is being rehosted is being treated (e.g. preprocessed or parsed) by rehost program 210, it is done one statement at a time. Thus, any generalized terminology such as "integer", "string", or "store" is required to be unique only on a statement by statement basis. See for example line 1310 in FIG. 3. Should there be two integers per statement, usually occurring in two different elements, but sometimes in the same element, then the integers would have to be assigned unique names, such as "string__1" and "string__2." However, the general term of simply "string" can be used in multiple statements because rehost computer program 210 according to the present invention treats each statement individually.

FIG. 13 also shows the results of creating the translation relationships of box 506. As an example, the translated version into the ANSI C language of the ATLAS statement SETUP POWER SUPPLY in branch 1304 is depicted in a branch 1306. Branch 1306 was added by clicking on the menu selection 916 in pop up menu 902. The appropriate translation was added by the user, for example by typing it in, in folded sub-branches 1308. Alternatively, another embodiment of the present invention could utilize a program to locate well known statements and add their well known translation branches. Because of the provision of the parsed dialect model in a tree view having only unique branches, this alternative is possible.

With reference now to FIGS. 14 through 20, the process of translating a selected test program using a selected translation module is described. The process is begun by selecting translation tab 874, and has been previously generally described with reference to FIG. 4 and described in greater detail with reference to FIG. 7.

FIG. 14 shows a form 1400 that is obtained by left clicking on translation tab 874, and that is "superimposed" on form 800, but blocking only list view 824.and leaving tree view 822 still visible. When Translation tab 874 is clicked, four sub-tabs are displayed: a ListView sub-tab 1402, which is the default tab and is the one shown selected in FIG. 14, an Xlate sub-tab 1404 (meaning "translate" and depicted in FIG. 15), a File sub-tab 1406 (depicted in FIG. 16) and a Model Match sub-tab 1408 (not depicted), all described hereinbelow.

In FIG. 14, it is seen that tree view 822 has been populated by a translation module that was opened and loaded as described hereinabove. Note that the file name of the translational model, named "ATLAS_To_ANSI_C," appears on a line or branch 1410 and that the model has been generalized. Note also that one of the expansion boxes 1411 has been expanded to reveal the translation of the statement "SETUP POWER SUPPLY <integer> ON $" in a tree format under a translation code "(XLTR)" that is recognized by rehost program 210 as containing a translation in subbranches thereto.

Form 1400 is comprised of a left hand list box 1412, that is similar to left hand list box 1102 and a right hand list box 1414; and a central portion 1416 having six command buttons. Four of the command buttons, a Select command button 1420, a Select All command button 1422, a Remove command button 1424 and a Remove All command button 1426 are identical in function to their corresponding command buttons in FIG. 11, described hereinabove. The two new command buttons are a Single Step command button 1427 and a VBE (Visual Basic Environment) command button 1428.

Left hand list box 1412 has been populated by a list of possible preformatting choices that have been stored in a Recycler Properties library (shown in library 862 in FIG. 8) and loaded when the rehost program was loaded as described hereinabove with respect to FIG. 7. The possible choices appear above a line 1440 reading "<Active Model>." Below line 1440 are a list of available translational models, each model having its own attached set of possible preformatting choices.

Right hand list box 1414 is presently populated by an ordered set of preformatting methods, but would have been empty if the selected test program to be rehosted was new. FIG. 14 permits the user to create the ordered set of preformatting methods or to alter a previously created set. Its operation is substantially similar to the selection of preformatting methods described hereinabove with respect to the creation of a dialect model in FIG. 11. The list or set of preformatting methods in list box 1414 are sometimes terminated by an entry entitled "<Active Model>," not shown in FIG. 11, but if there it would be the last line in the list in list box 1414. Post processing methods would then follow the line bearing the text "<Active Model>." In the view of the invention depicted in FIG. 14, there is one post processing method. However, examples of typical post processing methods were discussed above with respect to FIG. 4, some of which include inserting indents and collecting statistical data.

Single Step command button 1227 is, as its name implies, an event initiating button that causes rehost computer program 210 to run a method that cycles a single instruction through While loop 734 in FIG. 7A. Typically during a rehosting operation, if a user has selected a run option of a Stop On Miss (see Process box 714 in FIG. 7), the rehosting operation will halt if no match were found for a formatted statement. The method of single step command button 1427 permits a user to evaluate each application of the format options to the statement being treated. Clicking on Single Step button 1427 will cause a modal pop-up menu (not shown) to appear. This menu has four vertically aligned text boxes: one displays the import option being applied; a second displays the original statement before any treatment has been applied; a third displays the statement just before the import option has been applied; and the fourth displays the statement just after the import option has been applied. There are also two buttons located in a row below the bottom text box: a Next button which will cause rehost computer program to run the next import option; and a Continue button which returns rehost computer program 210 to its normal functioning. Thus, the method behind Single Step command button 1427 is used to check the correct application and correct order of the preformatting methods.

VBE button 1428 permits the user to launch a Visual Basic Environment so that additional programming can be done without leaving rehost program 210. Thus the user can create additional methods for list view 1412.

Storing different methods can be done as a compiled DLL (Dynamic Link Library). Examples of four DLL's are seen at the bottom of the list in list view 1412. However, since the DLL's are usually used in the background by rehost computer program 210, they are not seen by the user. Their use, however, is well known to those skilled in the art. Occasionally, a user would want to use the method of a DLL in either the preprocessing or post processing steps and that can be set up in FIG. 14 by highlighting moving the desired DLL method to select it, and then moving the selected method from list view 1412 to list view 1414 with the use of Select command button 1420. The exact location of the entry is made below a highlighted entry in list view 1414.

Once the appropriate preformatting methods are selected in FIG. 14, or the existing ones accepted or modified, the user can singularly check on the operation of one or more of the options by left clicking on Xlate sub-tab 1404. This runs the method depicted in FIG. 7A.

Left clicking on sub-tab 1404 brings up form 1500 which, like form 1400, and which is used to perform the method of FIG. 7A. Form 1500 is comprised of two vertically aligned text boxes, an upper "Source" text box 1512 into which parsed and formatted legacy code is entered, and a lower "Destination" text box 1514 into which rehost computer program 210 returns the translation of any exact match that is found. As seen in FIG. 15, Source text box 1512 contains one line of code on line 1520, and destination text box 1514 contains two lines of code on lines 1522 and 1524.

As in FIG. 15, tree view 822 contains the same translation module as depicted in FIG. 14. FIG. 15 depicts what happens if the line of code, i.e. the statement, "SETUP POWER SUPPLY 1 ON $" is entered into Source text box 1512 at line 1520, for example from keyboard 214. The typing of each letter in text box 1512 causes an event to trigger the operation of the method depicted in FIG. 7A. For each letter, rehost computer program 210 cycles through all of the lines of translation module 1410 to see if there is an exact match. However, no match can be found for any incomplete part of the statement. Thus rehost program 210 does not return any translated code to Destination text box 1514 until the entire statement is correctly, completely typed in, including the dollar sign ($) delimiter. As soon as the dollar sign is typed in, rehost program 210 finds an exact match in the translation module at line 1410 and returns the attached translated code, seen indented under line 1411 in tree view 822, and placeholder data to Destination text box 1514, as seen therein at lines 1522 and 1524.

Clicking on sub-tab 1406 brings up form 1600 which, like forms 1400 and 1500 is "superimposed" on the right side of form 800. Form 1600 is used to perform the method of FIG. 7B. Form 1600 is comprised of two vertically aligned rich text boxes, an upper "Source" text box 1612 into which rehost program 210 automatically loads a selected file containing legacy code, and a lower "Destination" text box 1614 into which rehost computer program 210 returns code as described hereinbelow. A first line 1620 of Source text box 1612 bears the title "Source" to indicate that the legacy or source test program is to be received therein. Similarly, a first line 1622 of Destination text box 1614 bears the title "Destination" to indicate that code will be returned there.

Figure 19A:
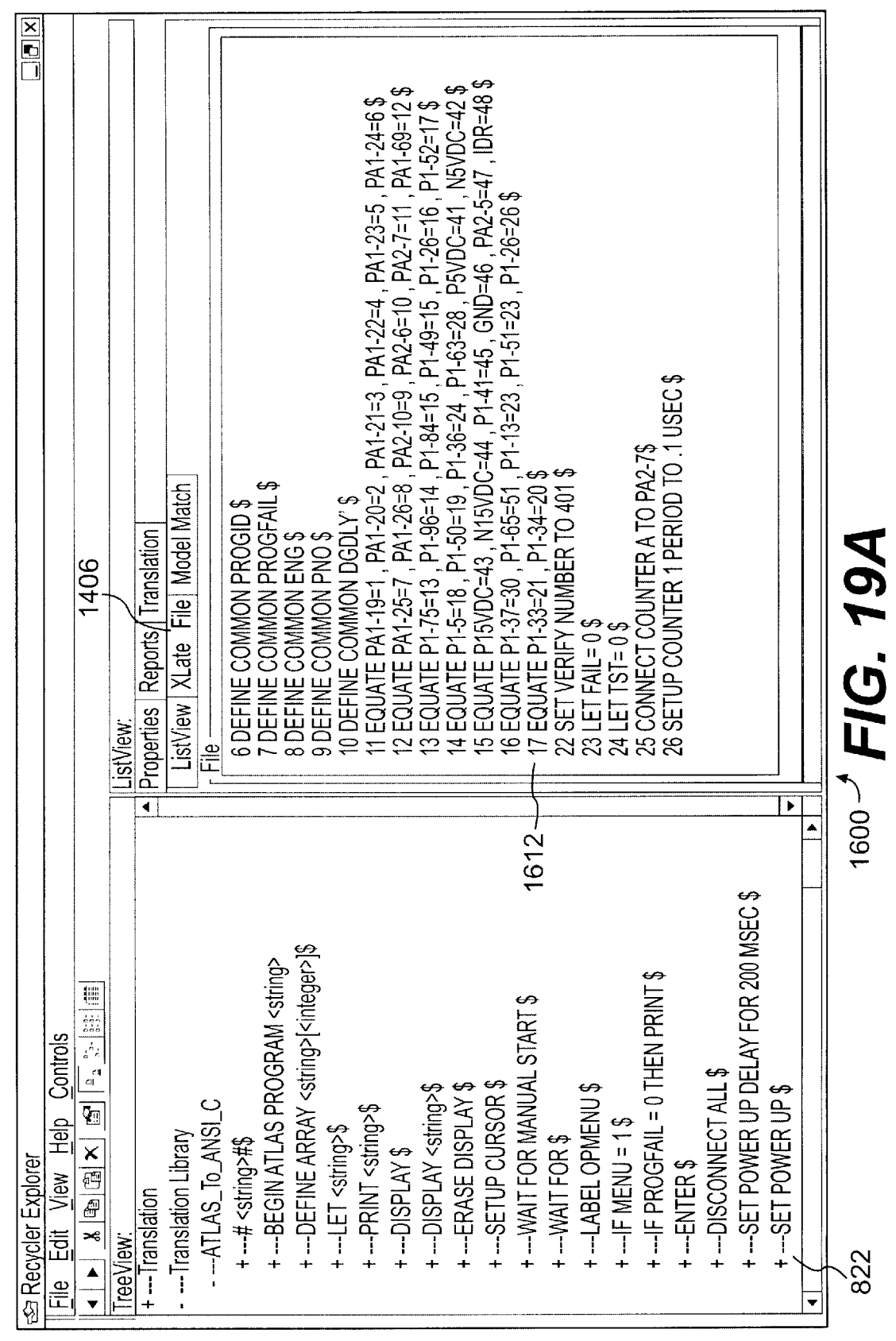
Figure 19B:
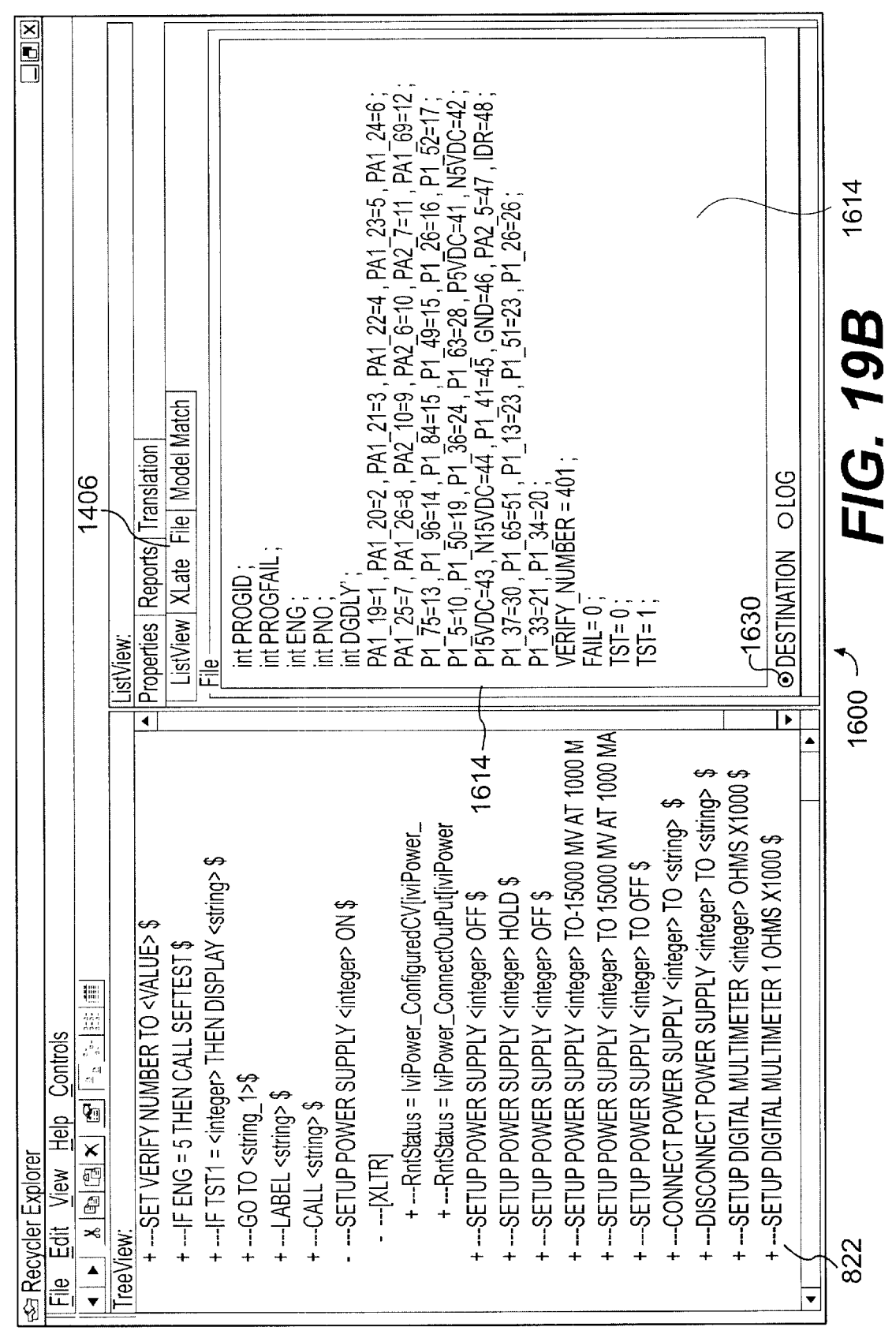

At the bottom of form 1600 are two horizontally aligned option buttons, a Destination option button 1630 and a Log option button 1632. In Visual Basic programming, a group of option boxes can only have one which can be active at a time. In form 1600, Destination option box 1630 is indicated as being active by containing a black dot. Left clicking on Log option box 1632 will active it and deactivate option box 1630 (as shown in FIG. 20). When the user clicks on Destination option box 1630, which is also the default choice, the statements returned to Destination text box 1614 by rehost program 210 are the successful translations in the target dialect of the statements in the legacy code dialect, as seen in FIG. 19 and discussed in connection therewith hereinbelow. When the user clicks on Log option box 1632, the statements returned to Destination text box 1614 by rehost program 210 are the unsuccessfully translated statements of the legacy code, as seen in FIG. 20 and discussed in connection therewith hereinbelow.

Figure 17B:
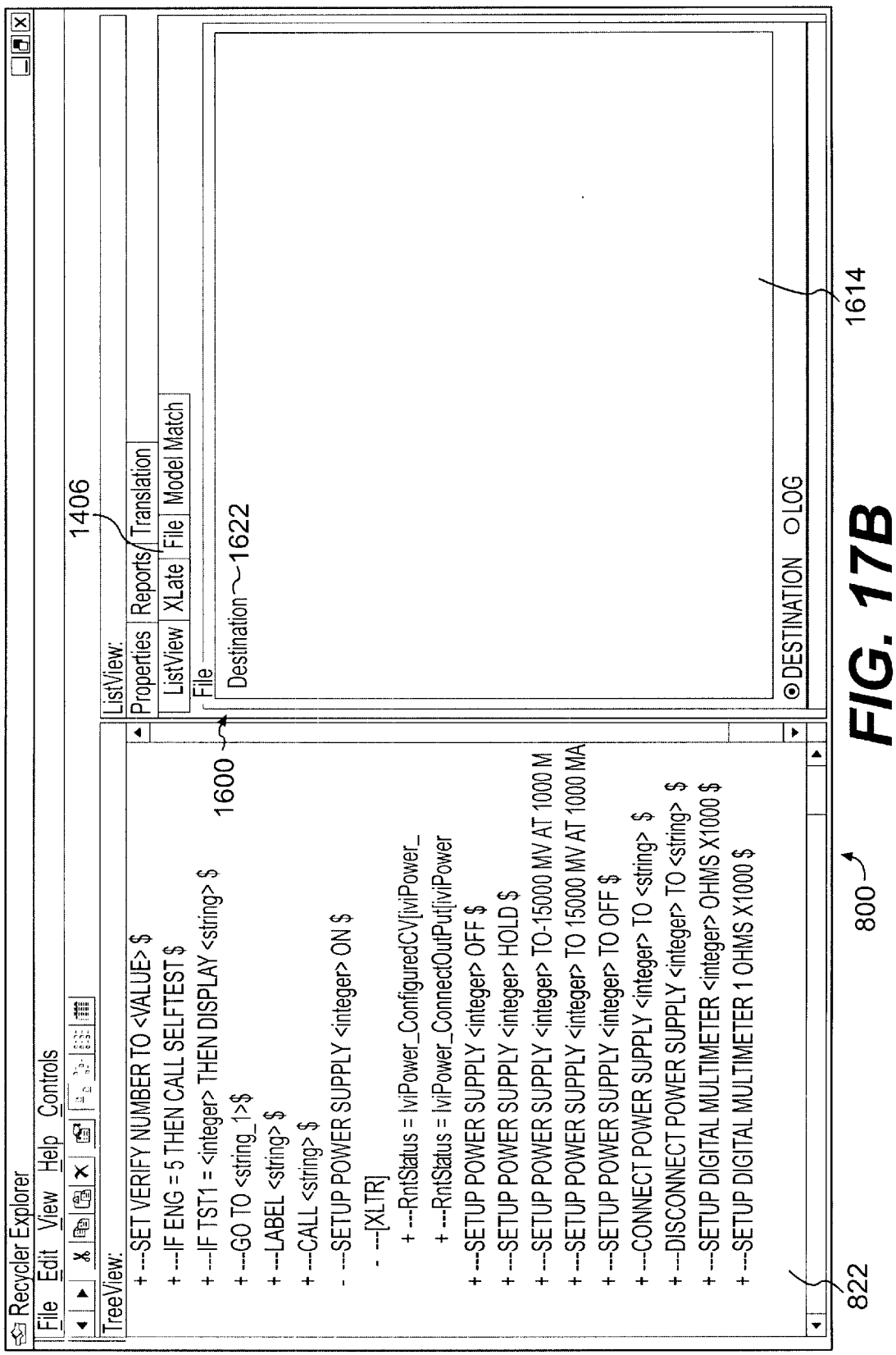

Also depicted in FIG. 16 is a pop-up menu 1650. Menu 1650 contains 7 menu items: an Open File menu item 1652, shown highlighted in menu 1650; a Recycle menu item 1654; a Recycle All menu item 1656; a High Speed Recycle menu item 1658; an Insert Comments into Destination menu item 1660; a Stop On Miss menu item 1662; and a Copy menu item 1664. Open File menu item 1652 when clicked will bring up pop-up browse menu 1010. The file to be opened is highlighted by left clicking on it and then the Open command button is left clicked. The result is depicted in FIG. 17. The loaded program has not be formatted and has not been parsed. In the loaded program there are statement numbers, comma separators and no spacing before some delimiters.

Recycle menu item 1654, Recycle All menu item 1656 and High Speed Recycle menu item 1658 respectively begin the translation operation described hereinabove with respect to FIG. 7 of either a single statement, all the statements of a single program, or all the statements of a string of programs. As shown in FIG. 18, these menu items begin the process depicted in process box 716 of FIG. 7.

Insert Comments menu item 1660 and Stop On Miss menu item 1662 are two recycling options and they correspond to the operation in process box 714 in FIG. 7, and are described in connection therewith hereinabove. Copy menu item 1664 permits the user to copy previously highlighted text into the clipboard of operating system 208 of translation engine or computer 200.

Rehost computer program 210 is in a wait state as shown in FIG. 18 until the user left clicks on Recycle All menu item 1656. At that point, rehost computer program 210 goes though the process of FIG. 7B. The first thing done, as stated in process box 752, is that a line is read from file source window or text box 1612, formatted and placed in XLAT Source window or text box 1512. As soon as the line is placed in text box 1512, as described above, rehost program 210 searches for a match, statement by statement, of the statements in the translation model 1410 in tree view 822. As seen in process box 754, the program waits for a response from XLAT Destination window or text box 1514, which response occurs when an exact match is found and the result is stored in XLAT Destination text box 1514. As soon as an entry is made in text box 1514, an event is triggered to cause rehost computer program to write that entry in File Destination window or text box 1614, as stated in process box 756 and as depicted in FIG. 19, in text box 1614. At the same time, the appearance of the translated statement of the program in File Source text box 1612, as shown in FIG. 19, is changed as a result of the successful translation. In a presently preferred embodiment of the invention, the originally loaded code is in black letters and its color is changed upon the successful translation to green. In FIG. 19, in text box 1612, lines 13–24 and 29 have a gray appearance in the black and white figure, but in a color screen 213 have a green appearance or color. On the other hand, lines 25 to 28 were unsuccessfully translated, i.e. no exact match was found in the translation model in text box 822 in FIG. 19, and their appearance is unchanged. In both FIG. 19 and on a video monitor screen 213, these lines have a black appearance or color.

With reference now to FIG. 20, form 1600 is depicted, but here Log option button 1632 has been activated and Destination text box 1614 contains statements from the legacy code that were not translated. The user at this point can readily evaluate the statements that were not translated because they have been stored in text box 1614 in their unformatted state. With this lob view, it is easy for someone knowledgeable of the dialect of the legacy code to make a visual comparison and then a deduction as to what additions have to be made to translation model 1410. For example, in line number 26 in Destination Window text box 1614, the verb in this ATLAS statement is "SETUP." and the noun is "COUNTER." However, a quick check of the entries in tree view 822, in FIG. 20, reveals that there are no verb SETUP that is used with a noun COUNTER. One thing that could be done at this point is to simply model this legacy code by using the method in FIG. 5, which would add the SETUP COUNTER statement to translation model 1410. Another approach could be to use the features of FIG. 15 to individually model this statement.

Another important use of the present invention is to be able to provide a number of different reports about any legacy or target program test program without recycling the program. These reports are depicted in FIGS. 27 through 31, which are generated by the forms depicted in FIGS. 21 through 26.

With reference now to FIG. 21, left clicking on Reports tab 872 brings up form 2100 as the default form and which, like forms 1400,1500, and 1600, is "superimposed" over only the right side of form 800 and thereby leaves tree view 822 exposed. Form 2100 has a top portion 2102 and a bottom portion 2104 that is simply a large list view 2106. There are six sub-tabs under Reports tab 872, which means that there are six different reports that can be generated. These sub-tabs are a Quantity sub-tab 2110, a User Defined sub-tab 2112, a Signal Range sub-tab 2114, a Test Strategy sub-tab 2116, a TPS Flow Charts sub-tab 2118, and a Signal Concurrency sub-tab 2120. These sub-tabs perform the same method as, and in that sense are duplicates of, a plurality of menu item choices depicted on a pop-up menu depicted in FIG. 26 and discussed herein below with respect to that figure.

Top portion 2102 of form 2100 includes 6 text boxes into which information can be entered and 8 command buttons. The text boxes include a file name text box 2130; a separator text box 2132; a delimiter text box 2134, an element depth text box 2136; a User Defined text box 2138. The 8 command buttons include the following four enabled or activated command buttons: a Browse command button 2150; an Export Range command button 2152; a View Report command button 2154 and a Clear Table command button 2156; and include the following four disabled command buttons: Selected Item command button 2160, All Items In Branch command button 2162, All Items For Project command button 2164, and User Defined command button 2166. Also included in top portion are the aforementioned sub-tabs of the Reports tab 872.

Figure 28:
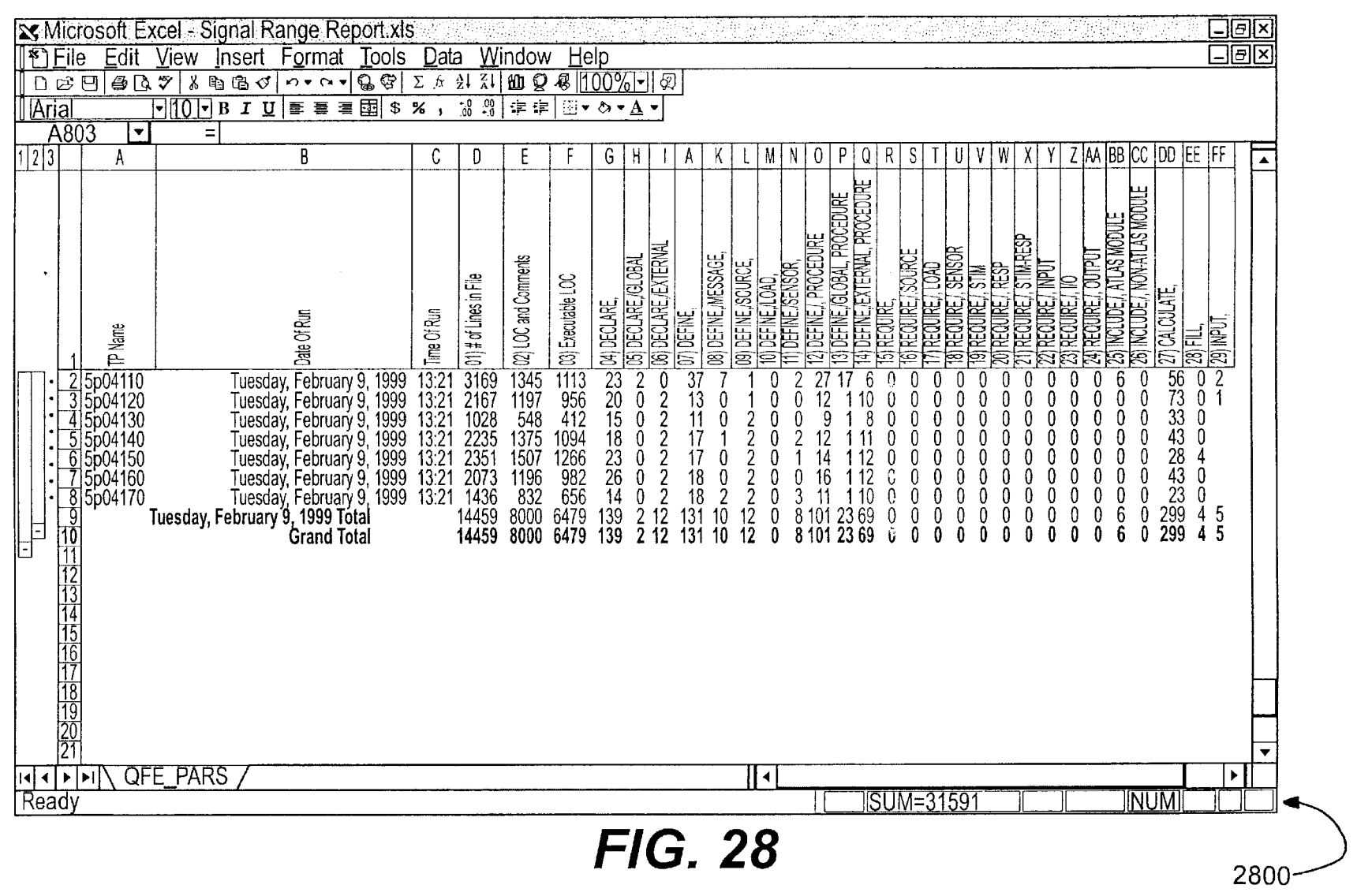

Form 2100, which is the default form when 872 is left clicked or when Quantity sub-tab 2110 is left clicked on, is used to organize the data for a Quantity Report 2800, depicted in FIG. 28. With reference then also to FIG. 28, report 2800 is generated based on the information contained in a computer program, such as a test program, that has undergone the formatting and parsing discussed hereinabove with respect to FIGS. 7, 7B and 14 to 20. The information for Report 2800 is generated by the methods and code behind form 2100 and is provided in a format that is compatible with conventional of the shelf (COTS) spreadsheet software. In the particular example of report 2800, the COTS spreadsheet software is Microsoft Excel. Report 2800 is comprised of a plurality of cells uniquely defined by a numbered row and a lettered column. For example, cell A1 contains the heading "TP Name."

Figure 32:
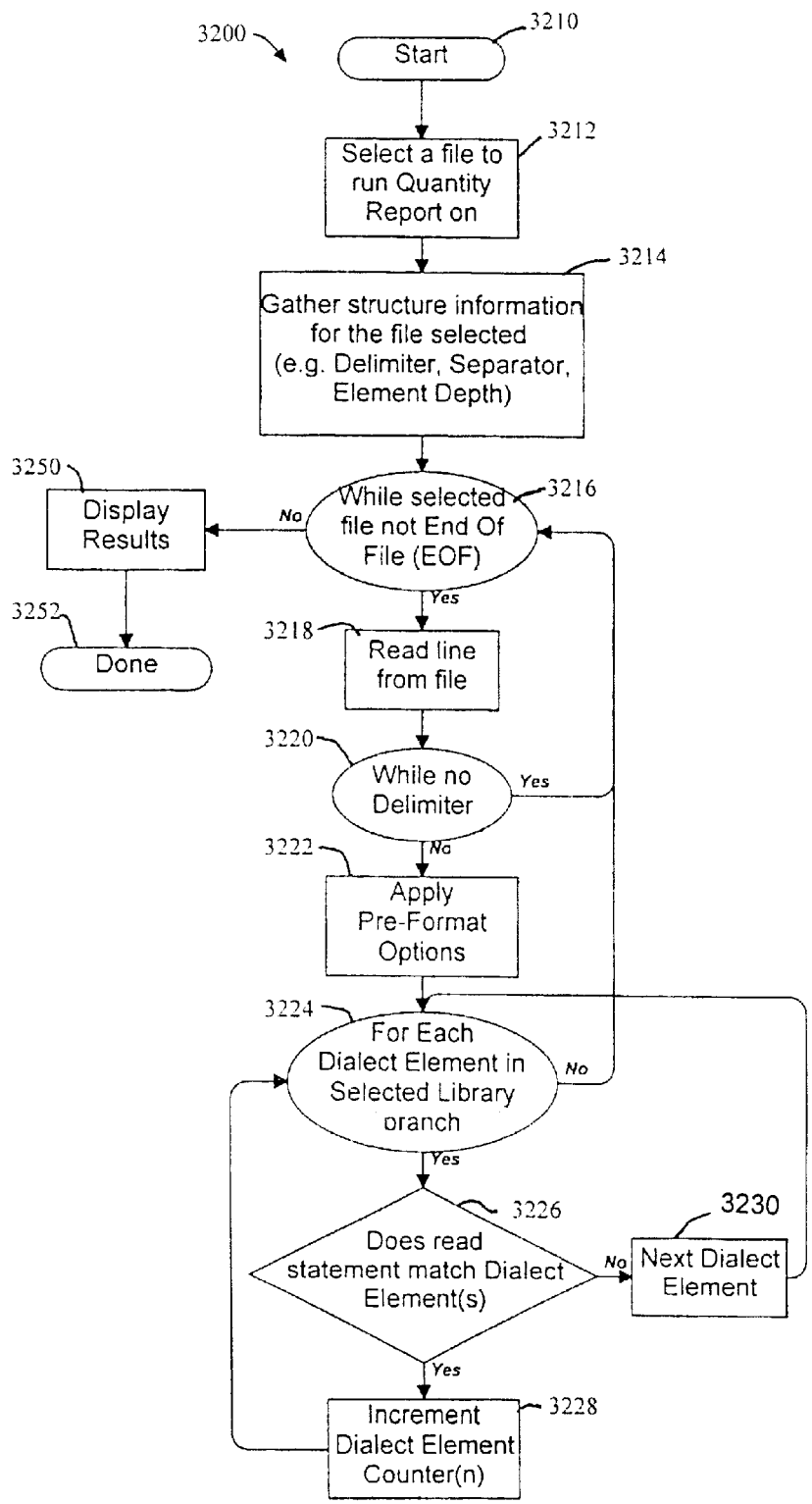
FIG. 32 is a detailed flow chart of a routine that generates the output that is used by an application program to create the Quantity report depicted in FIG. 28.

With references now to FIGS. 21, 28 and 32, the generation of Quantity Report 2800 will be described. Quantity Report 2800 is generated with a routine 3200 depicted in FIG. 32. Routine 3200 begins in a start terminal 3210 and proceeds to a process box 3212 where the user selects a file on which to obtain a Quantity Report 2800 by entering the file name in text box 2130. The routine then advances to process box 3214 where the structure information about the selected file is obtained from the information entered into text boxes 2132 (for the identity of the separator), 2134 (for the identity of the delimiter) and 2136 (for the element depth that is desired to be included). The element depth is the branch level to which the program will go to seek a match. In an average test program, the depth is usually around five, but has been as large as 20. Thus, the depth chosen depends upon the details needed. For example, if a user only wanted to know the quantity of a certain type of statement such as a set statement, then only a depth of one would be needed. Obviously, the larger the number of depths the longer the program takes to run.

Once the structure information is obtained, routine 3200 proceeds to a while loop begun by a While oval 3216. This is done by the operator left clicking on All Items in Branch command button 2162. Button 2162, shown disabled in FIG. 21, automatically becomes enabled when all of the appropriate information is entered in text boxes 2130, 2132, 2134, 2136 and 2140. While loop 3216 checks for an End Of File indication and if one is not found, routine 3200 proceeds to read as many lines as are necessary to find a statement delimiter. This is accomplished through process box 3218 and a While oval 3220. Once a delimiter is found, the routine branches to a process box 3222 where the pre-format options are applied. This application can be identical to that described hereinabove, such as by reference to FIG. 6A.

The routine then proceeds to a While loop 3224 where the read statement from the source program is compared against each statement in a dialect model selected by entering its name in text box 2140. The dialect model can alternatively be selected by being highlighted in tree view 822 (e.g. see FIG. 21 where the entry in tree view 822 of "Active Model" is highlighted and also appears in text box 2140. While loop 3224 is comprised of a decision diamond 3226 where it is decided if the read statement matches any dialect element down to the level indicated in test box 2136, and if so, the corresponding one of a plurality of individual counters is incremented. If there is no match, then the routine automatically branches to the top of While loop oval 3224 through a process box 3230 in which the next dialect element is selected. When an End Of File is detected, or when there are no further statements to be processed, the program branches to a process box 3250 where the results of the process, that is the number of each element, is displayed in a spread sheet, such as shown in FIG. 28. It is noted that by comparing each statement of the source file with a shorter list of dialect elements, that the process takes less time to accomplish. It is also noted that this routine does not report on any source statement not found in the dialect model.

With reference again to FIG. 28, printed along spreadsheet row 1 from columns A through F are the headings that identify the particular computer program (whether it is a TP or any other type of computer program) and give particular information about the generation of the included data. This information includes the Test Program name, the date (which has been redacted from the figure), the time of run, the number of lines of parsed code and the number of executable lines of code. From column G through as many columns as are needed are the program verbs. In rows 2 to as many rows as are needed are the unique operations or runs of a particular program. In columns G through the end are the number of times that the particular statement listed in row 1 was located within the program identified in cell A2. For example, the program statement "DEFINE" identified in cell J1, appears in each of the 7 programs. As seen in cells K1–Q1, the statement DEFINE actually has a number of species that are also listed. Obviously, the totals of all occurrences of the individual species equal the number under the generic listing.

The Quantity report is useful if a translation model is to be built based on a particular legacy program. Although a tree view such as in FIG. 12 gives the range, it does not give the number of times a particular statement is duplicated in the program. The quantity report gives that number and it will enable the user, for example, which statements are the heavy hitters and the ones perhaps to begin with when building the translation model. It will also identify the unique statements that are in the legacy program.

Figure 22:
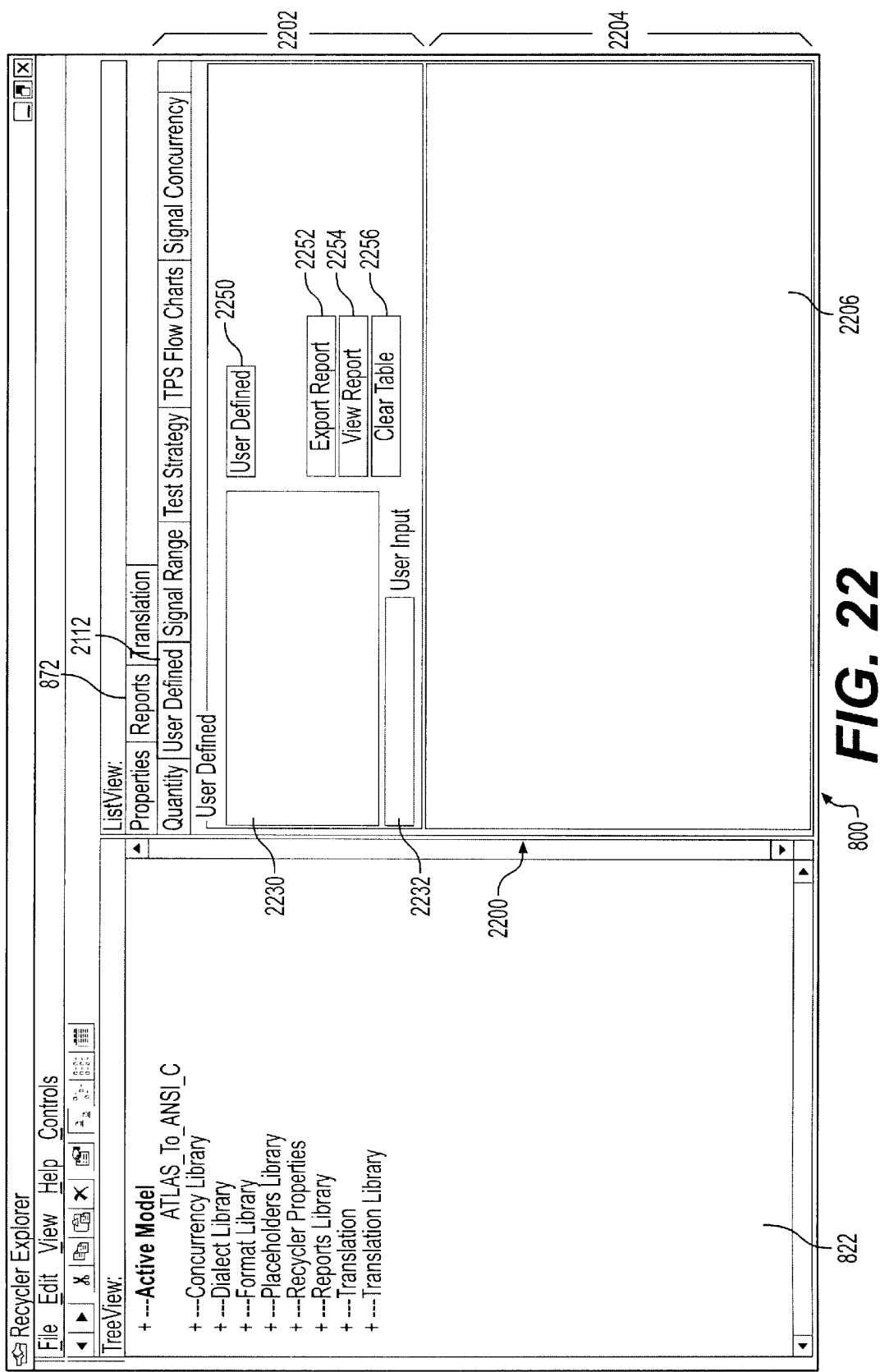

Left clicking on User Defined sub-tab 2112 brings up form 2200, depicted in FIG. 22. Form 2200 can be used by the user to develop a particular report desired by the user. Form 2200 is divided into a top portion 2202 and a bottom portion 2204 that is simply a large, multiple column list box 2206. Top portion 2102 includes 2 text boxes into which information can: be entered and 4 command buttons. The text boxes are a user defined text box 2230 and a user input text box 2232 which is used by the user to enter strings. The 4 command buttons are all enabled and include: a User Defined command button 2250; an Export Range command button 2252; a View Report command button 2254 and a Clear Table command button 2256.

Figure 23:
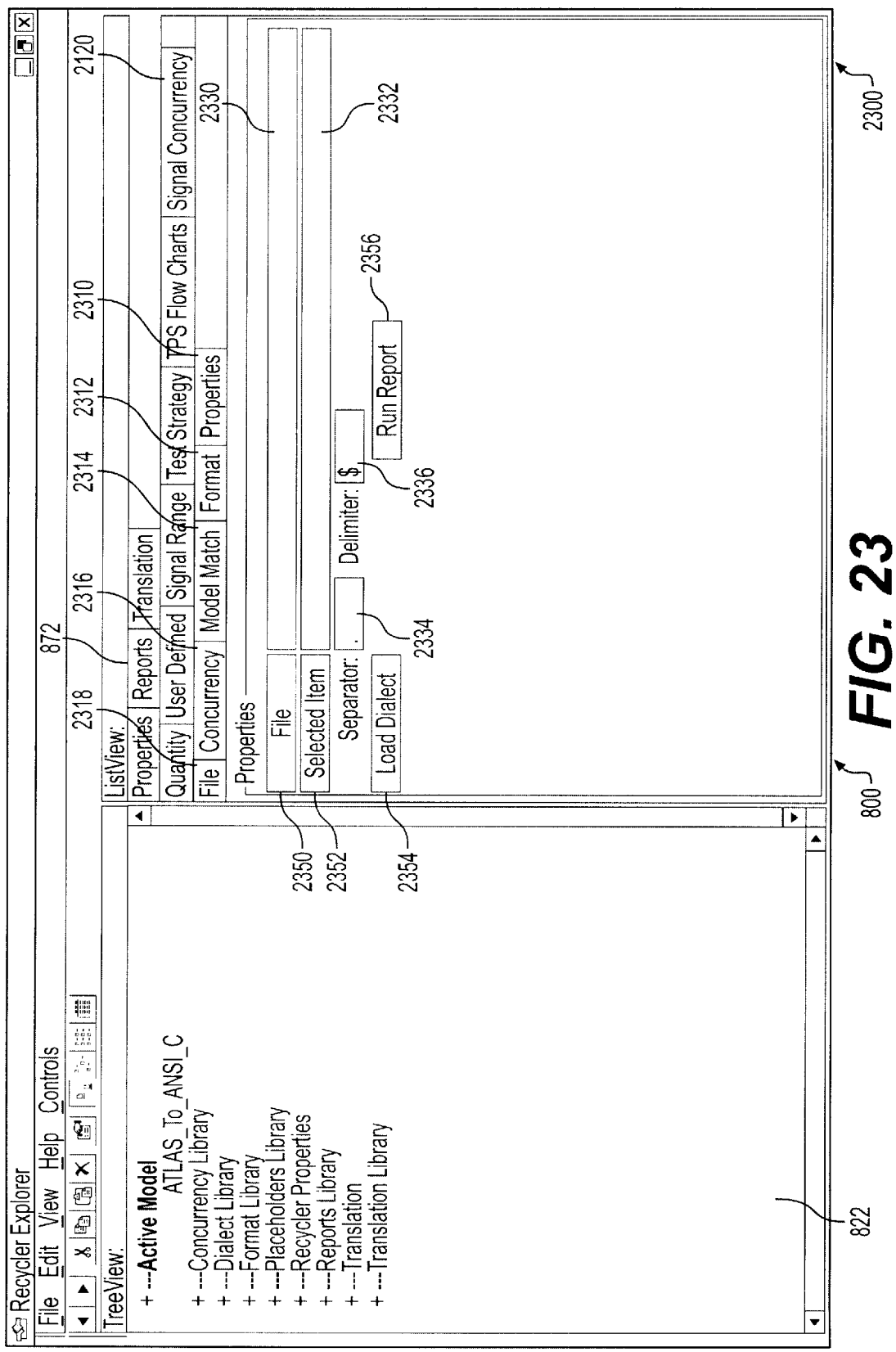
Figure 31:
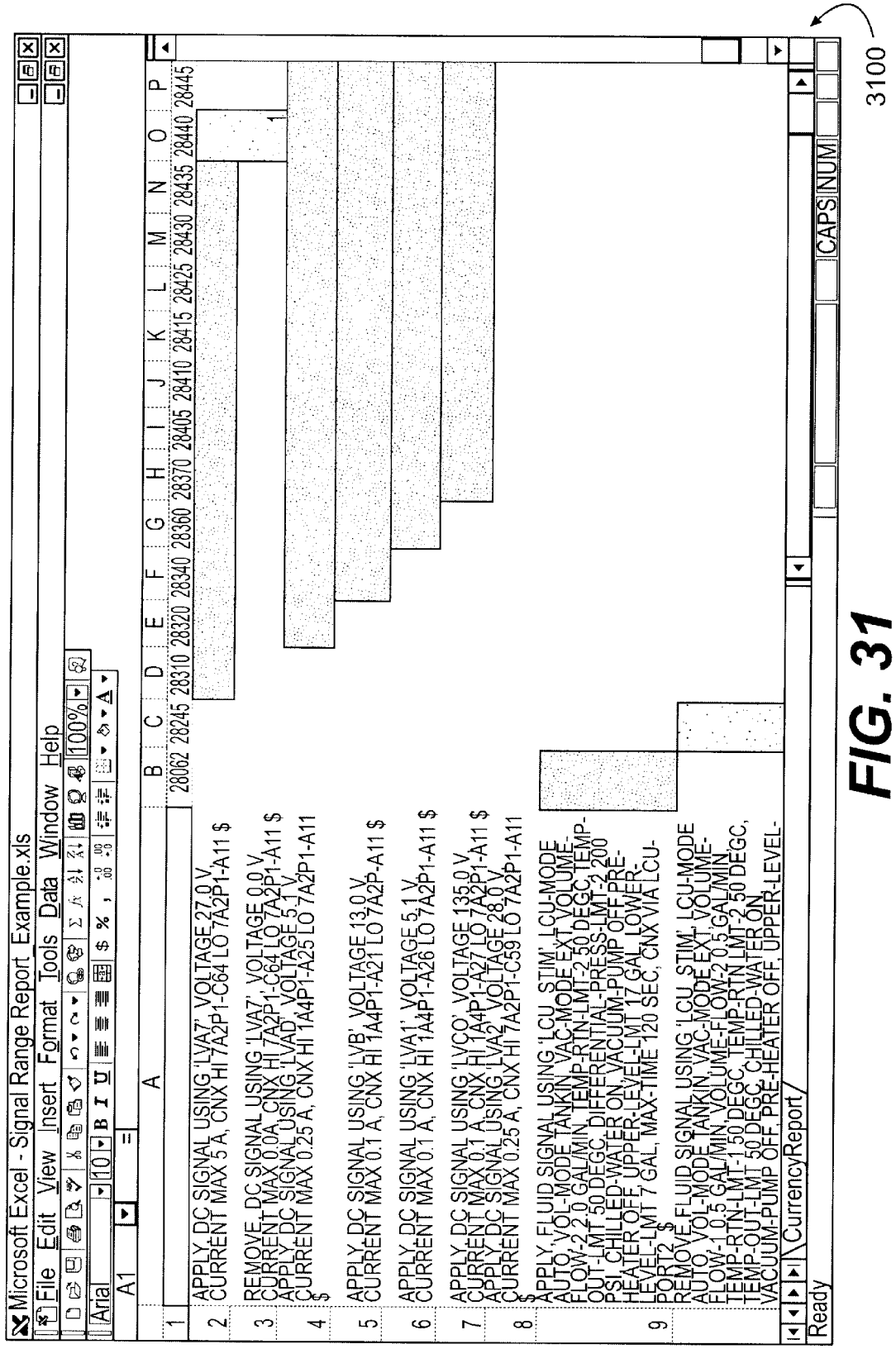

Left clicking on Signal Concurrency sub-tab 2120 brings up form 2300, depicted in FIG. 23. Form 2300 is used to generate a signal concurrency report 3100 depicted in FIG. 31. This report presents in a spread sheet format the simultaneous occurrence or coincidence of signals in contiguous statements. For example, as shown in FIG. 31, the application of a signal LVA7, shown in cell A2 first occurs in statement number 28310 and stays applied through statement 28440. This is concurrence of this signal with, for example, a signal LVA0 through statement numbers 28320 through 28440.

When sub-tab 2120 is left clicked, five sub-sub-tabs are generated. The default sub-sub-tab is a Properties sub-sub-tab 2310, which brings up report 2300. The other sub-sub-tabs are a Format sub-sub-tab 2312, a Model Match sub-sub-tab 2314, a Concurrency sub-sub-tab 2316, and a File sub-sub-tab 2318. Form 2300 also has four text boxes and four command buttons. The text boxes are a File text box 2330, a Selected Items text box 2332, a Separator text box 2334 and a Delimiter text box 2336. The command buttons are a File command button 2350, a Selected Item command button 2352, a Load Dialect command button 2354, and a Run Report command button 2356.

The user enters the name and path of the computer program for which the report is to be generated in File text box 2330 and enters the command in text box 2332. The separator and delimiter for the program is entered into text boxes 2334 and 2336, respectively. As shown in FIG. 23, the separator is a comma and the delimiter is a dollar sign, which are those used in the ATLAS dialect. Alternatively, File and Selected Item command buttons 2350 and 2352 can be used to select the entries for their respective text boxes, and when left clicked bring up a pop-up menu (not shown) that provides the possible selections for each. The possible files being stored in the Reports Library. Load Dialect button 2354 loads the desired computer program into the Reports Library and first processed by rehost computer program 210 for formatting it. Run Report command button causes the report to be run.

Figure 24:
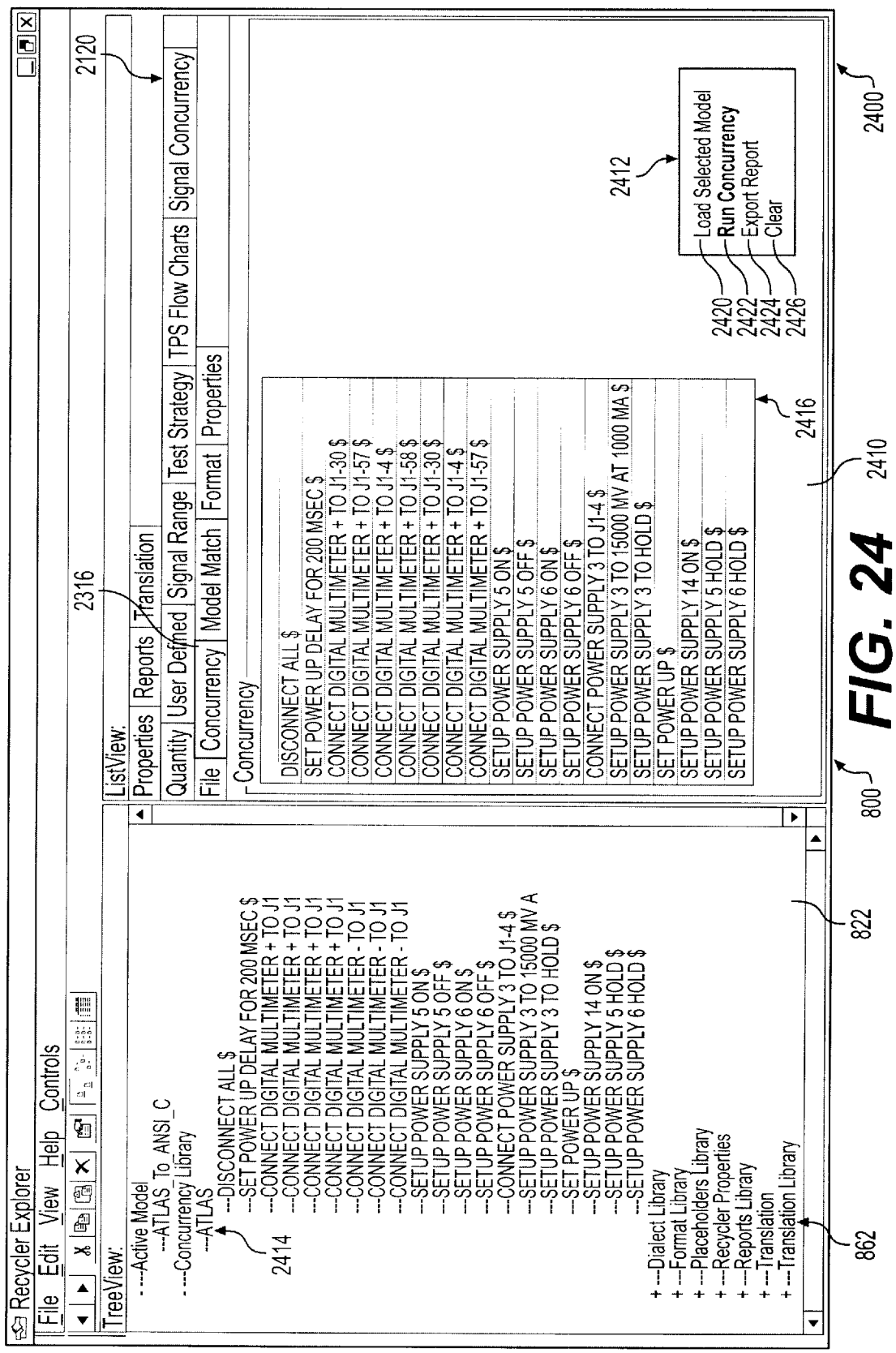

FIG. 24 depicts a form 2400 that is brought up when Concurrency sub-sub-tab 2316 is left clicked. Form 2400 has a single grid view 2410. Also located in FIG. 24 is a pop-up menu 2412 that was generated by right clicking on grid view 2410. In tree view 822, in the Concurrency Library of library 862, are statements 2414 of a computer program in the ATLAS dialect. Computer program statements 2414 are parsed and formatted, but not generalized. Each branch of computer program 2414 contains a statement and it will be noted that there are no sub-branches. In grid view 2410, there is a program grid 2416 has been populated with entries that are the same as the statements in tree view of program 2414.

Pop-up menu 2412 has four selections or menu items: a Load Selected Model menu item 2420, a Run Concurrency menu item 2422, an Export Report menu item 2424, and a Clear menu item 2426. Left clicking on any of these menu items has a similar result as clicking on the same named menu item discussed hereinabove with respect to other forms. Export Report menu item 2424 generates a file containing the legacy computer program in a format that can be read and displayed by a COTS spread sheet computer program such as Excel. Load menu item 2420 when clicked on generates a pop-up browse window that permits the user to select the program for the report. Menu item 2412 simply clears all entries in grid view 2410. As shown in FIG. 24, menu item 2422 has been highlighted. When menu item 2422 is left clicked, the concurrency report is run and the result is shown in FIG. 25.

Figure 25:
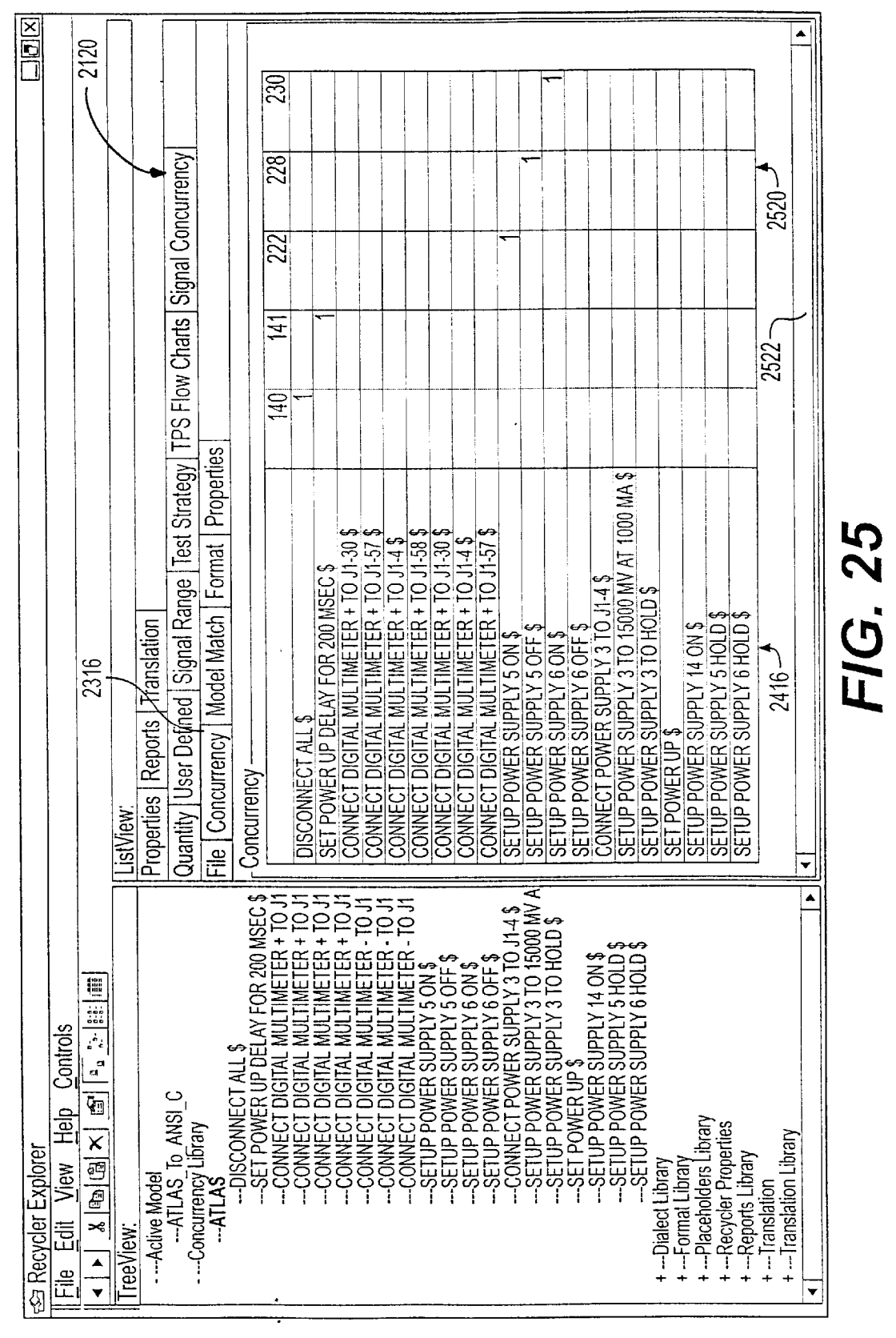

In FIG. 25, a spread sheet view 2520 adjacent to grid 2416 and a bottom horizontal scroll bar 2522 have been added in grid view 2410. Note that this concurrency view is similar to a concurrency report 3100 that is depicted in FIG. 31, discussed hereinabove.

With reference now in particular to FIGS. 23, 24, 25, 31 and 34, a routine 3400 for generating concurrency report 3100 depicted in FIG. 31 is depicted. The initial steps of routine 3400 are very similar to those of routine 3200. Thus, from a start terminal 3410, routine 3400 proceeds through a process box 3412 in which a file is selected, to a process box 3414 in which the structure information about the selected file is gathered from text boxes 2330, 2332, 2334, and 2336, to nested while loops indicated by a While oval 3416, a process box 3418 and a While oval 3420, in which an entire statement is read, and finally to a process box 3424 where the pre-formatting options are applied. Two differences from routine 3200 are noticed in process box 3414 in which start/stop points and way points are gathered. These differences are in an alternative embodiment. Start/stop points are particular statement numbers in a source program that define the group of selected code on which the concurrency report is run if it is desired not to do a report on the entire program. A waypoint is a point at which you specify the direction the report is to travel. For example, an IF statement is a way point and the "yes" or "no" branches to be followed can be specified.

Once the pre-formatting options are applied in process box 3224, the program enters another While loop indicated by While oval 3426. This loop determines if the formatted statements of the source program match a statement or element in a concurrency model and if so, the particular statement number and statement are noted and used to color a cell in a spread sheet. The While loop is comprised of a While oval 3426 and a decision diamond 3428 that together determine if there is a match and if so to identify the concurrency element as a complement in a decision diamond 3430 (e.g. a timer is turned on) or not (e.g. the timer is turned off). This is accomplished by determining if the source statement element matches, in this example, a "turn on" statement in the model or a "turn off" statement in the model that is nested below the "turn on" statement as a sub-branch in a tree view. Once the concurrency element is determined to be a compliment or not, the program branches to either a process box 3436 or 3440 to attach a one or a zero, respectively, to the parsed statement element.

If routine 3400 determines in decision diamond 3428 that there is no match in the concurrency model, the program branches through a process box 3438 in which the next dialect element (i.e. element in the concurrency model) is selected and the loop returns to While oval 3416 to test for an End Of File.

When an End Of File is determined by While oval 3416, the routine sends the reassembled file to a process box 3442 and then to a done terminal 3444. In process box 3442, the file is sent for example to a COTS spread sheet program to display the results, displaying a complement in one visual way, for example coloring the spread sheet cell representing the statement number and statement type red, and displaying no complement in a different visual way, for example coloring the spread sheet cell blue. Alternatively, as shown in FIG. 31, coloring a cell dark grey for a turn on and turning it a light grey for a turn off. See cells D2 through N2 for a turn on and cell 02 for a turn off. Also, as shown in FIG. 25, the present invention uses a Visual Basic flex grid control to display the concurrency result.

Figure 26:
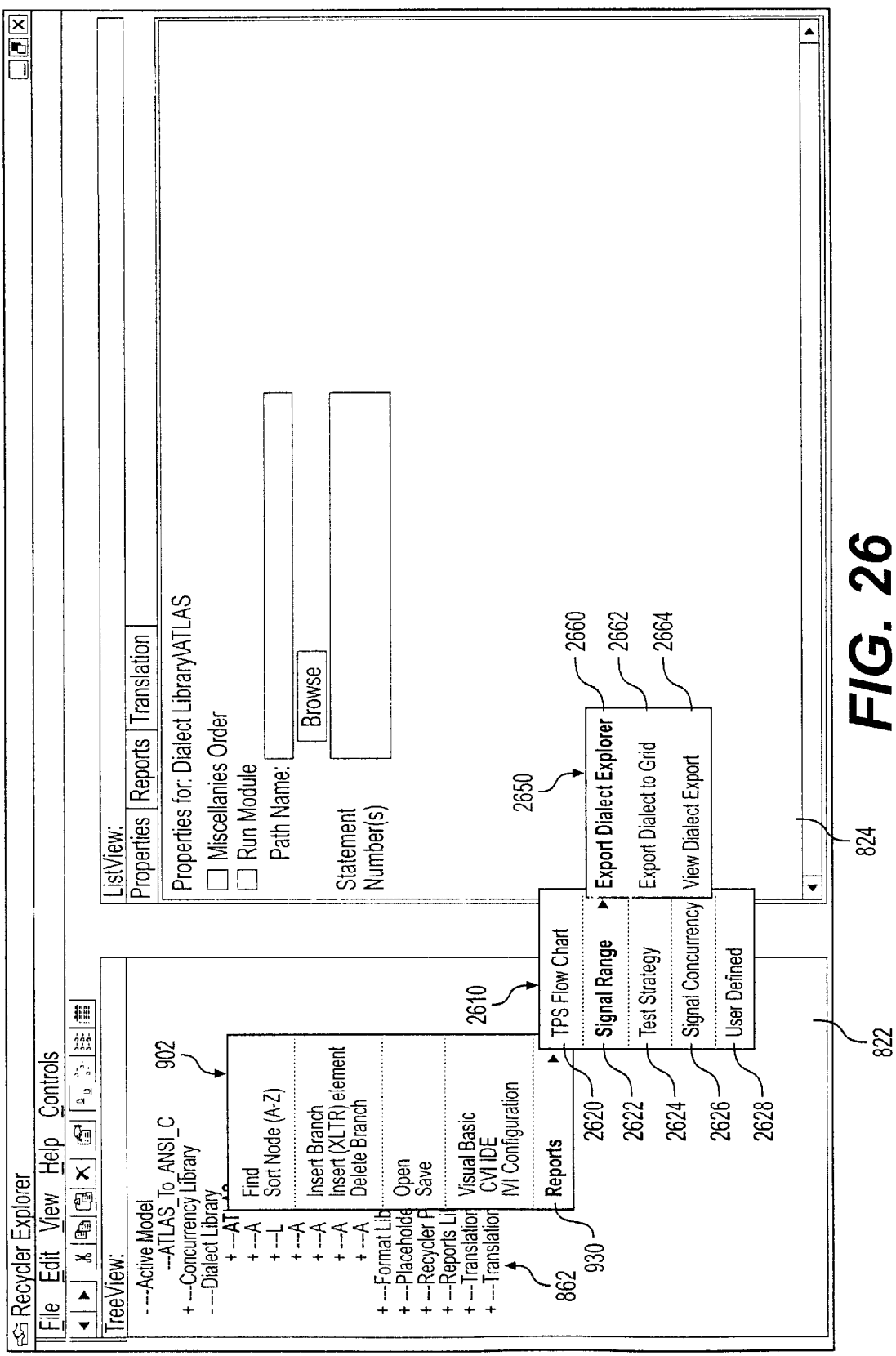

FIG. 26 is similar to FIG. 9, except that Reports menu item 930 has been highlighted in pop-up menu 902 and according to conventional Visual Basic programming, has expanded as shown by sub-menu 2610. Sub-menu 2610 has five sub-menu items: a TPS Flow Chart sub-menu item 2620, a Signal Range sub-menu item 2622, a Test Strategy sub-menu item 2624, a Signal Concurrency sub-menu item 2626, and a User Defined sub-menu item 2628. Each of these sub-menu items operates identically to, and are an alternative method to, sub-tabs 2118, 2114, 2116, 2120 and 2112, respectively.

Figure 27:
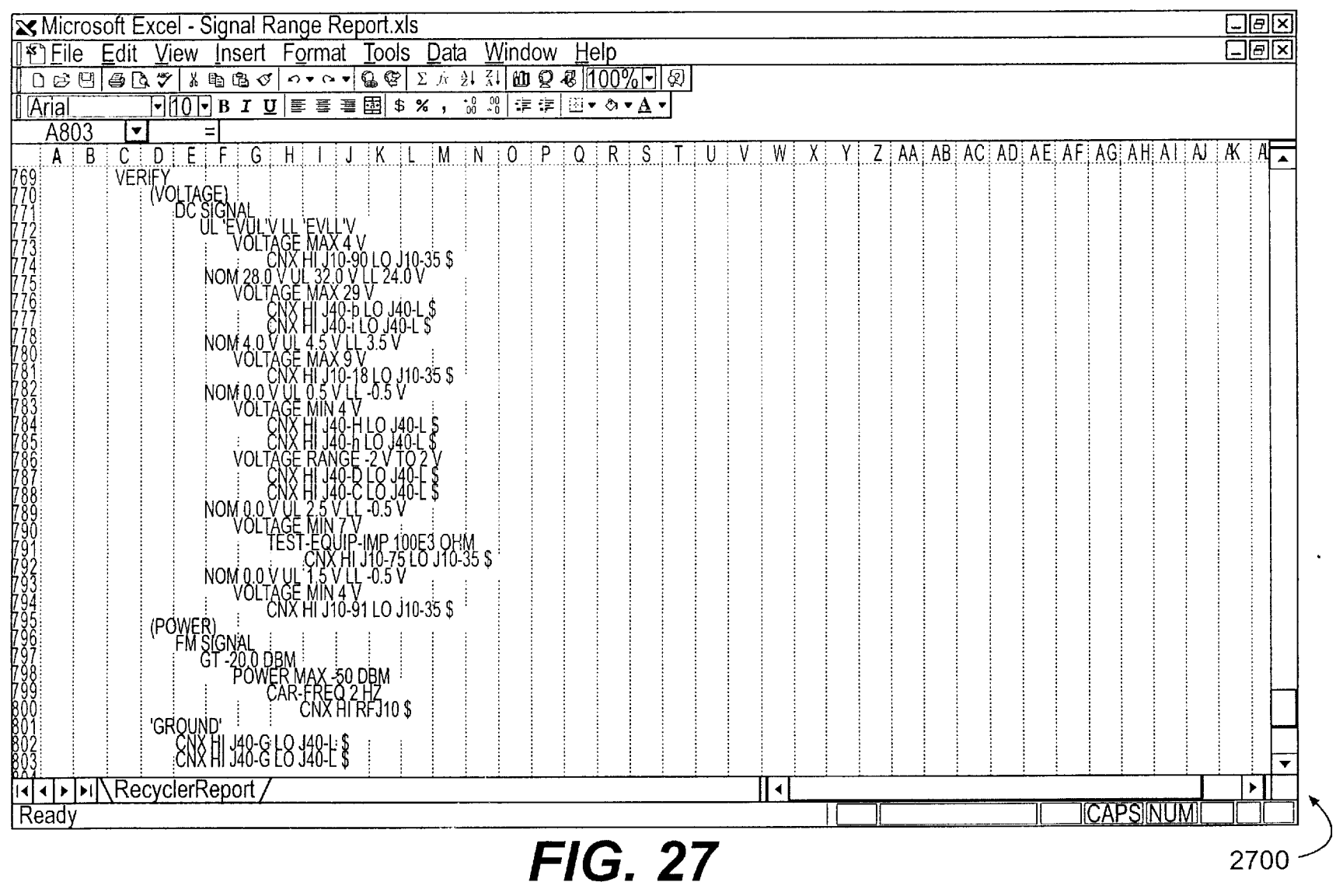
Figure 27A:
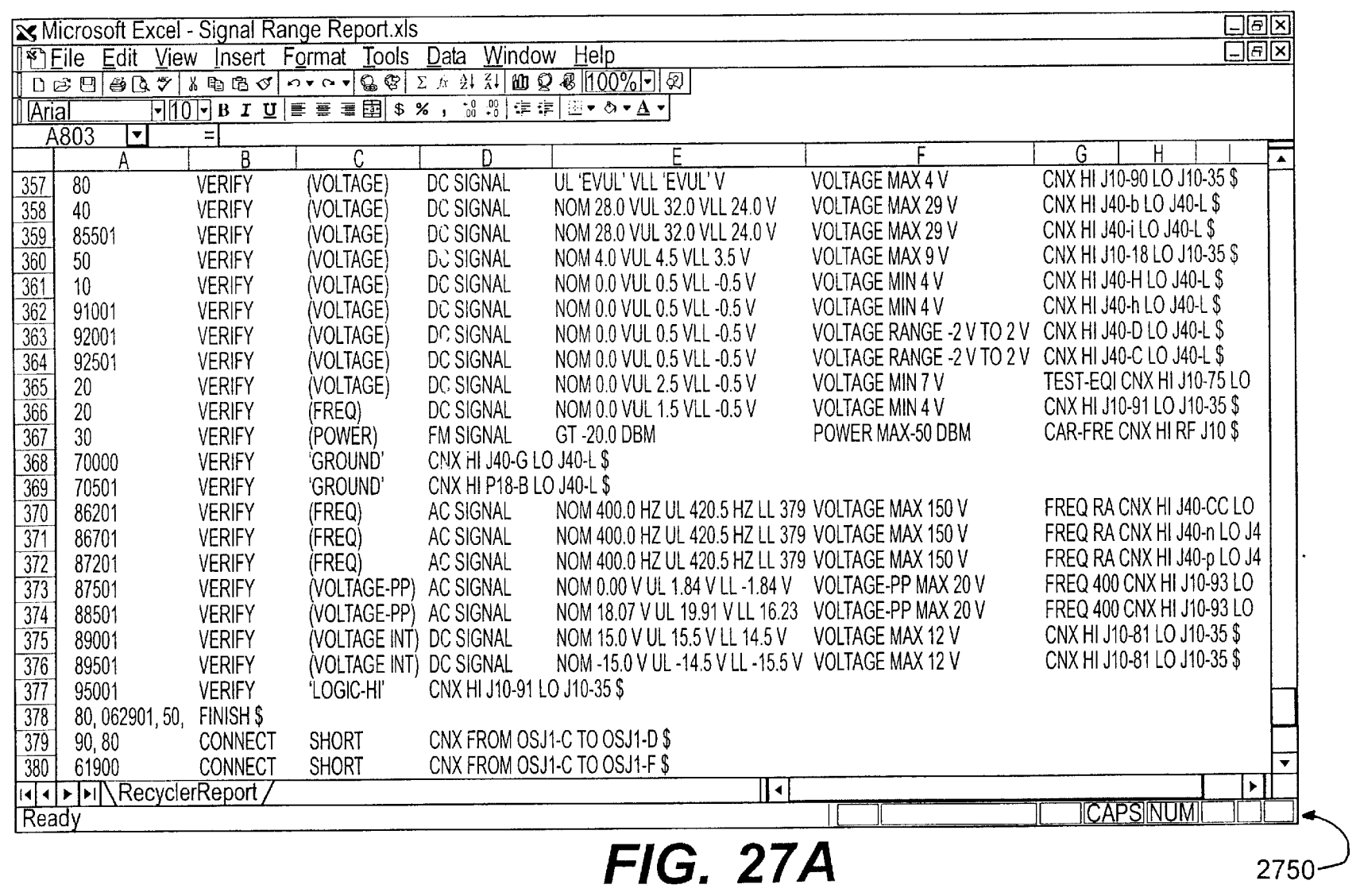

It can be seen in FIG. 26 that signal Range sub-menu item 2622 has been highlighted and that because it is an expansion sub-menu item, a sub-sub-menu 2650 has been brought up. Sub-sub-menu 2650 has three selections: an Export Dialect Explorer sub-sub-menu item 2660, an Export Dialect to Grid sub-sub-menu item 2662, and a View Dialect Export sub-sub-menu 2664. Export Dialect Explorer sub-sub-menu item 2660 when left clicked exports a tree view text report of the computer program being analyzed, keeping the indent levels intact. When exported to a spread sheet program such as Excel, the resulting report looks like a tree view report 2700 depicted in FIG. 27. Export Dialect to Grid sub-sub-menu item 2662 when left clicked exports a grid view where for each branch there is inserted a higher level node such that the result is a spread sheet that is fully populated with no spaces to the left in any of the columns. This report is depicted in FIG. 27A as grid view report 2750. The advantage of a report like report 2750 is that all statements are left justified and thus the file can be sorted at any level, or can otherwise manipulated by conventional spread sheet commands. View Dialect Export sub-sub-menu item 2664 produces a file that can be stored and later viewed with either a text editor, word processor, or spread sheet software.

Figure 29:
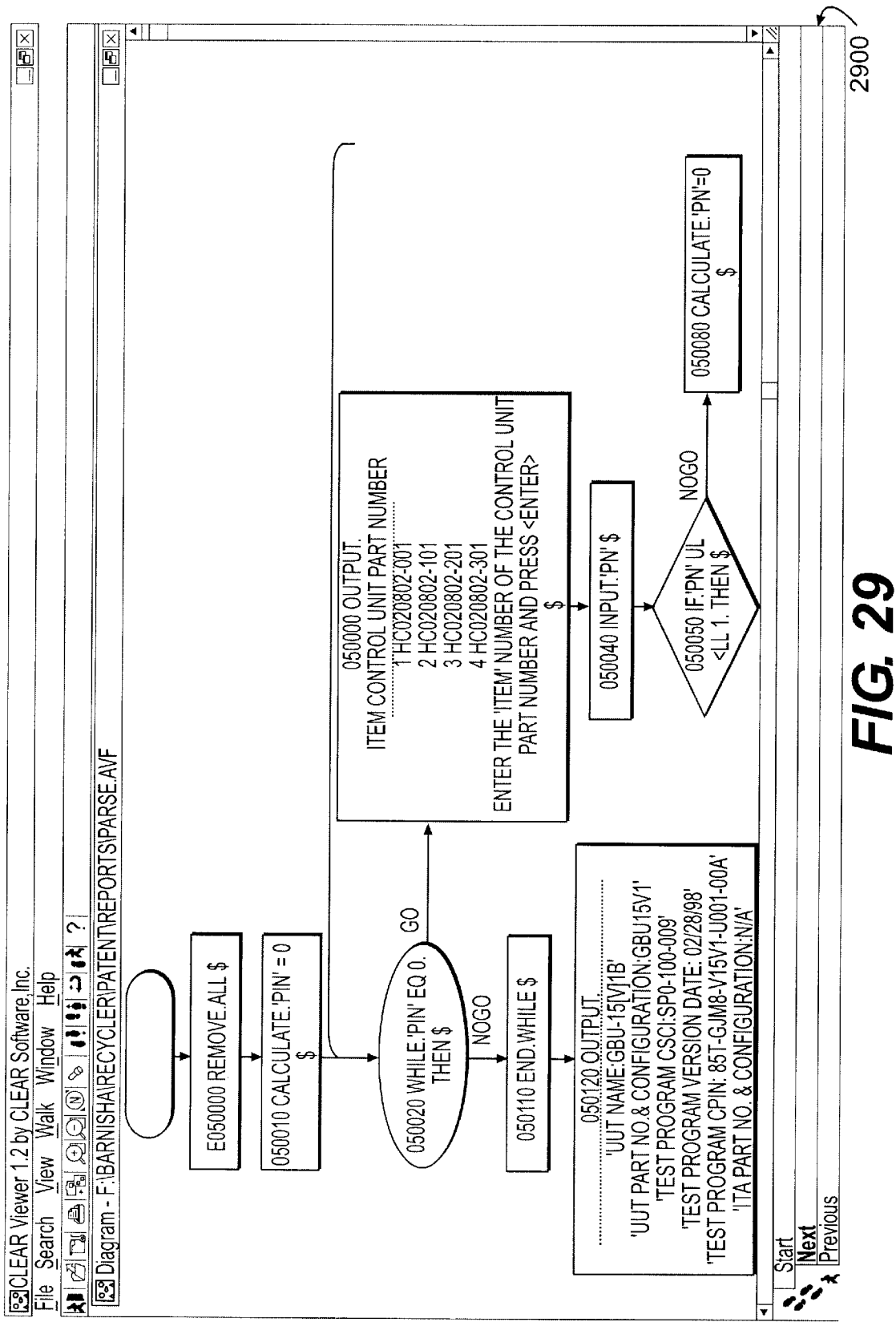
Figure 33:
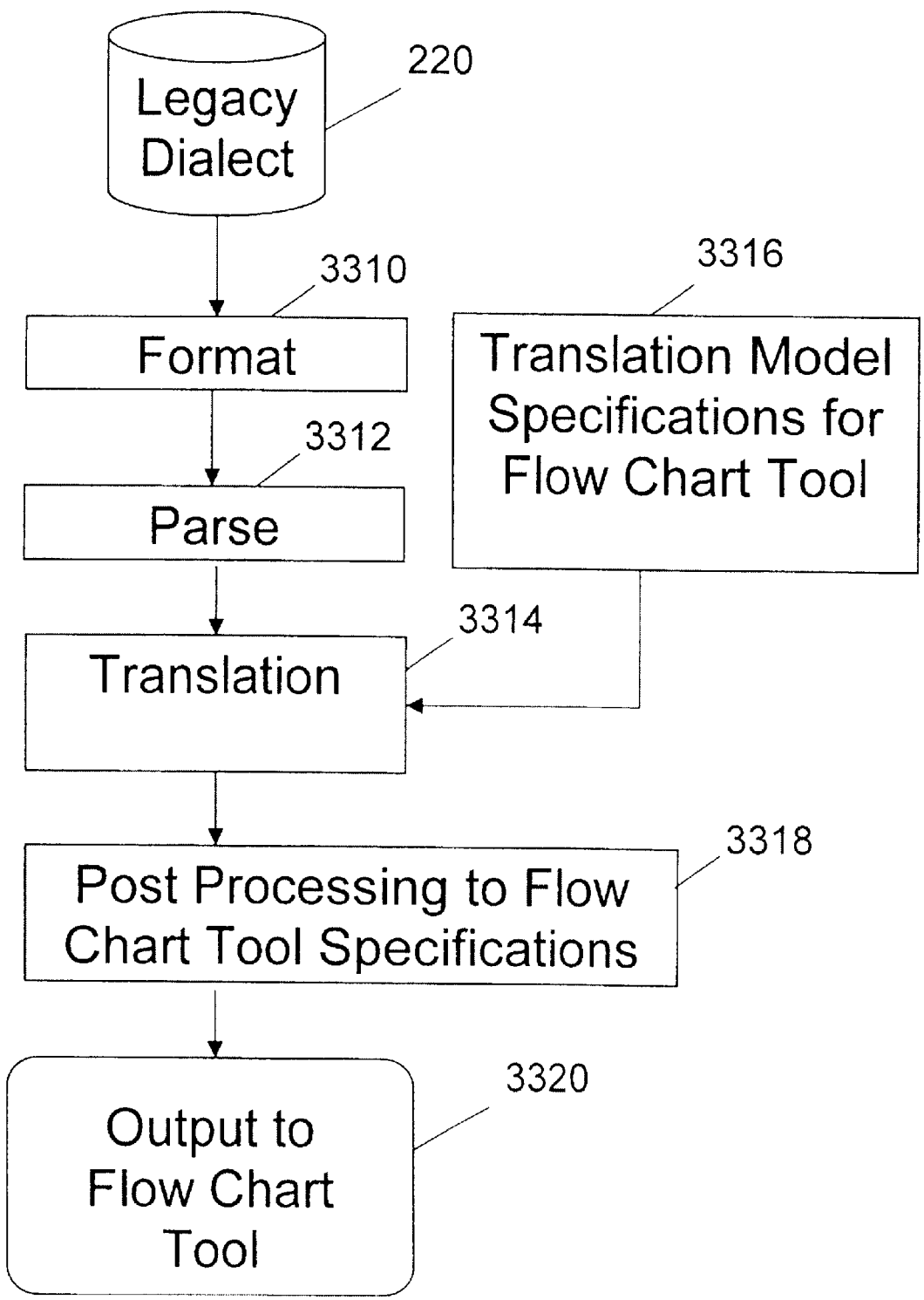
FIG. 33 is a general system flow chart of a computer program routine program according to the present invention that generates the output that is used by an application program to create the flow chart report depicted in FIG. 29.
Figure 34:
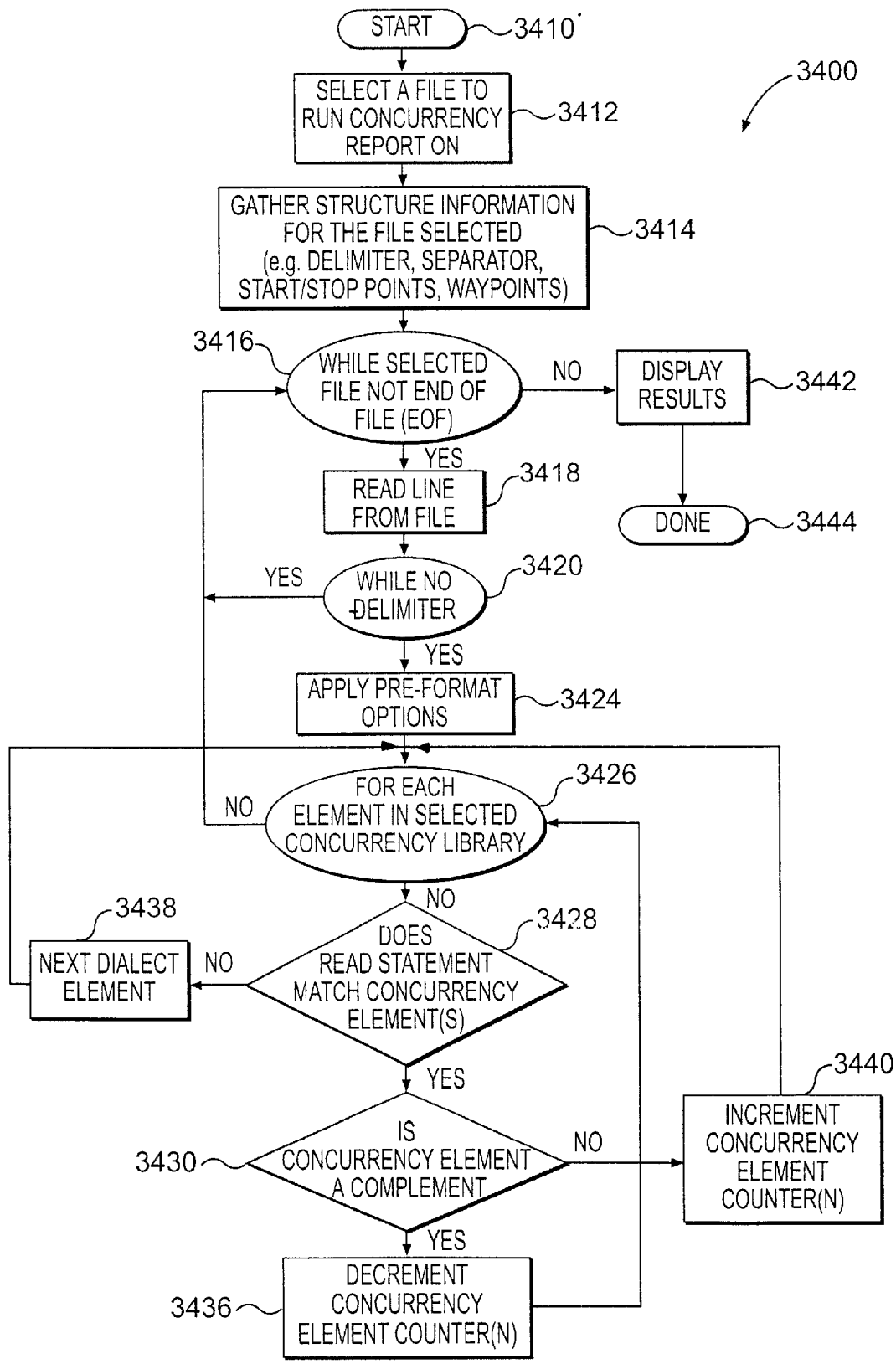
FIG. 34 is a detailed flow chart of a routine that generates the output that is used by an application program to create the Concurrency report depicted in FIG. 31.

With reference now to FIG. 29, a flow chart report 2900 of the legacy computer program is depicted. The flow chart report is obtained by either left clicking on TPS Flow Chart sub-menu item 2620 or by clicking in TPS Flow Chart sub-tab 2118. As shown in FIG. 33, a flow chart routine 3300 of rehost computer program 210 places the parsed and formatted program code into a data form that is acceptable to a conventional flow charting computer program such as CLEAR Viewer. Essentially, the flow chart routine 3300 formats the statements of the source program, shown in FIG. 33 as being stored on storage device 220 and which is the program to be flow charted, using the same procedure as set forth above. Again, the approach is to develop a series of individual formatted statements that are in a known configuration or arrangement so that they can be compared with a translation model, which in this instance is a model used to translate the legacy statements into code recognizable by a conventional flow chart program. Such a program as mentioned above, and the output from which is depicted in FIG. 29, is allClear®. Thus, the legacy dialect is provided by storage device 220 to a process box 3310 in which the individual statements are formatted, one- by-one; the formatted statements are then provided to a process box 3312 where they are parsed on an element level as determined by the separator to form branches and sub-branches; the parsed elements are compared in a process box 3314 with generalized statements in a translation model from process box 3316 and then provided to a process box 3318; in process box 3318 the translated statements are post processed to the particular specifications of the flow charting tool, such as by inserting tabs; and finally the post processed code is sent to a COTS flow charting tool to be displayed and printed out.

With reference to FIG. 30, a Test Strategy report 3000 is depicted. Report 3000 is obtained by either left clicking on Test Strategy sub-menu item 2624 or Test Strategy sub-tab 2116. Test Strategy Report 3000 is a report which organizes the various statements of a Test Program into functional groups of code, each group being traditionally known as a Test. Thus, Test Strategy report 3000 is the full collection of all tests for a particular UUT, arranged in the order of their execution into a Test Strategy Report. In the test community, a test is defined as a series of instrument control statements which culminate in a decision being made as to the status of the Unit Under Test (UUT). An example of a test is the application of five (5) volts power to the UUT, followed by a measurement performed by a Digital Multimeter (DMM), and then by a comparison to determine whether the value measured by the DMM is within the limits required for the UUT. The result of the comparison directs subsequent flow of the test program. Thus this group of actions, namely power application, output measurement and limit comparison form a test. The determination of the end of a test is important in creating the output report, and at least for the ATLAS dialect, a combination of a comparison statement together with an end statement of the nature "END, IF $" determines the end of the test.

The invention thus has a means to define multiple search criteria for determining the point at which a test is complete, such that when a test program is reported using the Test Strategy Report option of the invention, the parser creates an output report such as that depicted in FIG. 30 which groups the parsed statements from the Test Program according to the user desired criteria.

Rehost computer program 210 generates this report by first parsing and formatting the legacy computer program and placing it in a tree format, and then providing a formatted file for a COTS data base software, such as Access. Test strategy report 3000 is custom made to each type of software. In the present example, a Test Program has been processed and thus the particular rows and columns are unique to that type of software. One aspect of a TP is that it is applying different signals to different terminals and the purpose of report 3000 is to permit the user to evaluate all of the signals going in and out of UUT 132.

To make report 3000, the verbs of the legacy computer TP are stored in a left column and then the modifiers of that verb are identified and placed in an indented table. At the far right of report 3000 are the connection points to which the signals are being applied.

The invention being thus described with respect to three specific embodiments thereof, it will be obvious that the same may be varied in many ways. Such variations are not to be regarded as a departure from the spirit and scope of the invention and all such modifications are intended to be included with the scope of the claims as set forth hereinbelow.

I claim:

1. A method of rehosting a legacy computer program written in a first computer dialect and having a plurality of known characteristics to a target computer program written in a second computer dialect, said legacy computer program having a plurality of identifiable statements, said method comprising a. Loading the legacy computer program in a general purpose digital computer system;
   b. Selecting a plurality of formatting options to be applied to the legacy computer program and placing the selected options in a particular order;
   c. Having said computer system apply said formatting options in order to each statement of the legacy computer program one statement at a time to generate a plurality of parsed, refined statements;
   d. Providing a translation model to said computer system, said translation model having a plurality of statements in the first dialect and corresponding statements in the second computer dialect;
   e. Comparing each parsed statement in said refined version with said translation model and for each match found, appending said corresponding statements at the end of a target file; and
   f. Processing said target file into a rehosted target computer program.

2. The method as claimed in claim 1 and further comprising the step of reading a file containing characteristics of the legacy computer program, and using those characteristics to parse the legacy computer program into a plurality of components.

3. The method as claimed in claim 1 wherein said corresponding statements of said translation module in said second computer dialect are in the specifications for a flow chart tool;

and further comprising post processing said corresponding statements to specifications of the flow chart tool;

providing said post processed statements to the flow chart tool; and having said flow chart tool generate a flow chart.

4. A method of generating a dialect model that is used as a look-up table when building a translation model that in turn is used to translate a source computer program written in a first computer dialect and having a plurality of known characteristics to a target computer program written in a second computer dialect, said source computer program having a plurality of identifiable statements, said method comprising:

a. Providing at least a first and a second computer program that are written in said first computer dialect;

b. Selecting a plurality of formatting options to be applied to the source computer program and placing the selected options in a particular order;

c. Parsing said first computer program into a plurality of parsed statements;

d. Applying said formatting options in order one at a time to each parsed statement, one at a time, to generate a plurality of refined statements;

e. Comparing each refined statement with previously refined statements to determine if the statement being compared is unique;

f. If said refined statement is unique, storing it with previously stored unique statements;

g. Repeating steps b through f for the second computer program.

5. The method as claimed in claim 4 and further comprising the step of generalizing each unique refined statement to produce a plurality of generalized statements; and storing said generalized statements.

6. The method as claimed in claim 5 and further comprising the step of creating a translation model by associating in a tree structure a translated statement corresponding to a selected generalized statement.

7. The method as claimed in claim 6 and further comprising inserting into said tree structure a flag sub-branch below a branch corresponding to the selected generalized statement to indicate that branches below said flag sub-branch are translations, and inserting at least one sub-branch into said tree structure below said flag sub-branch that contains a translation of the generalized statement.

8. A computer program stored in a computer-readable memory which directs operation of a computer for rehosting a legacy computer program written in a first computer dialect and having a plurality of known characteristics to a target computer program written in a second computer dialect, the legacy computer program having a plurality of identifiable statements, said stored program comprising:

a routine that directs the computer to read a first line of the legacy computer program;

a routine that directs the computer to select a translation module having a plurality of individually readable statements in the first computer dialect and corresponding translated statements in the second computer dialect;

a routine that directs the computer to select a statement from the legacy computer program;

a routine that directs the computer to format the selected statement in accordance with a selected plurality of ordered formatting options;

a routine that directs the computer to translate the formatted selected statement into the second computer dialect in accordance with the translation module; and a routine that directs the computer to determine if there are additional statements to be selected and if so to repeat the selecting, formatting and translating routines for the next statement.

9. A computer program stored in a computer-readable memory as claimed in claim 8 and further including a routine that directs the computer to append the translated statement to a translated file.

10. A software rehosting apparatus for translating a computer program from a first computer dialect to a second computer dialect, said software rehosting apparatus comprising:

a translation engine having a central processing unit;

first storage memory in communication with said central processing unit, a computer program written in a first computer dialect stored thereon, said first computer dialect being a legacy-dialect;

second storage memory in communication with said central processing unit, a computer program written in a second computer language stored thereon, said second computer language being a target-dialect;

third storage memory in communication with said central processing unit, a rehost computer program stored thereon;

an input device in communication with said central processing unit;

an output device in communication with said central processing unit, said output device adapted to display a split screen presentation having a plurality of parts comprising a tree view in one part of the split screen, and a list view in another part of the split screen; and a pointing device in communication with said central processing unit.

11. The method as claimed in claim 1, further comprising displaying on a computer monitor a split screen presentation, said split screen having a plurality of parts.

12. The method as claimed in claim 11, said plurality of parts further comprising a tree view in one part of the split screen, and a list view in another part of the split screen.

13. The method as claimed in claim 12, further comprising displaying in said tree view each element of parsed code as a branch and displaying each statement in each line as a collapsible sub-branch if additional elements exist.

14. The software rehosting apparatus as claimed in claim 10, wherein said rehost computer program is an event generated computer program.

15. The software rehosting apparatus as claimed in claim 10, wherein said rehost computer program further comprises a plurality of formatting options.

16. The software rehosting apparatus as claimed in claim 15, wherein said rehost computer program further comprises a format options selector whereby a subset of said plurality of formatting options can be selected.

17. The software rehosting apparatus as claimed in claim 16, wherein said rehost computer program further comprises a sequencer whereby said selected subset of formatting options can be sequenced into a particularized order.

18. The software rehosting apparatus as claimed in claim 16, further comprising a formatter whereby each of a plurality of statements written in a first computer dialect, respectively, in sequence, can be formatted in accordance with said selected subset of formatting options.

19. The software rehosting apparatus as claimed in claim 18, further comprising a refined statement generator whereby a series of one or more parsed, refined statements are generated corresponding to each of the plurality of statements written in the first computer dialect.

20. The software rehosting apparatus as claimed in claim 15, further comprising a formatting modifier whereby the plurality of formatting options can be modified.

21. The software rehosting apparatus as claimed in claim 10, further comprising:
   a plurality of formatting options;
   a format options selector whereby a subset of said plurality of formatting options can be selected;
   a sequencer whereby said selected subset of formatting options can be sequenced into a particularized order;
   a formatter whereby each of a plurality of statements written in a first computer dialect, respectively, in sequence, are formatted in accordance with said selected subset of formatting options; and
   a refined statement generator whereby a series of one or more parsed refined statements are generated corresponding to each of the plurality of statements written in the first computer dialect.

22. The software rehosting apparatus as claimed in claim 10, further comprising a fourth storage memory having an operating system computer program stored thereon.

23. The software rehosting apparatus as claimed in claim 10, whereby said input device receives a first information from an operator and provides said first information to said translation engine.

24. The software rehosting apparatus as claimed in claim 10, said output device having a display which displays a second information provided from said translation engine.

25. The software rehosting apparatus as claimed in claim 24, said second information having a tree structure.

26. The software rehosting apparatus as claimed in claim 10, wherein said pointing device controls movement of a positional indicator displayed on said output device.

27. The software rehosting apparatus as claimed in claim 26, wherein said pointing device has a first control function that provides a first control signal to a rehost computer program and to an operating system computer program.

28. The software rehosting apparatus as claimed in claim 27, wherein said first control signal is an event initiating signal.

29. The software rehosting apparatus as claimed in claim 27, wherein said first control signal varies as a function of a relative position of the positional indicator on said output device, the rehost computer program, and the operating system computer program.

30. The software rehosting apparatus as claimed in claim 26, wherein said pointing device has a second control function that provides a second control signal to a rehost computer program and to an operating system computer program.

31. The software rehosting apparatus as claimed in claim 10, further comprising:
   a translation model having:
   a first library having a plurality of statements;
   a second library having a plurality of statements; and
   a correspondence relationship between said first library and said second library.

32. The software rehosting apparatus as claimed in claim 31, wherein said plurality of statements in said first library is written in said first computer dialect.

33. The software rehosting apparatus as claimed in claim 31, wherein said plurality of statements in said second library is written in said second computer dialect.

34. The software rehosting apparatus as claimed in claim 31, wherein said correspondence relationship further comprises a mapping of each of the plurality of statements in said first library to corresponding one of the plurality of statements in said second library.

35. The software rehosting apparatus as claimed in claim 34, wherein said mapping is displayed in a tree structure on the output device.

36. The software rehosting apparatus as claimed in claim 35, wherein said tree structure includes a translated statement and a generalized statement.

37. The software rehosting apparatus as claimed in claim 36, wherein said tree structure further includes a flag sub-branch below the generalized statement, and at least one further sub-branch below said flag sub-branch having said translated statement.

38. The software rehosting apparatus as claimed in claim 31, further comprising a first library updater whereby statements in the first library can be updated.

39. The software rehosting apparatus as claimed in claim 31, further comprising a second library updater whereby statements in the second library can be updated.

40. The software rehosting apparatus as claimed in claim 31, further comprising a correspondence relationship updater whereby the correspondence relationship can be updated.

41. A software rehosting computer program stored in a computer-readable memory, comprising:
   a plurality of formatting options; and
   a translation model having:
   a first library having a plurality of statements;
   a second library having a plurality of statements;
   an updateable correspondence relationship between said first library and said second library; and
   an output routine that outputs to a display device selected ones of said plurality of statements from each of said first and second libraries.

42. The software rehosting computer program as claimed in claim 41, further comprising a modify-formatting routine whereby said plurality of formatting options can be modified.

43. The software rehosting computer program as claimed in claim 41, wherein:
   said plurality of statements in said first library is written in a first computer dialect; and
   said plurality of statements in said second library is written in a second computer dialect.

44. The software rehosting computer program as claimed in claim 43, further comprising a parsing routine that parses the plurality of statements written in said first computer dialect.

45. The software rehosting computer program as claimed in claim 44, further comprising a generalizing routine that generalizes each of the parsed plurality of first computer dialect statements.

46. The software rehosting computer program as claimed in claim 45, further comprising a comparison routine that compares each of said generalized statements with ones of the plurality of statements in said second library.

47. The software rehosting computer program as claimed in claim 46, further comprising a match routine whereby ones of said compared generalized statements that match ones of said plurality of statements in said second library are output in a tree structure for display on an output device.

48. The software rehosting computer program as claimed in claim 47, wherein said tree structure includes said compared generalized statement and a corresponding translated statement, said translated statement being said one of said plurality of statements in said second library that matches said generalized statement.

49. The software rehosting computer program as claimed in claim 48, wherein said tree structure further includes a flag sub-branch below the generalized statement, and at least one further sub-branch below said flag sub-branch having said translated statement.

50. The software rehosting computer program as claimed in claim 41, further comprising an update routine that can update said plurality of statements in each of the first and second libraries, and can update the correspondence relationship.

* * * * *